(12) United States Patent
Liu et al.

(10) Patent No.: US 9,264,928 B2
(45) Date of Patent: Feb. 16, 2016

(54) METHODS, APPARATUS AND SYSTEMS FOR MINIMIZATION OF DRIVE TESTS (MDT) BASED ON QOS VERIFICATIONS

(71) Applicant: InterDigital Patent Holdings, Inc., Wilmington, DE (US)

(72) Inventors: Kai Liu, S. Huntington, NY (US); Ghyslain Pelletier, Laval (CA); Peter S. Wang, E. Setauket, NY (US); Samian J. Kaur, Plymouth Meeting, PA (US); Paul Marinier, Brossard (CA)

(73) Assignee: InterDigital Patent Holdings, Inc., Wilmington, DE (US)

( * ) Notice: Subject to any disclaimer, the term of this patent is extended or adjusted under 35 U.S.C. 154(b) by 150 days.

(21) Appl. No.: 13/659,015

(22) Filed: Oct. 24, 2012

(65) Prior Publication Data

US 2013/0114446 A1 May 9, 2013

Related U.S. Application Data

(60) Provisional application No. 61/555,844, filed on Nov. 4, 2011, provisional application No. 61/594,573, filed on Feb. 3, 2012.

(51) Int. Cl.
*H04W 24/10* (2009.01)
*H04W 24/08* (2009.01)
*H04W 24/06* (2009.01)

(52) U.S. Cl.
CPC .............. *H04W 24/10* (2013.01); *H04W 24/06* (2013.01); *H04W 24/08* (2013.01)

(58) Field of Classification Search
USPC .............. 370/252, 328, 329, 241.1, 331, 216, 370/225, 235, 241, 253; 455/456.1, 422.1, 455/67.11, 432.1, 436, 411, 418, 404.2, 455/405, 414.2, 423, 437, 63.1; 709/220, 709/229

See application file for complete search history.

(56) References Cited

U.S. PATENT DOCUMENTS 7,430,177 B2 * 9/2008 Mir et al. ....................... 370/241
2004/0097237 A1 * 5/2004 Aoyama ....................... 455/445

(Continued)

FOREIGN PATENT DOCUMENTS

WO    WO-2011137108    11/2011

OTHER PUBLICATIONS

"3rd Generation Partnership Project; Technical Specification Group Radio Access Network; Universal Terrestrial Radio Access (UTRA) and Evolved Universal Terrestrial Radio Access (E-UTRA); radio measurement collection for Minimization of Drive Tests (MDT);", overall description; Stage 2 (Release 10); 3GPP TS 37.320 V10.2.0, Jun. 2011, 17 pages.

(Continued)

*Primary Examiner* — Benjamin H Elliott, IV
*Assistant Examiner* — Eric Nowlin
(74) *Attorney, Agent, or Firm* — Eric Berkowitz

(57) ABSTRACT

A method of managing one or more test measurements associated with a communication system using a wireless transmit/receive unit (WTRU) is disclosed. The method includes receiving, by the WTRU, a measurement configuration including at least a trigger indicating a condition or event for initiation of the one or more test measurements; determining, by the WTRU, whether the trigger has been satisfied, as a determination result; initiating the one or more test measurements in accordance with the determination result; and measuring, by the WTRU, the one or more test measurements.

30 Claims, 24 Drawing Sheets

(56) References Cited

U.S. PATENT DOCUMENTS

| | | | |
|---|---|---|---|
| 2005/0251363 A1* | 11/2005 | Turner et al. | 702/182 |
| 2007/0167165 A1* | 7/2007 | Yang et al. | 455/439 |
| 2009/0116399 A1* | 5/2009 | Ho et al. | 370/252 |
| 2010/0190488 A1* | 7/2010 | Jung et al. | 455/424 |
| 2010/0273432 A1* | 10/2010 | Meshkati et al. | 455/67.11 |
| 2011/0194441 A1* | 8/2011 | Jung et al. | 370/252 |
| 2011/0195668 A1* | 8/2011 | Lee et al. | 455/67.11 |
| 2012/0040621 A1* | 2/2012 | Jung et al. | 455/67.11 |
| 2012/0082051 A1* | 4/2012 | Kim et al. | 370/252 |
| 2012/0108199 A1* | 5/2012 | Wang et al. | 455/405 |
| 2012/0315890 A1* | 12/2012 | Suzuki et al. | 455/422.1 |
| 2013/0196650 A1* | 8/2013 | Futaki | 455/424 |
| 2014/0315549 A1* | 10/2014 | Zhang et al. | 455/434 |
| 2014/0364116 A1* | 12/2014 | Jorguseski et al. | 455/434 |

OTHER PUBLICATIONS

"3rd Generation Partnership Project; Technical Specification Group Radio Access Network; Evolved Universal Terrestrial Radio Access (E-UTRA); Radio Resource Control (RRC); Protocol Specification (Release 10)", 3GPP TS 36.331 V10.3.0, Sep. 2011, 296 Pages.

"3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall Description; Stage 2 (Release 10)", 3GPP TS37.320 V10.3.0, Sep. 2011, 17 pages.

"3rd Generation Partnership Project; Technical Specification Group Radio Access Nework; Study on Minimization of Drive-tests in Next Generation Networks; (Release 9)", 3GPP TR 36.805 V2.0.0, Dec. 2009, 23 pages.

"3rd Generation Partnership Project; Technical Specification Group Radio Access Network; Evolved Universal Terrestrial Radio Access (E-UTRA) and Evolved Packet Core (EPC); Special Conformance Testing Functions for User Equipment (UE) (Release 9)", 3GPP TS 36.509 V9.5.0, Sep. 2011, 39 Pages.

Qualcomm Europe, "Email Discussion Summary [66#7] LTE-UMTS: Measurements for Minimisation of Drive Tests", 3GPP TSG-RAN WG2 Meeting #66bis; Los Angeles, US, Jun. 29-Jul. 3, 2009; R2-093706, Jun. 2009, 13 Pages.

Qualcomm Europe,"Email Discussion Summary [66b#7] LTE-UMTS: Minimisation of Drive Tests", 3GPP TSG-RAN WG2 Meeting #67; Shenzhen, China, Aug. 24-28 2009; R2-094291, Aug. 2009, 35 Pages.

International Search Report and the Written Opinion of the International Searching Authority, International Application No. PCT/US2012/061562, Oct. 24, 2012, 18 Pages.

Ericsson et al., "Logged MDT Measurement Reporting", 3GPP TSG-RAN WG2 #69bis; Beijing China, Apr. 12-16, 2010; Tdoc R2-101994, Apr. 6, 2010, 2 Pages.

Catt, "Measurement Types for QoS Verification", 3GPP TSG RAN WG2 Meeting #75bis; Zhuhai, China, Oct. 10-4, 2011; R2-115101, Oct. 2011, 5 Pages.

Nokia Siemens Networks, et al., "Enhancement of Minimization of Drive Tests for E-UTRAN and UTRAN—Core Part", 3GPP TSG RAN Meeting #53; RP-111361 Fukuoka, Japan, Sep. 13-16, 2011, 6 pages.

* cited by examiner

FIG. 16

1610: RECEIVE, BY THE WTRU, A MEASUREMENT CONFIGURATION INCLUDING AT LEAST A TRIGGER INDICATING A CONDITION OR EVENT FOR INITIATION OF THE ONE OR MORE TEST MEASUREMENTS

1620: DETERMINE, BY THE WTRU, WHETHER THE TRIGGER HAS BEEN SATISFIED, AS A DETERMINATION RESULT

1630: INITIATE, BY THE WTU, MEASUREMENT THE ONE OR MORE TEST MEASUREMENTS IN ACCORDANCE WITH THE DETERMINATION RESULT

FIG. 17

1710: RECEIVE, BY THE WTRU, A MEASUREMENT CONFIGURATION INDICATING PARAMETERS FOR TAKING THE TEST MEASUREMENTS

1720: TAKE, BY THE WTRU, THE TEST MEASUREMENTS INCLUDING AT LEAST ONE OF THE TEST MEASUREMENTS ASSOCIATED WITH A FIRST LAYER OF THE PROTOCOL STACK AND AT LEAST A SECOND ONE OF THE TEST MEASUREMENTS ASSOCIATED WITH A SECOND, DIFFERENT LAYER OF THE PROTOCOL STACK IN ACCORDANCE WITH THE INDICATED PARAMETERS OF THE MEASUREMENT CONFIGURATION

FIG. 18

1810: RECEIVE, BY THE WTRU, A MEASUREMENT CONFIGURATION INDICATING PARAMETERS FOR TAKING THE TEST MEASUREMENTS

1820: TAKE, BY THE WTRU, THE TEST MEASUREMENTS INCLUDING AT LEAST ONE OF THE TEST MEASUREMENTS ASSOCIATED WITH USER DATA AND AT LEAST A SECOND ONE OF THE TEST MEASUREMENTS ASSOCIATED WITH NON-USER-DATA

FIG. 21 2100

2110 WIRELESSLY RECEIVE, BY THE WTRU, A MEASUREMENT CONFIGURATION

2120 INITIATE, BY THE WTRU, MEASUREMENT OF THE ONE OR MORE TEST MEASUREMENTS IN ACCORDANCE WITH THE MEASUREMENT CONFIGURATION

2130 WIRELESSLY REPORT, BY THE WTRU, THE ONE OR MORE TEST MEASUREMENTS MEASURED IN ACCORDANCE WITH THE MEASUREMENT CONFIGURATION

FIG. 20 2000

2010 RECEIVE, BY THE WTRU, A MEASUREMENT CONFIGURATION INDICATING PARAMETERS FOR TAKING THE TEST MEASUREMENTS

2020 TAKE, BY THE WTRU, THE TEST MEASUREMENTS INCLUDING AT LEAST ONE OF THE TEST MEASUREMENTS ASSOCIATED WITH NON-USER DATA

FIG. 19 1900

1910 RECEIVE, BY THE WTRU, A MEASUREMENT CONFIGURATION INDICATING PARAMETERS FOR TAKING THE TEST MEASUREMENTS

1920 TAKE, BY THE WTRU, THE TEST MEASUREMENTS INCLUDING AT LEAST ONE OF THE TEST MEASUREMENTS ASSOCIATED WITH USER DATA

METHODS, APPARATUS AND SYSTEMS FOR MINIMIZATION OF DRIVE TESTS (MDT) BASED ON QOS VERIFICATIONS

CROSS REFERENCE TO RELATED APPLICATIONS

This application claims priority from U.S. Provisional Application No. 61/555,844, filed on Nov. 4, 2011 and U.S. Provisional Application No. 61/594,573, filed on Feb. 3, 2012, the contents of each being incorporated by reference herein.

FIELD OF INVENTION

The field of this invention relates to wireless communications and, more particularly, methods, apparatus and systems for minimizing, reducing, or eliminating drive tests.

BACKGROUND OF THE INVENTION

Network operators (NOs) may use drive testing to perform and report certain measurements, which the operator can use for purposes such as coverage optimization. These measurements can assist the NOs to better understand the location of coverage holes and strong interference conditions that may lead to degradation in coverage.

SUMMARY

Embodiments of the disclosure are directed to methods, systems and apparatus for managing one or more test measurements associated with a communication system. One representative method may include receiving, by the WTRU, a measurement configuration including at least a trigger indicating a condition or event for activation of the one or more test measurements; determining, by the WTRU, whether the trigger has been satisfied, as a determination result; activating the one or more test measurements in accordance with the determination result; and measuring, by the WTRU, the one or more test measurements.

In certain representative embodiments, the method may comprise reporting, by the WTRU to a network resource, the one or more test measurements.

In certain representative embodiments, the receiving of the measurement configuration may include: obtaining the trigger indicating one of: (1) a geographic region in which test measurements are to be taken; (2) a location at which test measurements are to be taken; (3) a time at which test measurements are to be taken; (4) a tracking area in which test measurements are to be taken; or (5) a cell identifier associated with a serving cell of which test measurements are to be taken.

In certain representative embodiments, the method may further comprise determining whether a channel condition exceeds a threshold such that the channel condition may include at least one of: (1) a channel quality indicator; (2) power head room; (3) throughput of a communication link to the communication system; (4) NACK rate; and/or (5) buffer availability of the WTRU.

Another representative method of managing a plurality of test measurements associated with a communication system using a wireless transmit/receive unit (WTRU) having a protocol stack with a plurality of layers is disclosed. The method may include: receiving, by the WTRU, a measurement configuration indicating parameters for taking the test measurements; and taking, by the WTRU, the test measurements including at least one of the test measurements associated with a first layer of the protocol stack and at least a second one of the test measurements associated with a second, different layer of the protocol stack in accordance with the indicated parameters of the measurement configuration.

A further representative method may include: receiving, by the WTRU, a measurement configuration indicating parameters for taking the test measurements; and taking, by the WTRU, the test measurements including at least one of the test measurements associated with user data and at least a second one of the test measurements associated with non-user-data.

In certain representative embodiments, the method may comprise transmitting, by the WTRU, a message including an availability indicator indicating whether the WTRU is available to take the test measurements.

In certain representative embodiments, the receiving of the measurement configuration may be in response to the transmitting of the message including the availability indicator.

In certain representative embodiments, the method may comprise, responsive to the WTRU being in an idle mode, logging the test measurements; and reporting, by the WTRU to the network resource, the logged test measurements.

In certain representative embodiments, the method may comprise, responsive to the WTRU being in a connected mode, reporting, by the WTRU to the network resource, the test measurements.

In certain representative embodiments, the method may comprise, responsive to a handover of the WTRU from a first cell to a second cell, delaying, by the WTRU, the taking of the test measurements until the handover is completed.

In certain representative embodiments, the taking of the test measurements may include determining a quality of service for the WTRU based on at least one of: (1) uplink data loss over a specified period; (2) uplink data loss rate over the specified period; (3) uplink data discarded over the specified period at a Packet Data Convergence Protocol (PDCP) layer; (4) uplink data discarded rate over the specified period at the PDCP layer; (5) uplink data loss over a specified period; (6) uplink data loss rate over the specified period; (7) uplink data discarded over the specified period at a Packet Data Convergence Protocol (PDCP) layer; or (8) uplink data discarded rate over the specified period at the PDCP layer.

In certain representative embodiments, the taking of the test measurements may include periodically taking the test measurements.

An additional representative method may include receiving, by the WTRU, a measurement configuration indicating parameters for taking the test measurements; and taking, by the WTRU, the test measurements including at least one of the test measurements associated with user data.

A representative wireless transmit/receive unit (WTRU) for measuring one or more test measurements associated with a communication system is disclosed. The method may include a transmit/receive unit configured to receive a measurement configuration including at least a trigger indicating a condition or event for activation of the one or more test measurements; and a processor configured to determine whether the trigger has been satisfied, as a determination result and to control (1) activation of the one or more test measurements in accordance with the determination result and (2) measurement of the one or more test measurements.

In certain representative embodiments, the transmit/receive unit may be configured to report to a network resource the one or more test measurements.

In certain representative embodiments, the transmit/receive unit may be configured to obtain the trigger indicating one of: (1) a geographic region in which test measurements are to be taken; (2) a location at which test measurements are to be taken; (3) a time at which test measurements are to be taken; (4) a tracking area in which test measurements are to be taken; or (5) a cell identifier associated with a serving cell of which test measurements are to be taken.

In certain representative embodiments, the processor may determine whether the channel condition exceeds a threshold; and the channel condition may include at least one of: (1) a channel quality indicator; (2) power head room; (3) throughput of a communication link to the communication system; (4) NACK rate; or (5) buffer availability of the WTRU.

Another representative WTRU for measuring one or more test measurements associated with a communication system is disclosed. The WTRU may include a protocol stack including a plurality of layers; a transmit/receive unit configured to receive a measurement configuration including parameters for taking the test measurements; and a processor configured to take the test measurements including at least one of the test measurements associated with a first layer of the protocol stack and at least a second one of the test measurements associated with a second, different layer of the protocol stack in accordance with the indicated parameters of the measurement configuration.

A further representative WTRU for measuring one or more test measurements associated with a communication system is disclosed. The WTRU may include a transmit/receive unit configured to receive a measurement configuration including parameters for taking the test measurements; and a processor configured to take the test measurements including at least one of the test measurements associated with user data and at least a second one of the test measurements associated with non-user-data.

In certain representative embodiments, the method may comprise, a memory configured to store the test measurements, responsive to the WTRU being in an idle mode and the transmit/receive unit may be configured to report to a network resource, the stored test measurements.

In certain representative embodiments, responsive to a handover of the WTRU, the processor may be configured to delay the taking of the test measurements until the handover is completed.

In certain representative embodiments, the processor may be configured to determine a quality of service for the WTRU based on at least one of: (1) uplink data loss over a specified period; (2) uplink data loss rate over the specified period; (3) uplink data discarded over the specified period at a Packet Data Convergence Protocol (PDCP) layer; (4) uplink data discarded rate over the specified period at the PDCP layer; (5) uplink data loss over a specified period; (6) uplink data loss rate over the specified period; (7) uplink data discarded over the specified period at a Packet Data Convergence Protocol (PDCP) layer; or (8) uplink data discarded rate over the specified period at the PDCP layer.

A further representative WTRU may include a transmit/receive unit configured to receive a measurement configuration including parameters for taking the test measurements; and a processor configured to take the test measurements including at least one of the test measurements associated with user data.

BRIEF DESCRIPTION OF THE DRAWINGS

A more detailed understanding may be had from the Detailed Description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals in the figures indicate like elements, and wherein:

FIG. 16 is a flowchart illustrating a representative method of managing test measurements associated with a communication system using a WTRU;

FIG. 17 is a flowchart illustrating a representative method of managing test measurements associated with a communication system using a WTRU having a protocol stack with a plurality of layers;

FIG. 18 is a flowchart illustrating another representative method of managing test measurements associated with a communication system using a WTRU;

FIG. 19 is a flowchart illustrating a further representative method of managing test measurements associated with a communication system using a WTRU;

FIG. 20 is a flowchart illustrating an additional representative method of managing test measurements associated with a communication system using a WTRU;

FIG. 21 is a flowchart illustrating a representative method of managing Quality of Service (QoS) test measurements associated with a communication system;

DETAILED DESCRIPTION

Figure 1A:
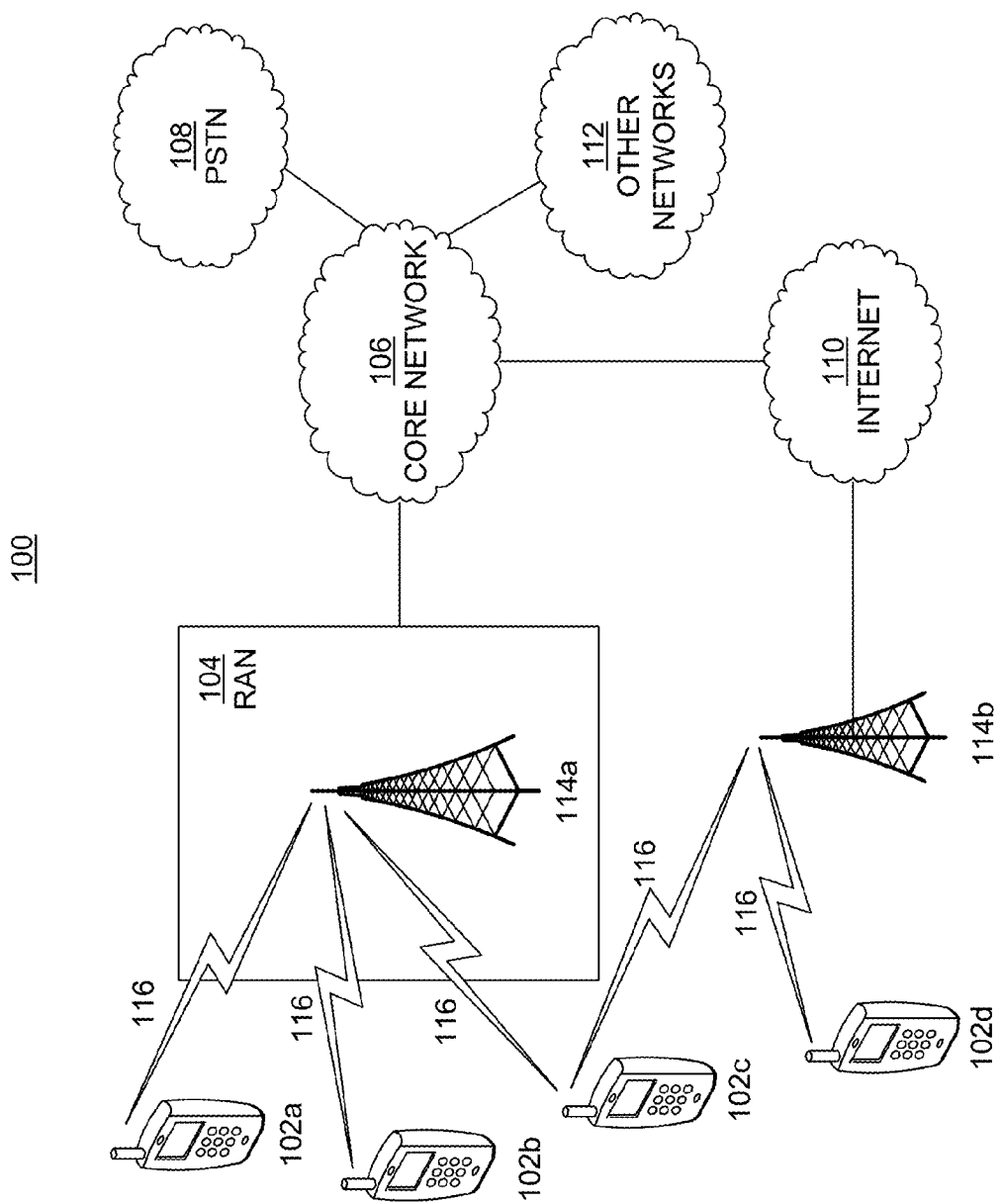
FIG. 1A is a diagram illustrating a representative communication system in which one or more disclosed embodiments may be implemented.

FIG. 1A is a diagram of a representative communications system 100 in which one or more disclosed embodiments may be implemented. The communications system 100 may be a multiple access system that provides content, such as, voice, data, video, messaging, broadcast, and the like, to multiple wireless users. The communications system 100 may enable multiple users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an evolved Node B (eNode B or eNB), a Home Node B, a Home eNode B (or HeNB), a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple-output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, and the like). The air interface 116 may be established using any suitable radio access technology (RAT).

More specifically, as noted above, the communication system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunication System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 Evolution-Data Optimized (EV-DO), Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, and the like) to establish a picocell or femtocell. As shown in FIG. 1A, the base station 114b may have a direct connection to the Internet 110. Thus, the base station 114b may not be used to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
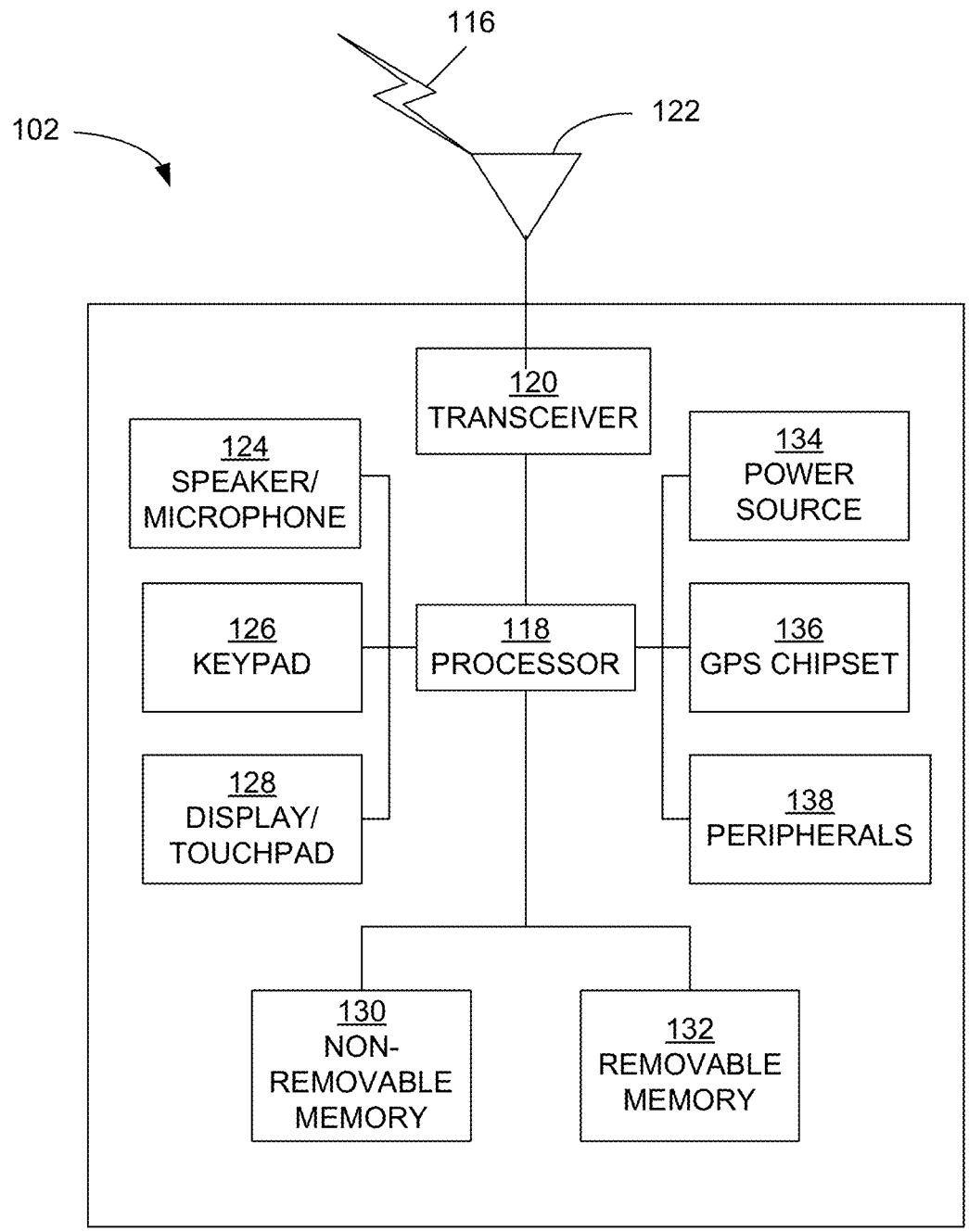
FIG. 1B is a diagram illustrating a representative wireless transmit/receive unit (WTRU) that may be used within the communication system illustrated in FIG. 1A.

FIG. 1B is a diagram of a representative WTRU 102 that may be used in the communications system 100. As shown in FIG. 1B, the WTRU 102 may include a processor 118, a transceiver 120, a transmit/receive element (e.g., an antenna) 122, a speaker/microphone 124, a keypad 126, a display/touchpad 128, non-removable memory 130, removable memory 132, a power source 134, a global positioning system (GPS) chipset 136, and peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a microprocessor, a plurality of microprocessors, one or more microprocessors in association with a DSP core, a controller, a microcontroller, an Application Specific Integrated Circuit (ASIC), a Field Programmable Gate Array (FPGA) circuit, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. The transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), and the like), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. The WTRU 102 may acquire location information by way of any suitable location-determination method while remaining consistent with an embodiment.

The processor 118 may further be coupled to other peripherals 138, which may include one or more software and/or hardware modules that provide additional features, functionality, and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
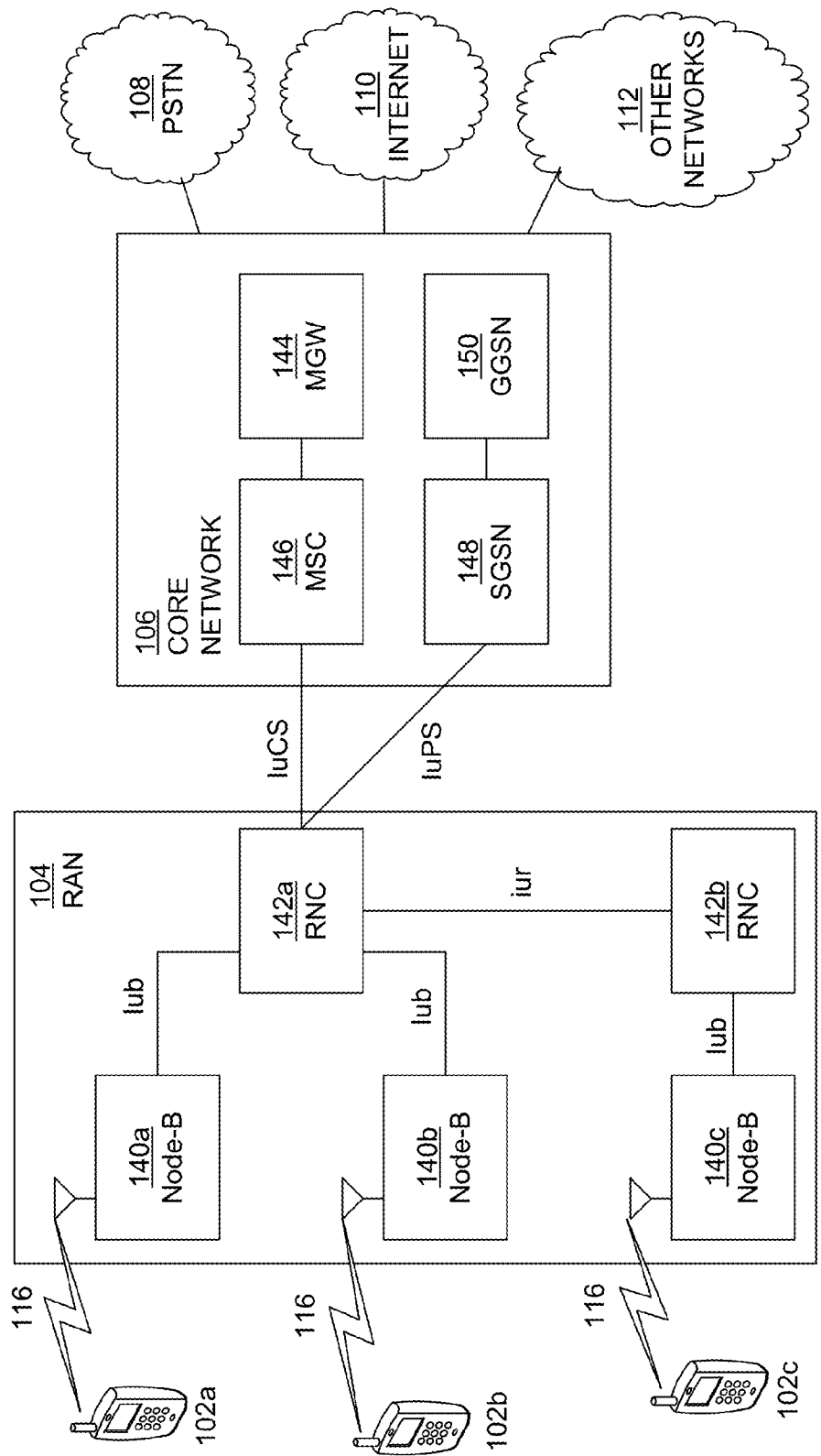
FIGS. 1C, 1D, and 1E are system diagrams of representative radio access networks and representative core networks that may be used within the communication system illustrated in FIGS. 1A and/or 1B.

FIG. 1C is a system diagram illustrating a representative RAN 104 and a representative core network 106. As noted above, the RAN 104 may employ a UTRA radio technology to communicate with the WTRUs 102a, 102b, and 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, and 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
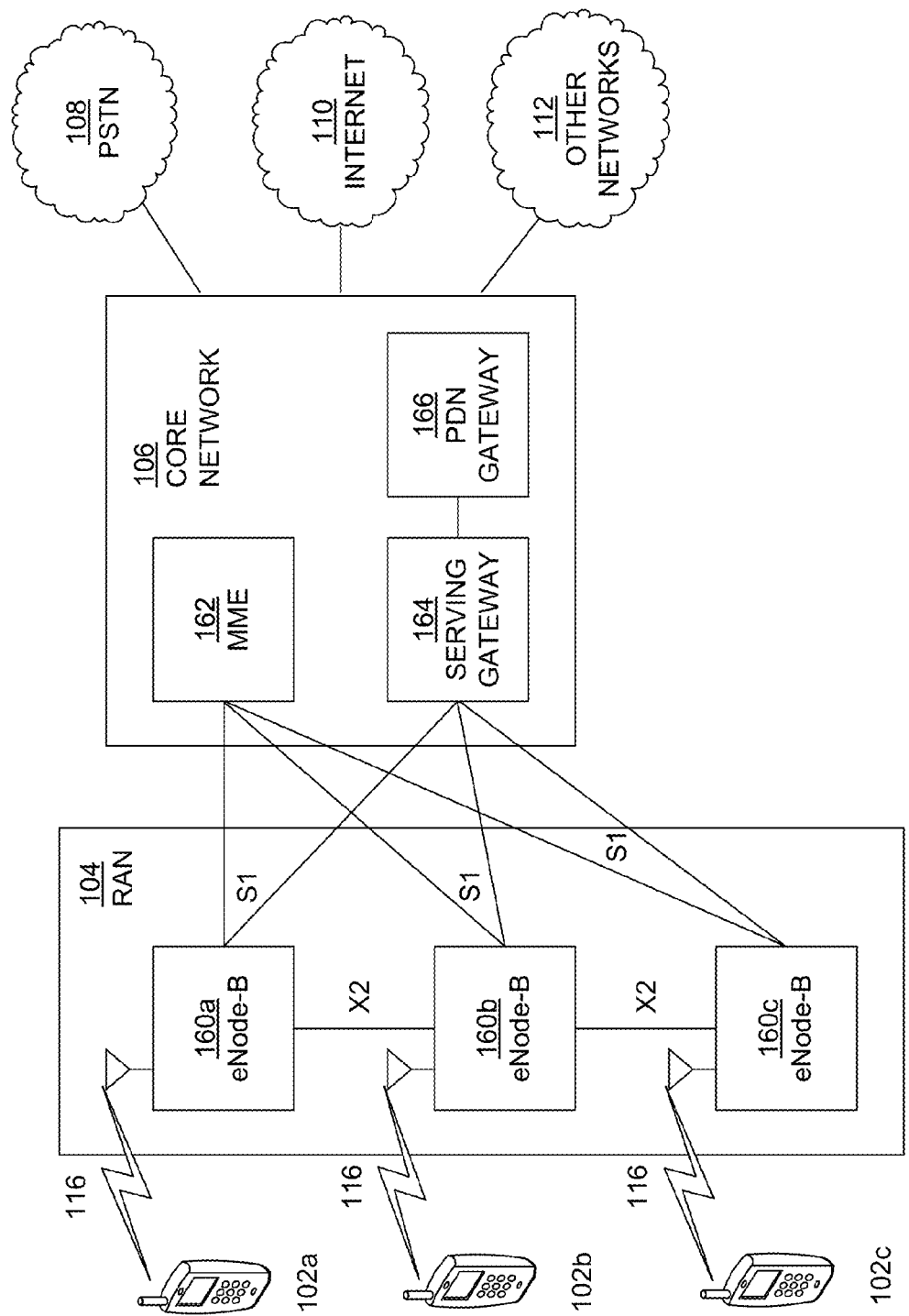

FIG. 1D is a system diagram of the RAN 104 and the core network 106 according to another embodiment. As noted above, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, and 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 106 shown in FIG. 1D may include a mobility management gateway (MME) 162, a serving gateway 164, and a packet data network (PDN) gateway 166. While each of the foregoing elements are depicted as part of the core network 106, it will be appreciated that any one of these elements may be owned and/or operated by an entity other than the core network operator.

The MME 162 may be connected to each of the eNode-Bs 160a, 160b, and 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, and 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, and 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

Figure 1E:
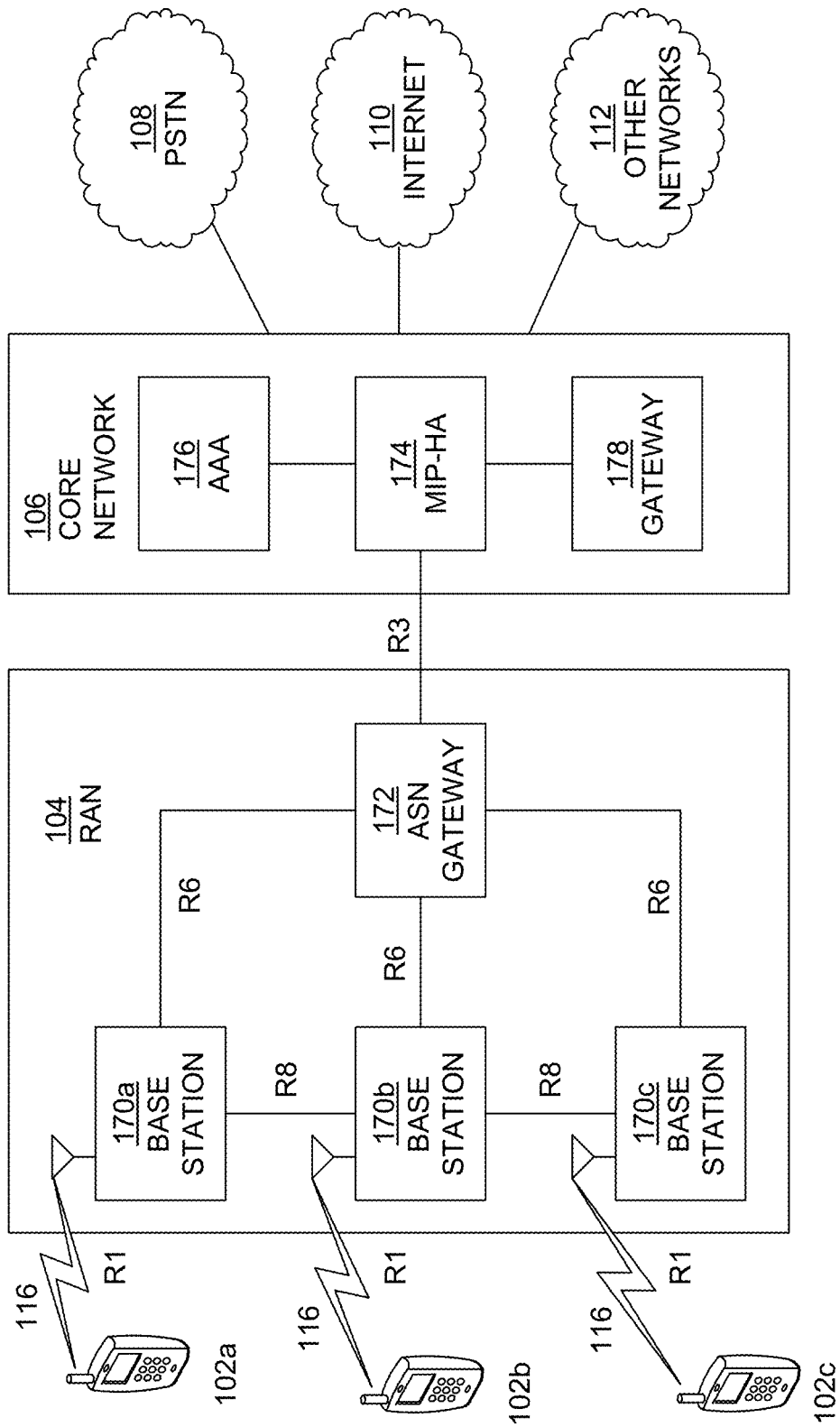

FIG. 1E is a system diagram of the RAN 104 and the core network 106 according to another embodiment. The RAN 104 may be an access service network (ASN) that employs IEEE 802.16 radio technology to communicate with the WTRUs 102a, 102b, and 102c over the air interface 116. As will be further discussed below, the communication links between the different functional entities of the WTRUs 102a, 102b, 102c, the RAN 104, and the core network 106 may be defined as reference points.

As shown in FIG. 1E, the RAN 104 may include base stations 170a, 170b, 170c, and an ASN gateway 172, though it will be appreciated that the RAN 104 may include any number of base stations and ASN gateways while remaining consistent with an embodiment. The base stations 170a, 170b, 170c may each be associated with a particular cell (not shown) in the RAN 104 and may each include one or more transceivers for communicating with the WTRUs 102a, 102b, 102c over the air interface 116. In one embodiment, the base stations 170a, 170b, 170c may implement MIMO technology. Thus, the base station 170a, for example, may use multiple antennas to transmit wireless signals to, and receive wireless signals from, the WTRU 102a. The base stations 170a, 170b, 170c may also provide mobility management functions, such as handoff triggering, tunnel establishment, radio resource management, traffic classification, quality of service (QoS) policy enforcement, and the like. The ASN gateway 172 may serve as a traffic aggregation point and may be responsible for paging, caching of subscriber profiles, routing to the core network 106, and the like.

The air interface 116 between the WTRUs 102a, 102b, 102c and the RAN 104 may be defined as an R1 reference point that implements the IEEE 802.16 specification. In addition, each of the WTRUs 102a, 102b, and 102c may establish a logical interface (not shown) with the core network 106. The logical interface between the WTRUs 102a, 102b, 102c and the core network 106 may be defined as an R2 reference point, which may be used for authentication, authorization, IP host configuration management, and/or mobility management.

The communication link between each of the base stations 170a, 170b, and 170c may be defined as an R8 reference point that includes protocols for facilitating WTRU handovers and the transfer of data between base stations. The communication link between the base stations 170a, 170b, 170c and the ASN gateway 172 may be defined as an R6 reference point. The R6 reference point may include protocols for facilitating mobility management based on mobility events associated with each of the WTRUs 102a, 102b, 100c.

As shown in FIG. 1E, the RAN 104 may be connected to the core network 106. The communication link between the RAN 104 and the core network 106 may defined as an R3 reference point that includes protocols for facilitating data transfer and mobility management capabilities, for example. The core network 106 may include a mobile IP home agent (MIP-HA) 174, an authentication, authorization, accounting (AAA) server 176, and a gateway 178. While each of the foregoing elements are depicted as part of the core network 106, it will be appreciated that any one of these elements may be owned and/or operated by an entity other than the core network operator.

The MIP-HA 174 may be responsible for IP address management, and may enable the WTRUs 102a, 102b, and 102c to roam between different ASNs and/or different core networks. The MIP-HA 174 may provide the WTRUs 102a, 102b, 102c with access to packet-switched networks, such as the Internet 110, to facilitate communications between the WTRUs 102a, 102b, and 102c and IP-enabled devices. The AAA server 176 may be responsible for user authentication and for supporting user services. The gateway 178 may facilitate interworking with other networks. For example, the gateway 178 may provide the WTRUs 102a, 102b, 102c with access to circuit-switched networks, such as the PSTN 108, to facilitate communications between the WTRUs 102a, 102b, and 102c and traditional land-line communications devices. In addition, the gateway 178 may provide the WTRUs 102a, 102b, 102c with access to the networks 112, which may include other wired or wireless networks that are owned and/or operated by other service providers.

Although not shown in FIG. 1E, it will be appreciated that the RAN 104 may be connected to other ASNs and the core network 106 may be connected to other core networks. The communication link between the RAN 104 the other ASNs may be defined as an R4 reference point, which may include protocols for coordinating the mobility of the WTRUs 102a, 102b, 102c between the RAN 104 and the other ASNs. The communication link between the core network 106 and the other core networks may be defined as an R5 reference, which may include protocols for facilitating interworking between home core networks and visited core networks.

A mobile user may choose from a wide range of technologies to access networks such as GPRS, EDGE, 3G and/or 4G for wide area access, and/or WiFi for local area access. Mobile hosts are increasingly becoming multi-homed (e.g., connected via multiple access technologies and/or multi-access points) and may possess two or more heterogeneous interfaces. Internet content is being increasingly distributed (e.g., over a "cloud") such that content delivery is becoming more complex (e.g., to get the right content from the right location).

Although the MDT WTRUs are described herein as using, for example, an LTE-based communications system, it is contemplated that other communication systems may be used with the MDT WTRUs such that, for example, procedures for QoS validation measurements may be taken by such WTRUs in the other communications systems and transmitted (report the QoS validation measurements) as appropriate, for example, to the network operator via the system.

Although the receiver is described in FIGS. 1A-1E as a wireless terminal, it is contemplated that in certain representative embodiments that such a terminal may use wired communication interfaces with the communication network.

In certain representative embodiments, a MDT QoS Procedure may be used with predesigned non-user data Transmit (Tx)/Receive(Rx) testing.

In certain representative embodiments, a MDT activation triggering condition may be implemented and a WTRU may handle the activation condition via one or more specific actions.

In certain representative embodiments, measurement objects for QoS verification MDT sessions may be implemented. The measurement objects may include objects on Packet Data Convergence Protocol (PDCP), Radio Link Control (RLC) and/or Media Access Control (MAC) levels (or layers).

In certain representative embodiments, procedures may be implemented for the WTRU measurements that the WTRU may perform for QoS verification and the corresponding WTRU actions.

In certain representative embodiments, non-user data may be used for MDT tests.

In certain representative embodiments, a test Data Radio Bearer (DRB) and associated data generator at the PDCP level or above the PDCP level may be used.

In certain representative embodiments, a MAC level data generator may be used. The data generator may be configured to generate non-user data for the measurement object. The WTRU may measure and report the observed QoS measurement on measurement objects.

In certain representative embodiments, a procedure may be implemented to handle the measurement results, and may include, for example, a procedure to post-process the measurement data.

In certain representative embodiments, a procedure may be implemented to report the MDT results, and may include a procedure for modified immediate reporting, event triggered reporting and/or delayed reporting.

In certain representative embodiments, a procedure may be implemented to terminate an MDT session, and may include network-triggered termination, timer/amount of report based procedures and/or implicit rules to terminate the WTRU's MDT session.

The MDT may allow minimization of the NO's maintenance driving test effort by selecting and using ordinary WTRUs to perform and report certain measurements, which the NO may use for example, for coverage optimization. These measurements may help to understand the location of coverage holes, strong interference conditions, which may lead to degradation in user perceived quality of service. Measurements, signaling and procedures may be defined to support MDT. The network may configure MDT supporting WTRUs to perform MDT specific measurements. The MDT actions may include: (1) logging MDT measurement while the WTRUs are in idle mode; and (2) immediate MDT measurements and reporting while the WTRUs are in connected mode. In certain representative embodiments, the mechanisms may be implemented using control plane procedures. For immediate MDT measurements in connected mode, the network may request the WTRUs to perform certain measurements, and the WTRUs may execute the MDT request with a small delay (e.g., less than a threshold delay) or no delay and may report the findings immediately.

For logging MDT measurements in idle mode, a WTRU may be configured for MDT measurements in connected mode. The WTRU may subsequently begin measurements in idle mode and may indicate availability of MDT measurements by a one-bit indicator, in an RRCConnectionSetupComplete message. The RRCConnectionSetupComplete message may be sent at transitions (e.g., every transition) to Radio Resource Control (RRC) connected mode, even if the logging period has not ended. The network may decide to retrieve the logged measurements based on this indication using the WTRU Information Request. Upon receiving the WTRU Information Request, the WTRU may report its MDT log to the network in the WTRU Information Response message. In case logged MDT measurements are retrieved before the completion of the pre-defined logging duration, the reported measurement results may be deleted. MDT measurement logging may continue according to an ongoing logged MDT configuration.

In case the network does not retrieve logged MDT measurements, the WTRU may store non-retrieved measurements for up to 48 hours (e.g., in a range of about 24 to 72 hours) from the instant the duration timer for logging expired such that the measurements may not be stored beyond this period and/or related (e.g., all related) MDT configurations and logging may be removed by the WTRU at switch off (e.g., when the MTD mode is disabled).

Besides using the MDT for coverage optimization, the MDT may be used for Quality of Service (QoS) verification to measure user's QoS Key Performance Indicator (KPI), may use the information to assist the NO to identify the root cause of conditions (e.g., critical conditions) causing low QoS (e.g., below a threshold level) and may determine whether to change the network configuration, parameter settings and/or provide capacity extensions.

The MDT QoS use cases may include, for example:
(1) usage of WTRU specific QoS measurements to verify performance relevant to end user perception.
(This may allow detecting conditions and determining whether to change the network configuration, parameter settings and/or provide capacity extension, among others.)
(2) usage of WTRU location information to enable a QoS benchmarking geographical map; and/or
(3) correlation of WTRU specific QoS measurements with other available information (e.g., link adaptation information, for example, for root cause analysis to find factors determining observed QoS.

For example, throughput QoS measurement may be taken into account, and other QoS related measurements may be considered. Other available information to be taken into account may include: (1) user-perceived non-availability of connection, (e.g., lack of coverage); (2) frequent connection recovery; and/or (3) frequent handover, among others. The actual coverage is contemplated to be verified primarily with other measurements (e.g., other than QoS) defined for coverage optimization use case.

QoS related measurement and logging performed in the WTRU may be considered (e.g., unless the same level of enhancement may be obtained, on a case-by-case basis, by measurements and logging in UTRAN/E-UTRAN).

Reasons for unexpectedly low QoS may be different (e.g., coverage, load and/or user mobility). Low QoS or other problems may occur at a border region of several cells or may be localized in a cell due to particular propagation conditions or uneven traffic distribution. Viewing (e.g., only looking at) cell level statistics may not be an effective way to determine the origin of a problem to take proper actions (e.g., whether to increase coverage, increase capacity and/or to change the Radio Resource Management (RRM) settings).

The verification of the QoS may be a task of the drive test campaigns to provide a reliable statistical analysis of perceived QoS user experiences and, without MDT, extensive drive tests may be performed with huge costs to the operators.

By periodically (e.g., automatically, and/or systematically) collecting such measurements (for example, for certain periods (e.g., short periods) using a number (e.g., limited number) of WTRUs) may be more cost effective and more reliable from a statistical point of view.

Certain MDT procedures may be inefficient in handling the complexity of the QoS verification. Operator may collect a large number of MDT logs to find a useful one for verifying the network and/or WTRU's QoS at a given location or map QoS conditions based on WTRU location with unpredictable user traffic patterns. The network operator may prefer to have a controlled mechanism to collect QoS throughput and latency statistics at various locations in a cell to generate accurate QoS verification maps.

In certain representative embodiments, a MDT procedure may be implemented which may allow the operator to configure MDT test cases which may use non-user traffic to test or verify the user's perceived QoS under conditions that may be interesting to or desired by the operator.

The MDT QoS verification procedures may include a WTRU based MDT controlled QoS verification test mechanisms independent from the normal user traffic data to enable the operators to conduct the QoS verification according to the specific rules, polices and/or needs of the network deployment and/or individual cell management.

This may allow additional control available to the operator, by employing in the user-data independent drive test scheme with the predetermined test scenarios and test data (e.g., the tests may be easier to setup and perform and the test results easier to analyze and conclude from the operator's perspective). One application of this scheme may be that the maximum throughput measurement may be devised with the desired maximum rate under desired traffic/channel conditions, cell locations, and/or time.

The MDT QoS verification tests may be configured with certain predetermined test scenarios and predetermined test data and known content patterns for various QoS verification target goals.

For the MDT QoS verification operations described herein, the QoS verification controlled test may be used alone for single purpose QoS verification such as the maximum data throughput test and measurements or it may be conducted together with user-data traffic (e.g., to gather higher layer user-experience related QoS verifications).

For the MDT QoS verification procedures, the following categories of test setup may be predesigned and/or predetermined:

(1) Test Data Generation (e.g., at least two different kinds of data blocks of variable sizes may be generated, (for example, random data bits or predefined patterned data bits)). The predefined patterned data block (or desired media access control (MAC) transport block (TB) padding pattern) may be a block of data bits of a certain size in a certain content pattern such as a block of 1000 bits (or a MAC TB) in a content pattern of all 0s or all 1s or alternating 1s and 0s, among others. The known patterned data testing may be aimed at the near-accurate error rate measurement. The data block size may be: (1) predetermined; (2) in a "full buffer" sized or "a half buffer" sized configuration; and/or (3) variable sizes generated by a probability over size range; The Test Data Generator may be located on different user-plane protocol layers (e.g., it may be located: (1) at the MAC layer to have direct measurements on the data Tx/Rx, bit error rate (BER) and/or block error rate (BLER); (2) on top of the packet data convergence protocol (PDCP) for the measurement of the whole stack delay effect; or at the PDCP to test the radio link control(RLC)/MAC combined effect of QoS on missing packets/segments.

(2) Test data radio bearer DRB definitions (e.g., the transmission and receive paths at the WTRU in terms of accommodating the PDCP (at PDCP or above) based test generation and reception). One or more of the test DRBs with its protocol layer configurations and its specific test parameters may be configured (e.g., in detail) or signaled to a predetermined setup.

(3) Specific test parameters (e.g., certain specific test details (e.g., such as: (1) whether a specific Tx diversity mode may be used, if the WTRU may be capable of uplink spatial multiplexing (one MAC transport block or two TBs); and/or (2) whether the WTRU may be performing the test with more than one cell or carrier (e.g., the primary cell (PCell) and/or a secondary cell (SCell)) simultaneously or the number (0, 1, 2, . . . ) of hybrid automatic repeat (HARQ) retransmissions that may be performed per HARQ transmission, among others.

(4) Test scenario set, (e.g., a set of defined test actions such as first transmitting a block of a certain amount of data bits within a certain amount of time 1 and then (with or without a defined pause time) transmitting another block of a certain other amount of data bits within a certain amount of time 2, and then stopping naturally or at a specific stop timer mark. This scenario may be exercised for a "test DRB" or a set of test DRBs.

These test setups may be consistently known to the WTRU and to the network to be configured, utilized, and/or performed on both the WTRU side and the network side in synchronization.

The MDT QoS verification procedure may be activated (e.g., only be activated) under certain specified conditions (e.g., the WTRU may execute the configured MDT QoS verification test only in the areas defined in a configuration command).

The WTRU may report (e.g., only report) the test/measurement results to the network/cells where the configured measurement/test may be valid or may report the test result to cells belong to the networks of the same NO.

Example MDT Session: eNB Configures the WTRU for the QoS Verification Test

The following are representative scenarios illustrating command sequences for the MDT QoS verification operations under various representative network environments.

In certain representative embodiments, a MDT QoS verification control and execution sequence may be used such that the MDT WTRU may: (1) receive the QoS verification configuration; (2) event-trigger the configured QoS verification procedure; (3) receive further detailed QoS test DRB and/or test data, among others; (4) perform the data traffic generation and/or measurements; and/or (5) report the measured result.

Figure 2:
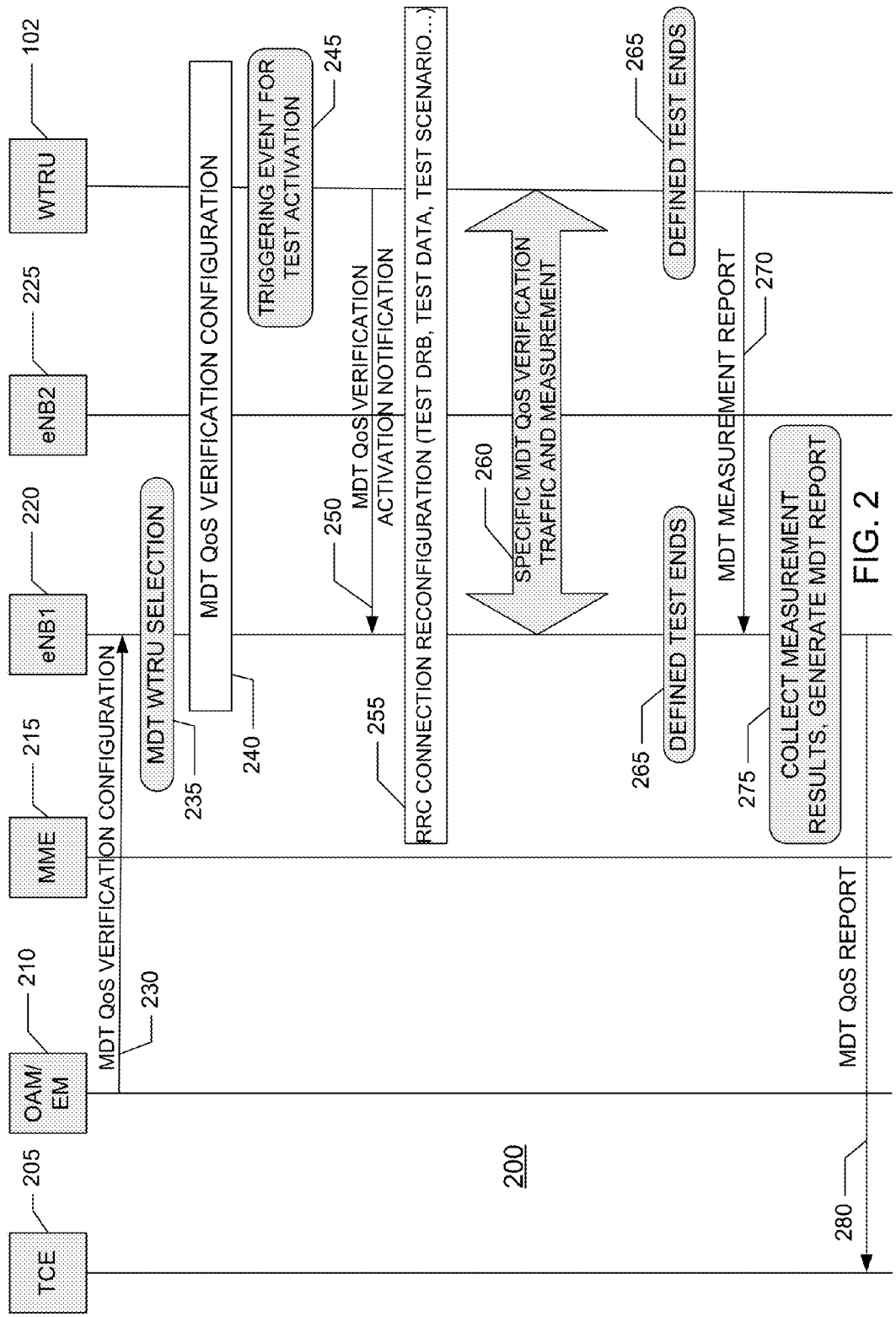
FIG. 2 is a diagram illustrating a representative procedure for an access point (e.g., eNB) configured WTRU MDT QoS verification control sequence.

FIG. 2 is a diagram illustrating a representative procedure 200 for an access point (e.g., eNB) configured WTRU MDT QoS verification control sequence.

Referring to FIG. 2, a QoS verification system may include a Transmission Control Element (TCE) 205, an MDT Operations Administration and Maintenance (OAM) or Element Manager (EM) (hereafter referred to as an OAM/EM) 210, an MME 215, a first eNB 220, a second eNB 225 and/or a WTRU 102, among others.

At operation 230, the OAM/EM 205 may send to the eNB 220, a MDT QoS verification configuration message, in which MDT QoS verification test parameters for a chosen QoS verification may be included. At operation 235, the eNB 220 may select an appropriate WTRU 102 (e.g., a MDT QoS verification capable WTRU in connected mode) for the verification task. At operation 240, the eNB 220 may configure the WTRU 102 for the QoS verification test via either an existing RRCConnectionReconfiguration or a new RRC message. At operation 245, the MDT QoS verification procedure may be triggered by a predefined event condition.

At operation 250, the WTRU 102 may send an MDT QoS verification activation notification message to the eNB 220. This may be an RRC message or a MAC CE, notifying the eNB 220 on the readiness of starting the procedure. At operation 255, the eNB 220 may reconfigure the WTRU 102 for the test data radio bearer (DRB), test data, test scenarios, and/or other parameters such as the activation time to synchronize the verification procedure. At operation 260, the QoS verification traffic may be generated and the QoS may be measured (e.g., the WTRU 102 may measure the DL traffic QoS, and the eNB 220 may measure the uplink traffic QoS). At operations 265, the test may end for both the eNB 220 and WTRU 102. At operation 270, the WTRU 102 may report the QoS measurement results via the RRC "Measurement Report" message.

For immediate report mode, the measured results may periodically be reported to the eNB 220. The report interval may be configured or test scenario defined. In case of event-triggered reports, the message may be sent when the report event condition is met.

At operation 275, the eNB 220 may aggregate measurement results (e.g., all measurement results) and may generate the measurement report. At operation 280, the eNB 220 may send the MDT QoS report to the TCE 205.

Example MDT Session: MME Configures the WTRU for the QoS Verification Test

The following may be another representative MDT QoS verification control and execution sequence. After the MDT WTRU 102 receives the QoS verification configuration and event-triggers the configured QoS verification procedure, the MDT WTRU 102 may invoke a NAS message to report the triggering. Subsequent WTRU reception of the further detailed QoS test DRB and test data etc may have MME involvement.

Figure 3:
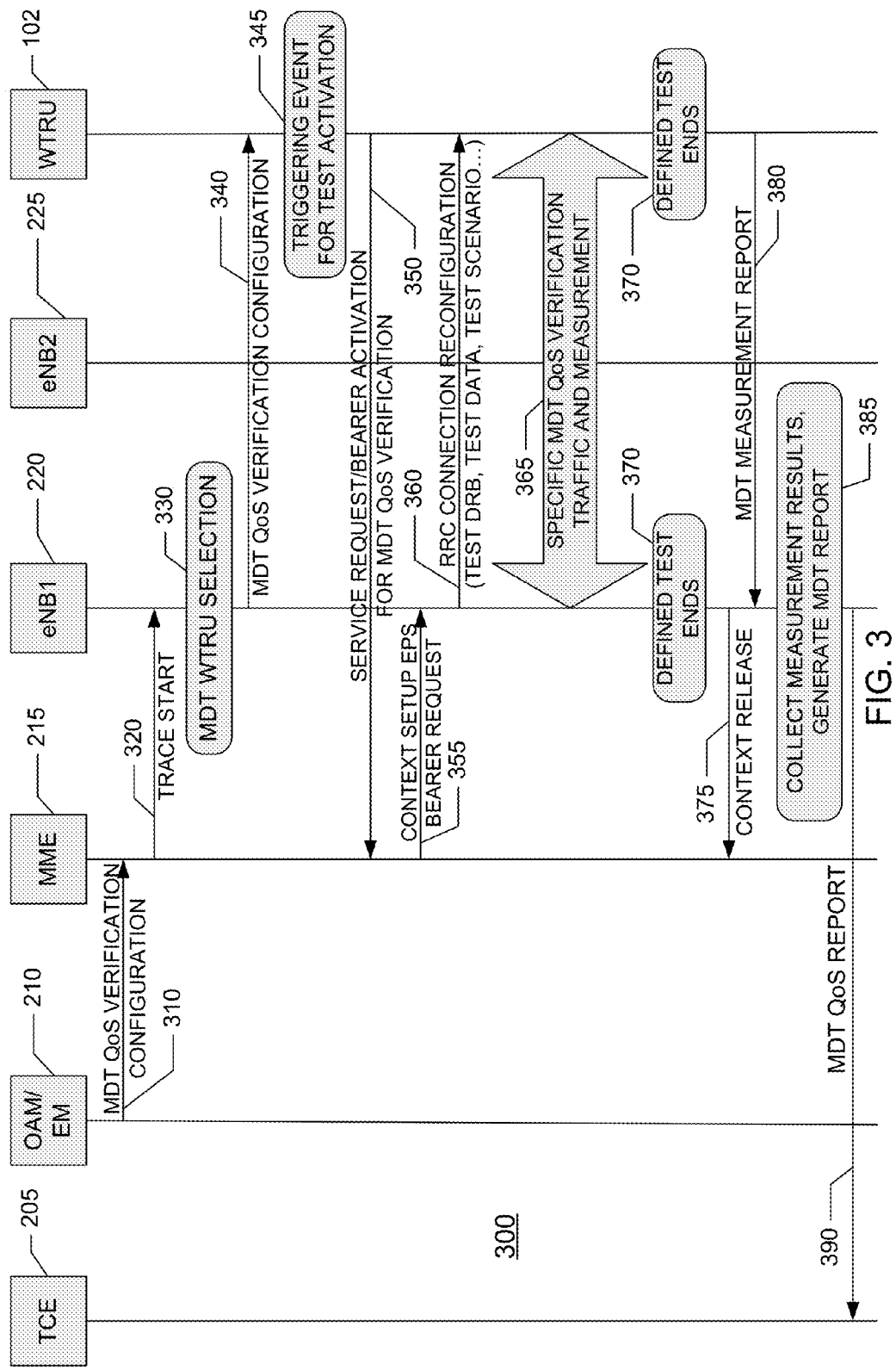
FIG. 3 is a diagram illustrating a representative procedure for a MME configured WTRU MDT QoS verification control sequence.

FIG. 3 is a diagram illustrating a representative procedure 300 for a MME 215 configured WTRU MDT QoS verification control sequence.

Referring to FIG. 3, at operation 310, the MDT OAM/EM 210 may send to the MME 215 the MDT QoS verification configuration message such that MDT QoS verification test parameters for a chosen QoS verification are included. At operation 320, the MME 215 may select the eNB 220 for the QoS verification site and may send a trace start message. At operation 330, the eNB 220 may select an appropriate WTRU 102 (e.g., a MDT QoS verification capable WTRU in the connected mode) for the verification task. At operation 340, the eNB 220 may configure the WTRU 102 for the QoS verification test either via the existing RRCConnectionReconfiguration message (or measurement control) or a new RRC message. At operation 345, the MDT QoS verification procedure may be triggered by a predefined event condition.

At operation 350, the WTRU 102 may send a non-access stratum (NAS) message of an Extended Service Request (ESR) for the MDT QoS verification activation to the MME 215. The NAS message may be a modified ESR or a new NAS message. In the message, the WTRU 102 may indicate its TRACE-ID for the relevant MDT configuration. When the WTRU 102 is already in connected mode, the WTRU 102 may use a bearer resource allocation request. At operation 355, the MME 215 may command the eNB 22 to reconfigure the WTRU 102 with for the test DRB, test data, test scenarios, and/or other parameters, such as the activation time to synchronize the verification procedure, among others. The MME 215 may command the eNB 220 to reconfigure the WTRU 102 for a combined QoS test with both user-data and/or predetermined test data. At operation 360, the eNB 220 may reconfigure the WTRU 102 for the test DRB, test data, test scenarios, and/or the other parameters (such as the activation time to synchronize the verification procedure).

At operation 365, the QoS verification traffic may be generated and may be transmitted as configured and the QoS may be measured (e.g., the WTRU 102 may measure the DL traffic QoS and the eNB 220 may measure the uplink traffic QoS). At operation 370, the test may end. At operation 375, the eNB 220 may indicate to the MME 215 on the termination of the MDT (e.g., special MDT) QoS verification test context (e.g., by sending a MDT or other context release message to the MME 215). At operation 380, the WTRU 102 may report the QoS measurement results via the RRC Measurement Report message. For immediate report mode, the measured results may periodically be reported to the eNB 220. The report interval may be configured or the test scenario may be defined. At operation 385, the eNB 220 may aggregate measurement results (e.g., all measurement results) and may generate the measurement report. At operation 390, the eNB 102 may send the MDT report to the TCE 205.

Example MDT Session: MDT QoS Verification Test Under Handover (HO) Mobility

The following examples may be for active MDT sessions with mobility support, for example, over X2 or S1 handover (HO) scenarios in immediate report mode.

Figure 4A:
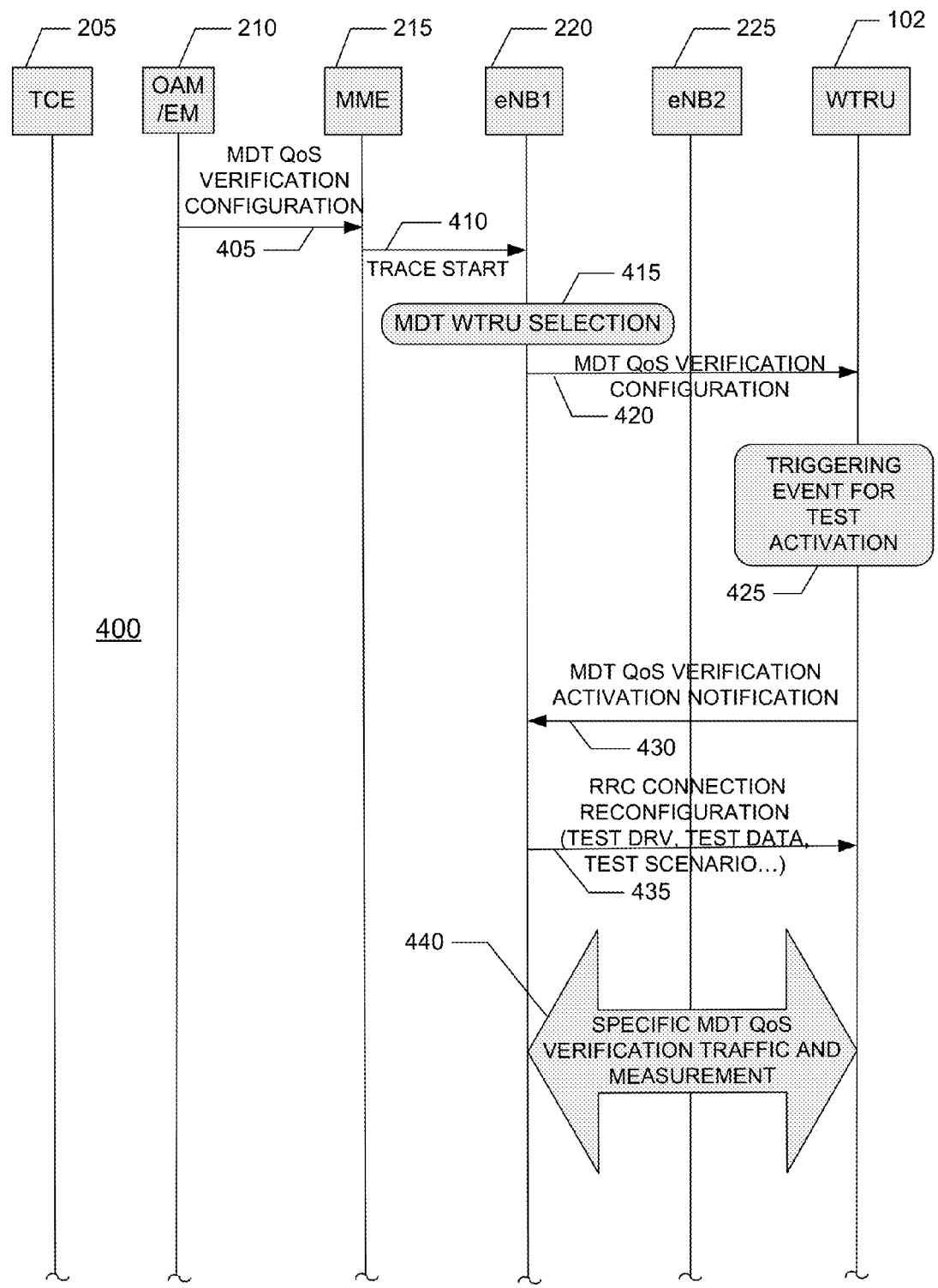
FIGS. 4A and 4B are a diagram illustrating a representative procedure using a MDT QoS verification control sequence with an X2 HO.
Figure 4B:
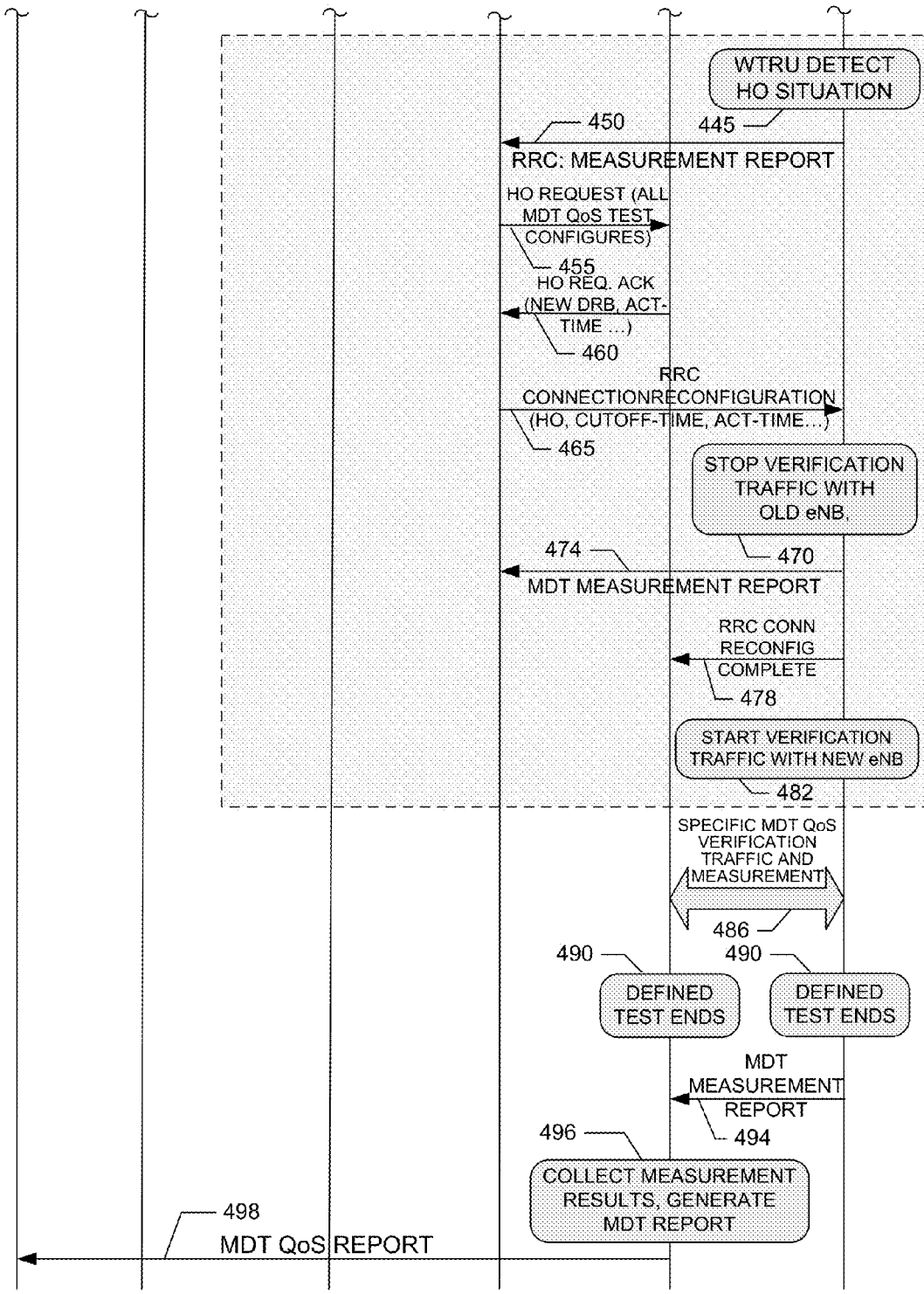

FIGS. 4A and 4B are a diagram illustrating a representative procedure 400 using a MDT QoS verification control sequence with an X2 HO.

Referring the FIGS. 4A and 4B, at operation 405, the MDT OAM/EM 210 may send to the MME 215 the MDT QoS verification configuration message such that the MDT QoS verification test parameters for a chosen QoS verification are included. At operation 410, the MME 215 may select the eNB 220 for the QoS verification site and may send a trace start message to the selected eNB 220. At operation 415, the eNB 220 may select an appropriate WTRU 102 (e.g., a MDT QoS verification capable WTRU in the connected mode) for the verification task. At operation 420, the eNB 220 may configure the WTRU 102 for the QoS verification test via either the existing RRCConnectionReconfiguration or a new RRC message. At operation 425, the MDT QoS verification procedure may be triggered by a predefined event condition. At operation 430, the WTRU 102 may send an MDT QoS verification activation notification message to the eNB 220. This may be an RRC message or a MAC CE, notifying the eNB 220 on the readiness of starting the procedure. At operation 435, the eNB 220 may reconfigure the WTRU 102 for the test DRB, test data, test scenarios, and/or other parameters, among others.

At operation 440, the QoS verification traffic may be generated and the QoS may be measured (e.g., the WTRU 102 may measure the DL traffic QoS and the eNB 220 may measure the uplink traffic QoS). At operation 445, when the WTRU 102 under test detects the eNB 220 and the eNB 225 coverage measurements change (e.g., indicating a possible mobility HO), the WTRU 102 may continue the ongoing MDT QoS verification test. At operation 450, the WTRU 102 may send a regular RRC Measurement Report message to the eNB 220. At operation 455, the eNB 220 may determine that a HO to the eNB 225 may be feasible, and may send the HO-Request message to the eNB 225 via the X2 interface. In the HO-Request message, new elements may carry the MDT QOS verification test parameters (e.g., all of the MDT QoS verification test parameters) that are added. The test parameters may include indicators indicating a time after which (e.g., at what time) the continued test may resume.

At operation 460, the eNB 225 may acknowledge the HO request, may send back the test DRB configurations and/or other parameters to enable the WTRU 102 with the MDT QoS verification test in the new cell and the acknowledgement may include an activation time for the continued test. At operation 465, the eNB 220 may send the RRCConnectionReconfiguration message to the WTRU 102, notifying the HO and/or the test DRBs in the new cell, among others. The message may include a cutoff time for the current ongoing test and an activation time for continuing the test in the new cell. At operation 470, the WTRU 102 may stop the test with the old cell (e.g., eNB 220) at the cutoff time. At operation 474, the WTRU 102 may send the RRC Measurement Report to the old cell (e.g., eNB 220), which may report the measured result until the cutoff time. At operation 478, the WTRU 102 may synchronize with the new cell and may send out an RRCConnectionReconfigurationComplete message, as the HO confirm to the new cell. At operation 482, at the activation time start, the test may be continued with the new cell (e.g., eNB 225). At operation 486, the WTRU 102 may continue the MDT QoS verification test from where it stopped with the new cell (e.g., eNB 225).

In certain representative embodiments, to test the HO interruption to the data QoS and data integrity, the operations 470 to 486 may provide that the WTRU 102 does not stop the test at the cutoff time and restart at the activation time, but rather continuing the test naturally with the bearer setup activities (i.e. release with the old cell, establish with the new cell). In this case, the cutoff time and activation time synchronization may not be used.

At operation 490, the test may end. At operation 494, the WTRU 102 may report the QoS measurement results via the RRC Measurement Report message to the eNB 225. For immediate report mode, the measured results may periodically be reported to the eNB 225. The report interval may be configured or test scenario defined. At operation 496, the eNB 225 may aggregate measurement results and may generate the measurement report. At operation 498, the eNB 225 may send the MDT report to the TCE 205.

Figure 5A:
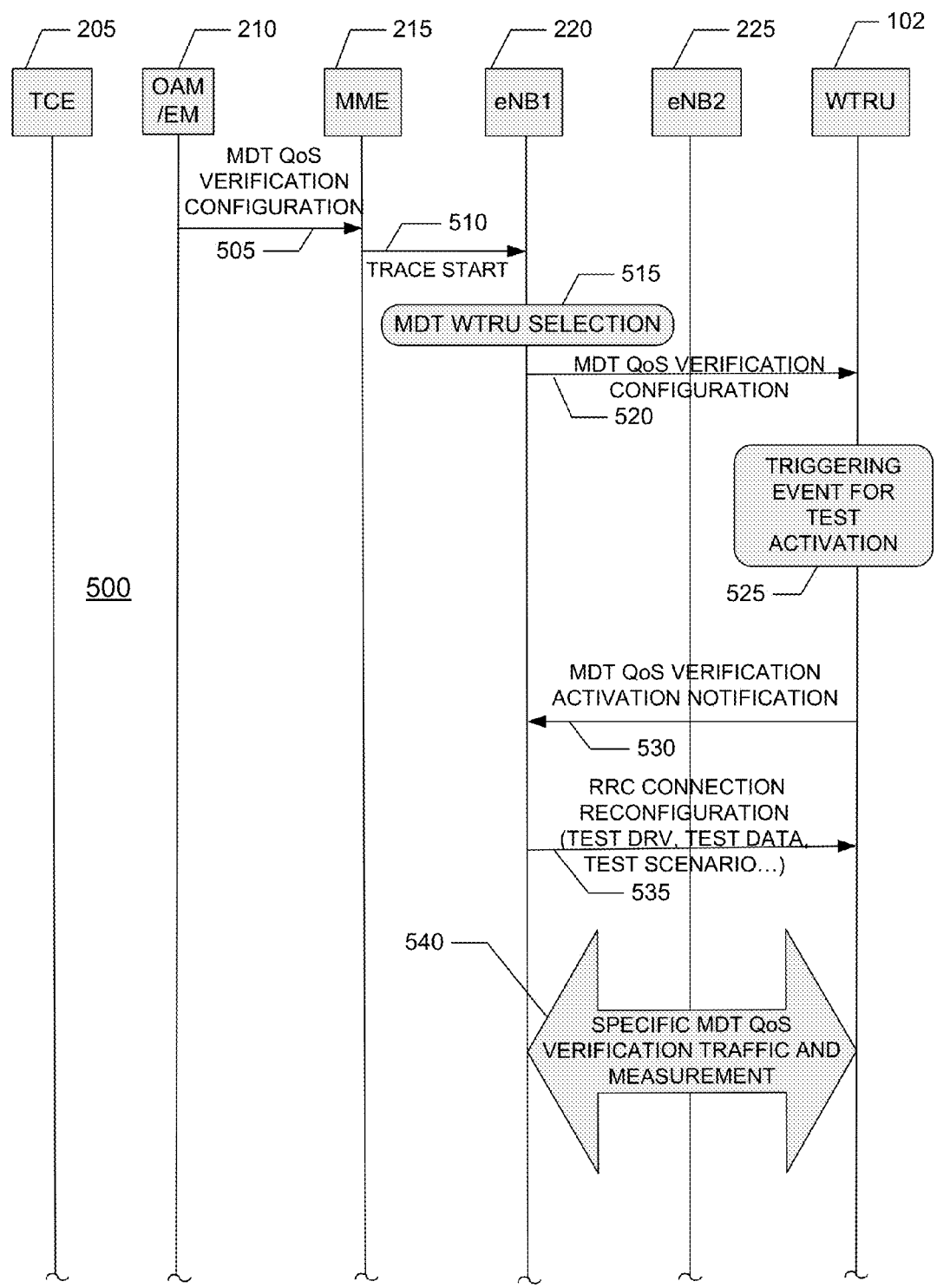
FIGS. 5A and 5B are a diagram illustrating a representative procedure using a MDT QoS verification control sequence with an S1 HO.
Figure 5B:
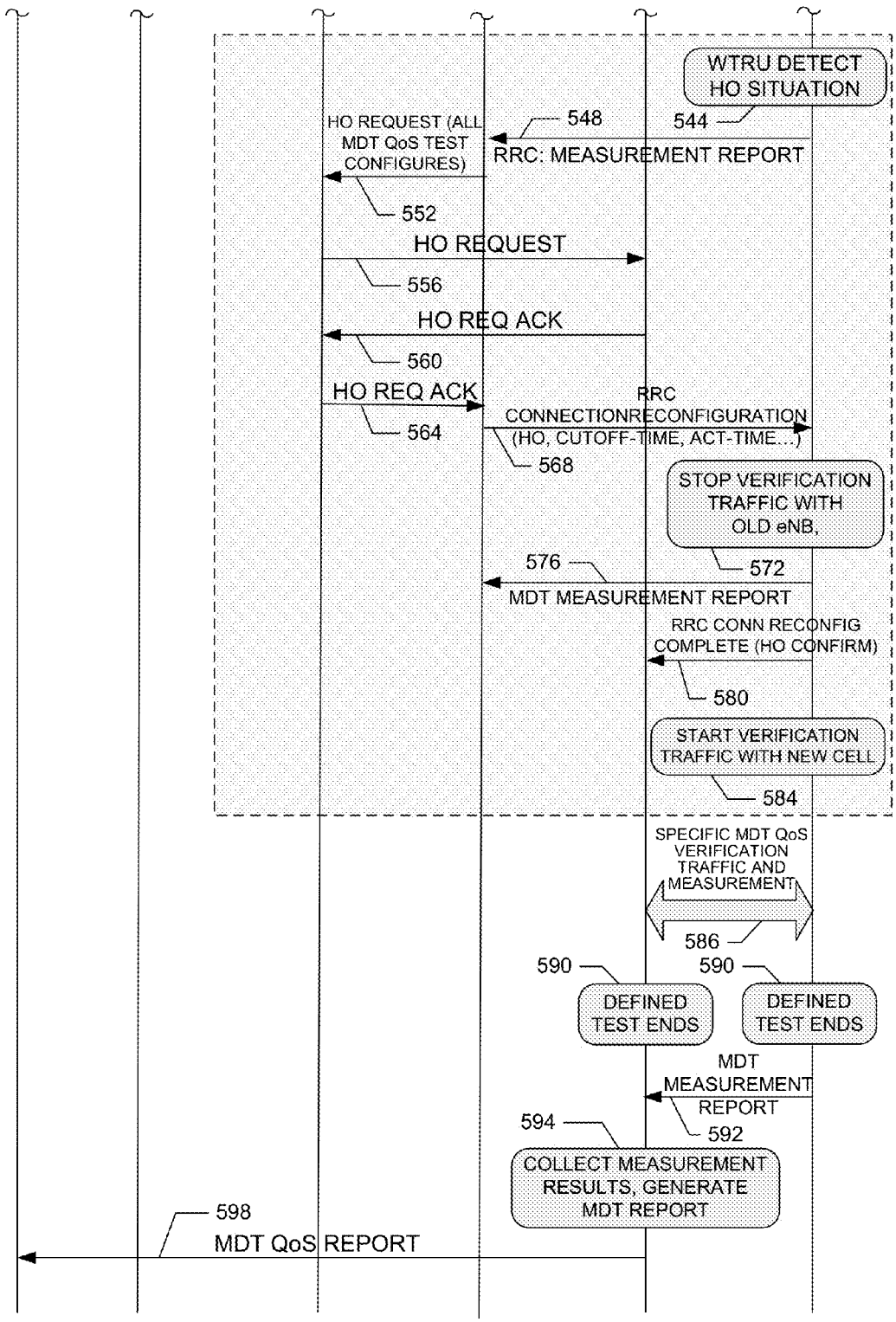

FIGS. 5A and 5B are a diagram illustrating a representative procedure 500 using a MDT QoS verification control sequence with an S1 HO.

Referring to FIGS. 5A and 5B, at operation 505, the MDT OAM/EM 210 may send to the MME 215 the MDT QoS verification configuration message such that MDT QoS verification test parameters for a chosen QoS verification are included. At operation 510, the MME 215 may select the eNB 220 for the QoS verification site and may send a trace start message to the eNB 220. At operation 515, the eNB 220 may select an appropriate WTRU 102 (e.g., a MDT QoS verification capable WTRU in the connected mode) for the verification task. At operation 520, the eNB 220 may configure the WTRU 102 for the QoS verification test via either the existing RRCConnectionReconfiguration or a new RRC message. At operation 525, the MDT QoS verification procedure may be triggered by a predefined event condition. At operation 530, the WTRU 102 may send an MDT QoS verification activation notification message to the eNB 220. This may be an RRC message or a MAC CE, notifying the eNB 220 on the readiness of starting the procedure.

At operation 535, the eNB 220 may reconfigure the WTRU 102 for the test DRB, test data, test scenarios, and/or other parameters such as the activation time to synchronize the verification procedure. At operation 540, the QoS verification traffic may be generated and the QoS may be measured (e.g., the WTRU 102 may measure the DL traffic QoS and the eNB 220 may measure the uplink traffic QoS). At operation 544, when the WTRU 102 under test detects that the eNB 220 and the eNB 225 coverage measurements have changed (e.g., indicating a possible mobility HO), the WTRU 102 may continue the ongoing MDT QoS verification test. At operation 548, the WTRU 102 may send a regular RRC Measurement Report message to the eNB 220. At operation 552, the eNB 220 may determine that an HO to another eNB 225 may be feasible and may send an HO-Request message to the MME 215 via the S1 interface. In the HO-Request message, new elements may carry the MDT QoS verification test parameters that may be added. The test parameters may include the indicators indicating a time after which the continued test may resume. At operation 556, the MME 215 may send the HO Request to the eNB 225 with relevant parameters from the eNB 220. At operation 560, the eNB 225 may acknowledge the HO request (that included the MDT QoS verification operation) and may send the HO Request ACK back to the MME 215 with the test DRB configurations and/or other parameters to enable the WTRU 102 with the MDT QoS verification test to operate in the new cell. The HO Request ACK may include an activation time for the continued test.

At operation 564, the MME 215 may send (or relay) the HO Request ACK from the eNB 225 to the eNB 220. At operation 568, the eNB 220 may send the RRCConnectionReconfiguration message to the WTRU 102, notifying the HO and/or the test DRBs in the new cell, among others. The message may include a cutoff time for the current ongoing test and an activation time for continuing the test in the new cell. At operation 572, the WTRU 102 may stop the test with the old cell (e.g., the eNB 220) at the cutoff time. At operation 576, the WTRU 102 may send the RRC Measurement Report to the old cell (e.g., the eNB 220), which may report the measured result until the cutoff time. At operation 580, the WTRU 102 may synchronize with the new cell and may send out the RRCConnectionReconfigurationComplete as the HO confirm to the new cell. At operation 584, at the activation time, the test (e.g., the continued test) may be started (e.g., restarted) with the new cell (e.g., the eNB 225). At operation 586, the WTRU 102 may continue the MDT QoS verification test from where it had stopped with the new cell (e.g., the eNB 225) using specific MDT QoS verification traffic and measurements of the traffic.

In certain representative embodiments, to test the HO interruption to the data QoS and integrity, the actions for operations 572 to 584 may be such that the WTRU 102 does not stop the test at the cutoff time and restart at activation time, but rather may continue the test naturally with the bearer setup activities (e.g., may release with the old cell and may establish with the new cell). In this case, the cutoff time and activation time synchronization may not be used.

At operation 590, the test may end. At operation 592, the WTRU 102 may report the QoS measurement results via the RRC Measurement Report message. For immediate report mode, the measured results may periodically be reported to the eNB 225. The report interval may be configured or test scenario defined. At operation 594, the eNB 225 may aggregate measurement results and may generate the final report. At operation 598, the eNB 225 may send the MDT report to the TCE 205.

Example MDT Session: Delayed MDT QoS Verification Test Reporting

In certain representative embodiments, a delayed report mode may be implemented. In the delayed reported mode, to reduce the total signaling traffic, the WTRU 102 may not report the measurement report in real time. Instead, the WTRU 102 may log the measurement report and report it at later time (e.g., for example based on delayed reporting criteria).

Figure 6:
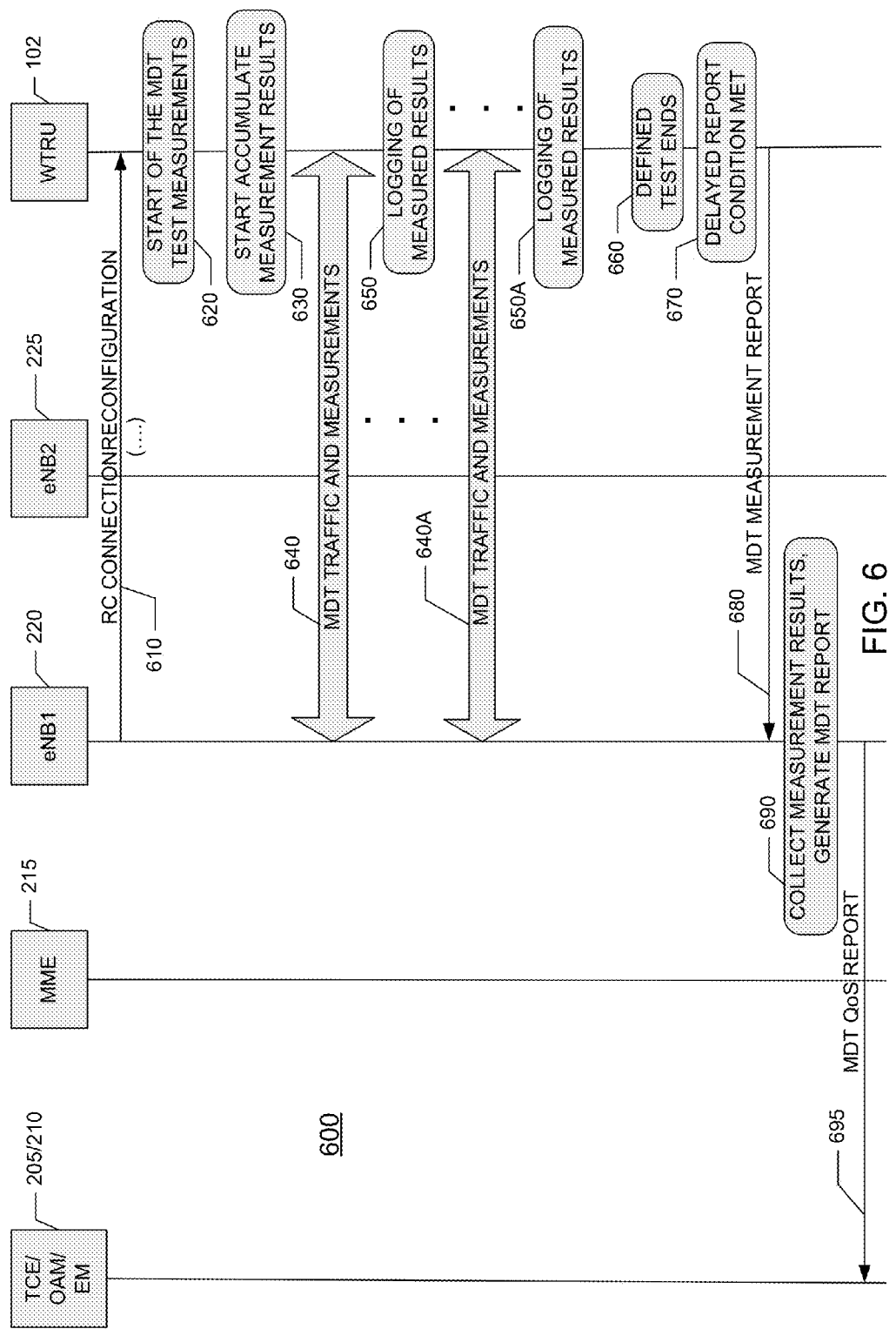
FIG. 6 is a diagram illustrating a representative procedure using delayed reporting for MDT QoS verification.

FIG. 6 is a diagram illustrating a representative procedure 600 using delayed reporting for MDT QoS verification.

Referring to FIG. 6, at operation 610, the eNB 220 may configure the WTRU 102 for the MDT test via an existing RRC message or a new RRC message. At operation 620, the MDT measurement action may be triggered by a predefined event condition. At operation 630, a logged data deposit may be started (e.g., measurements may begin to be stored in memory) to accumulate measurement results. At operation 640, the WTRU 102 may perform the MDT measurements (for example using a predetermined test case or directed by user input to provide the testing conditions and testing measurements). At operation 650, the WTRU 102 may record the results into the logged data deposit. Operations 640 and 650, may be repeated for any number of test cases as shown by operations 640A and 650A. At operation 660, the MDT measurement activity may finish.

At operation 670, the delayed report conditions may be met. The delayed report condition may be defined or configured as one or more of the following: (1) the configured WTRU MDT measurement/test ends; (2) a defined WTRU processing on the accumulated measurement results completes; (3) the delayed report timer of MDT report on the WTRU 102 expires; (4) the WTRU load or the network load allows the transmission of the final MDT measurement report; (5) the size of the logged data deposit on the WTRU 102 reaches (or hits) or exceeds the limit; and/or (6) the network solicits, among others.

At operation 680, the WTRU 102 may report the delayed measurement result log to the eNB 220. At operation 690, the eNB 220 may collect and/or aggregate the measurement results and may generate the MDT report. At operation 695, the eNB 220 may send the MDT report (e.g., MDT QoS validation report) to the TCE 205.

Example MDT Session: Idle Mode WTRU MDT QoS Verification Test Activation

Figure 7:
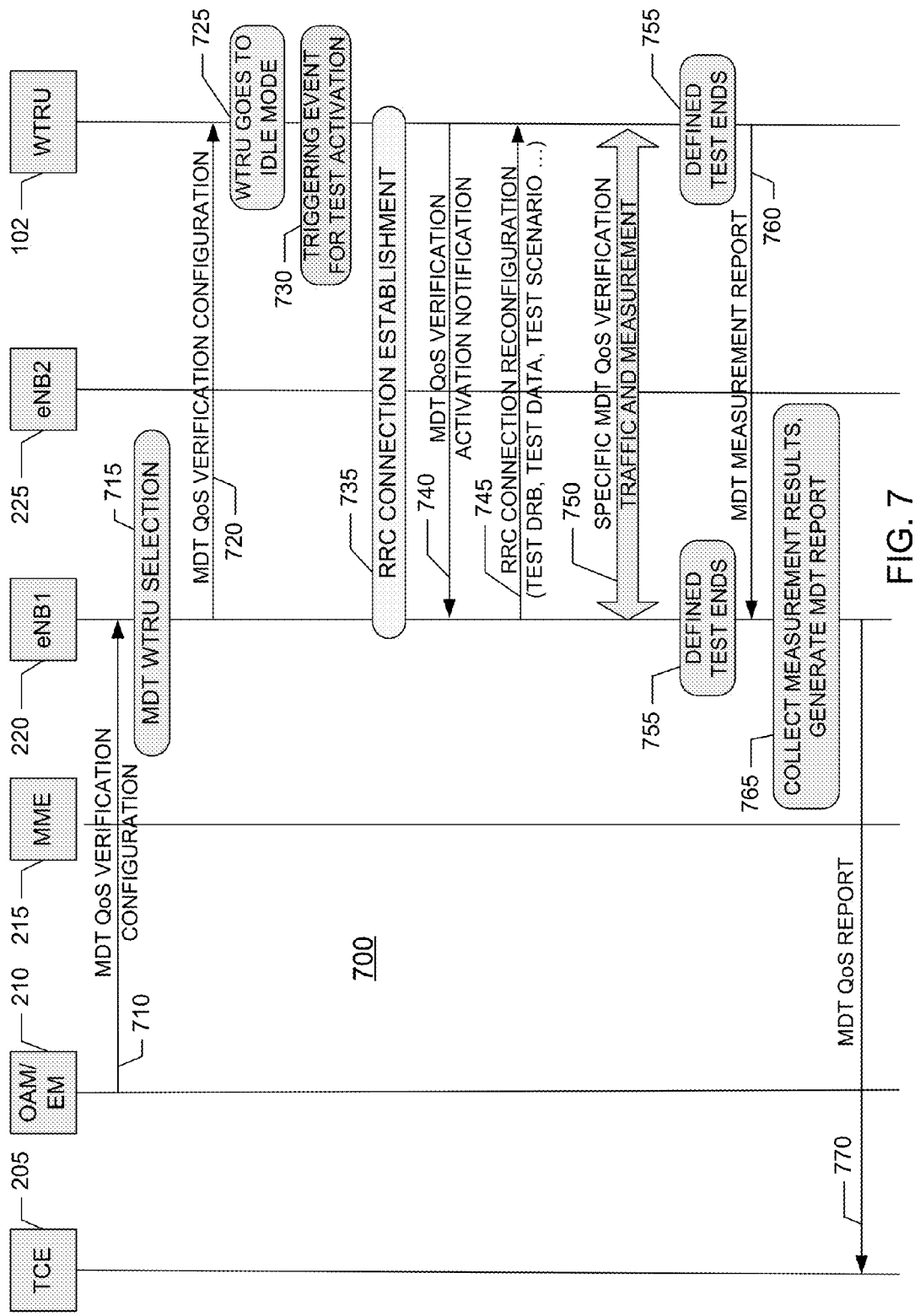
FIG. 7 is a diagram illustrating a representative procedure using a WTRU MDT QoS verification test activation sequence when the WTRU has gone to Idle mode after receiving the configuration.

FIG. 7 is a diagram illustrating a representative procedure 700 using a WTRU MDT QoS verification test activation sequence when the WTRU 102 has gone to (e.g., transitioned to) idle mode after receiving the test configuration. The procedure may enable the network to configure dormant MDT tests on the WTRU 102, allow the WTRU 102 to go back (e.g., transition) to IDLE mode (for example, to reduce power consumption) and trigger the MDT test only when one or more triggering conditions are met.

Referring to FIG. 7, at operation 710, the OAM/EM 205 may send to the eNB 220, a MDT QoS verification configuration message, in which MDT QoS verification test parameters for a chosen QoS verification may be included. At operation 715, the eNB 220 may select an appropriate WTRU 102 (e.g., a MDT QoS verification capable WTRU in connected mode) for the verification task. At operation 720, the eNB 220 may configure the WTRU 102 for the QoS verification test via either an existing RRCConnectionReconfiguration or a new RRC message. At operation 725, the WTRU 102 may go into idle mode. The WTRU 102 may check the MDT QoS verification activation conditions (e.g., even if it is in an idle state) (e.g., in the case that it has been configured for the MDT QoS verification test and/or the configuration validity time has not expired). At operation 730, the MDT QoS verification procedure may be triggered by a predefined event/activation condition. At operation 735, the WTRU 102 may perform the RRC Connection Establishment procedure for the configured test in which the WTRU 102 may indicate to the eNB 220: (1) that the RRC Connection may be established to conduct the configured MDT QoS verification test; and (2) information about the configured test. The information may be transmitted in one or more Information Elements (IEs) in the RRCConnectionComplete message alone, or may be transmitted in both the RRCConnectionRequest (cause) and the RRCConnectionComplete message (e.g., IE of the test info). The network may know how to handle the RRC Connection thereafter.

At operation 740, the WTRU 102 may send an MDT QoS verification activation notification message to the eNB 220. This may be an RRC message or a MAC CE, notifying the eNB 220 on the readiness of starting the procedure. At operation 745, the eNB may reconfigure the WTRU 102 for the test DRB, test data, test scenarios, and/or other parameters such as the activation time to synchronize the verification procedure. At operation 750, the QoS verification traffic (e.g., preplanned traffic for the MDT test based on, for example a test case (or test configuration)) may be generated and/or the QoS may be measured (e.g., the WTRU 102 may measure the DL traffic QoS and/or the eNB 220 may measure the uplink traffic QoS);

At operations 755, the test may end for both the eNB 220 and WTRU 102. At operation 760, the WTRU 102 may report the QoS measurement results via the RRC "Measurement Report" message to the eNB 220. For immediate report mode, the measured results may periodically be reported to the eNB 220. The report interval may be configured or test scenario defined. In case of event-triggered reports, the message may be sent when the report event condition is met.

At operation 765, the eNB 220 may aggregate measurement results (e.g., all measurement results) and may generate the measurement report. At operation 770, the eNB 220 may send the MDT QoS report to the TCE 205.

Figure 8:
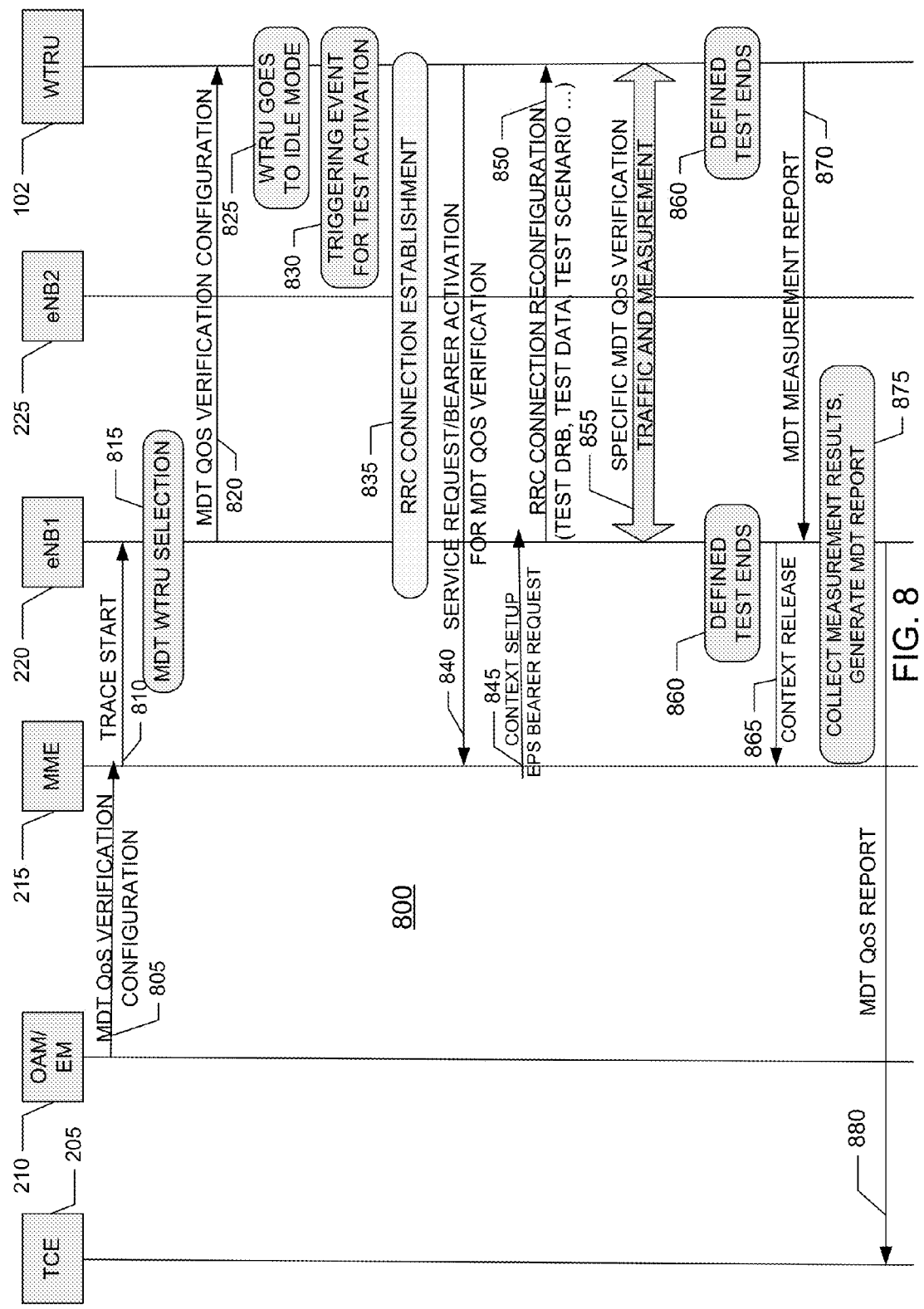
FIG. 8 is a diagram illustrating a representative procedure using an Idle Mode WTRU Test Activation Sequence which may be MME configured.

FIG. 8 is a diagram illustrating a representative procedure 800 using an idle mode WTRU test activation sequence which may be MME configured.

For the MDT WTRU 102 configured by the MME 215, the following may be a representative test activation sequence (e.g., when the WTRU 102 is in idle mode after the MDT QoS verification configuration).

Referring to FIG. 8, at operation 805, the MDT OAM/EM 210 may send to the MME 215 the MDT QoS verification configuration message such that MDT QoS verification test parameters for a chosen QoS verification are included. At operation 810, the MME 215 may select the eNB 220 for the QoS verification site and may send a trace start message to the eNB 220. At operation 815, the eNB 220 may select an appropriate WTRU 102 (e.g., a MDT QoS verification capable WTRU in the connected mode) for the verification task. At operation 820, the eNB 220 may configure the WTRU 102 for the QoS verification test either via the existing RRC-ConnectionReconfiguration (or measurement control) or a new RRC message. At operation 825 the WTRU 102 may go into (e.g., transition to) the idle mode. The WTRU 102 may check the MDT QoS verification activation conditions (e.g., even it may be in idle state) (e.g., in the case that it has been configured for the MDT QoS verification test and/or the configuration validity time has not expired). At operation 830, the MDT QoS verification procedure may be triggered by a predefined event/activation condition. At operation 835, the WTRU 102 may perform the RRC Connection Establishment procedure for the configured test, in which the WTRU 102 may indicate to the eNB 220: (1) that the RRC Connection may be established to conduct the configured MDT QoS verification test; and (2) the information about the configured test. The network may know how to handle the RRC Connection thereafter.

At operation 840, the WTRU 102 may send a NAS message of the extended service request (ESR) for MDT QoS verification activation to the MME 215. This NAS message may be a modified ESR or a new NAS message. In the message, the WTRU 102 may indicate its TRACE-ID for the relevant MDT configuration. At operation 845, the MME 215 may command the eNB 220 to reconfigure the WTRU 102 with for the test DRB, test data, test scenarios, and/or other parameters such as the activation time to synchronize the verification procedure. The MME 215 may command the eNB 220 to reconfigure the WTRU 102 for a combined QoS test with user-data and/or predetermined test data. For example, the MME 215 may send a context setup EPS bearer request to establish a context for the EPS bearer. At operation 850, the eNB may reconfigure the WTRU 102 for the test DRB, test data, test scenarios, and/or other parameters. At operation 855, the QoS verification traffic may be generated and transmitted, as configured, and the QoS may be measured (e.g., the WTRU 102 may measure the DL traffic QoS and/or the eNB 220 may measure the uplink traffic QoS).

At operations 860, the test may end for both the eNB 220 and the WTRU 102. At operation 865, the eNB 220 may send to the MME 215 a context release to release the previously setup context. At operation 870, the WTRU 102 may report the QoS measurement results via the RRC "Measurement Report" message to the eNB 220. For immediate report mode, the measured results may periodically be reported to the eNB 220. The report interval may be configured or test scenario defined. In case of event-triggered reports, the message may be sent when the report event condition is met.

At operation 875, the eNB 220 may aggregate measurement results (e.g., all measurement results) and may generate the measurement report. At operation 880, the eNB 220 may send the MDT QoS report to the TCE 205.

Representative QoS Verification with User-Data

QoS verification may be performed using user-data such that the WTRU 102 may be configured with measurement configuration for user-data resource bearers. User data measurements may be performed, respectively, at the different protocol layers of the user plane (e.g., the measurement of packet throughput, packet loss rate and/or packet latency of different user plane layers). These QoS measurements (e.g., more precise QoS measurements) may be used for the network parameters optimization.

The QoS measurement objects may be configured flexible by the network based on the specific uses. Location information of the WTRU 102 may be included in the QoS measurements and may be used for the network parameters optimization. The QoS experience of the same user may be different (e.g., remarkably different) when the user is in different mobility states. The QoS measurement under the different mobility states may be distinguished. For example, a mobility state indicator may be included in the QoS measurements.

The WTRU 102 may receive a MDT configuration with activation requirement. The activation of MDT session may take effect immediately or be triggered by a condition trigger or event trigger.

The WTRU 102 may be configured with a measurement configuration (or test case scenario) such as: (1) DL PDCP data throughput; (2) UL PDCP packet delay; (3) UL data discarded; (4) UL data discarded rate; (5) UL data loss; and/or (6) UL data loss rate. For example, the measurement configuration (or test case) may include the measurements to be taken, the user or non-user data traffic to be used in the test measurements, timing of the test measurements, and/or location and/or other triggering conditions associated with the test measurements, among others.

The WTRU 102 may save the measurement configuration. When the MDT session is activated, the WTRU 102 may take the configuration measurements at one or more measurement intervals (e.g., each measurement interval). In certain representative embodiments, the amount of measurements may be configured. If so, the WTRU 102 may stop the measurement when the WTRU 102 reaches the configured amount of measurements.

QoS Verification with Non-user Data

To allow greater operator control, the MDT QoS verification tests may be configured with certain predetermined test scenarios and predetermined test data and known content patterns for various QoS verification target goals.

A Test Data Generator (TDG) may be located on different user-plane protocol layers (e.g., the TDG may be located: (1) at the MAC layer to have direct measurements on the data Tx/Rx, BER and/or BLER, (2) on top of the PDCP for the measurement of the stack delay (e.g., whole stack delay) effect; or (3) at the PDCP to test the RLC/MAC combined effect of the QoS on missing packets/segments.

In the case of a PDCP TDG (e.g., located at or on top of the PDCP), the WTRU 102 may be configured with dedicated data radio bearers (test DRBs) to carry non-user data generated by the PDCP and associated traffic pattern and traffic characteristics. In case of MAC TDG (e.g., at the MAC layer), the MAC data may be transmitted using default radio bearer configurations and the data content may be configured or WTRU dependent.

In one representative example, the MAC TDG may be triggered by excess grants provided by the network for which the WTRU 102 may send padding frames. In another representative example, the WTRU 102 may generate non-user data at the MAC level.

The non-user data testing may be configured to run (e.g., only run) when no user data is present, or may run in conjunction with user data. If the non-user MAC test is to be continued in the presence of user-generated data, the priority and prioritized bit rate (PBR) of the non-user data may be configured by the network individually, or with a default value (e.g., best effort so that the WTRU 102 may apply the appropriate priority/PBR configuration when the non-user data is processed through the Link Control Protocol (LCP) algorithm.

Configuration Parameters

MDT QoS Verification configuration may include: (1) the MDT test/measurement activation/triggering conditions; (2) specific MDT testing configurations and/or (3) test termination configurations.

The specific MDT testing configurations may include: (1) measurement objects for testing, which may be a Radio Access Bearer (RAB) of certain QoS or may belong to a QoS group; (2) testing case configuration parameters; (3) testing data generator configuration parameters; (4) measurement configuration and/or (5) measurement report configurations.

The testing case configuration parameters may include parameters for testing DRB configuration for testing RAB QoS performance and/or testing MAC configuration for test MAC layer related QoS performance.

The TDG configuration parameters may include parameters for the PDCP TDG for RAB QoS performance and/or the MAC padding mechanism for MAC layer related QoS performance.

The measurement configuration may include the measurement interval; the amount of measurements; and/or the measurement KPIs.

The measurement report configurations may include the reporting mode, for example, periodic reporting, event triggered reporting, periodic with delayed reporting (e.g., logged), or event triggered with delayed reporting (e.g., logged), and may indicate the mode to network and the network may retrieve it.

The test termination configuration may indicate termination: (1) by a network command; (2) by a timer; or (3) by implicit rules.

Representative WTRU Procedures for MDT Non-user Data Generation Testing Reception of MDT Configuration for Activation The WTRU 102 may receive a MDT configuration with an activation requirement (or policy). For the PDCP TDG, the activation of the MDT session may be immediate or based on a condition trigger or event trigger.

For the MAC TDG, the activation of the MDT session may be specified with an offset (e.g., the testing may start at certain Transmission Time Interval (TTI) offsets and/or the test may be run or executed (e.g., only run or executed) on certain pre-configured TTIs and/or per frame TTI pattern.

The activation/deactivation signaling may be RRC or MAC CE signaling. In case of RRC signaling, the activation/deactivation command may be sent along with the test data configuration. In case of MAC signaling, the MAC CE activation/deactivation may be associated with a TCE identity (ID) to indicate the configuration the TCE ID applies to. The activation command may include an activation condition.

In one representative example, when the MDT activation condition is met, the WTRU 102 may indicate to network to activate the MDT session. If the WTRU 102 is in idle mode, the WTRU 102 may indicate the MDT activation condition to the network in the RRC Connection Complete message. If the WTRU 102 is already in connected mode and the MME 215 is in the loop, the WTRU 102 may use a modified Bearer Resource Allocation Request for the indication and/or a new message may be used to coordinate (e.g., synchronize) the network and the WTRU 102 to activate the MDT session at the same time. In another representative example, the WTRU may immediately begin test data when the activation condition is met.

In certain representative embodiments, the WTRU 102 may request the MDT testing configuration in the activation indication message if the testing configuration is not provided in the MDT configuration message.

Representative Triggering Conditions for Activating the MDT QoS Verification Procedure In certain representative embodiments, WTRU based triggering/activation procedures and conditions in idle and/or connected mode may be implemented.

The MDT WTRU 102 may activate the MDT QoS verification procedure when one or more of the following conditions are configured and are met (e.g., the WTRU 102 in idle mode may monitor the triggering conditions, if the WTRU 102 is MDT QoS verification configured) including:

(1) based on the WTRU's location/position, and may include one or more areas or regions (e.g., a geographic scope) associated with a certain set or sets of GPS coordinates, a set or sets of particular cells (e.g., cell identities), a set or sets of network areas (tracking/routing/location areas with their respective area-IDs) or a scope of networks (e.g., public land mobile networks (PLMNs) and/or equivalent PLMNs), among others;

(2) a configured time (e.g., absolute time reference) may be used for a triggering condition;

(3) based on the WTRU's experiencing channel or traffic conditions including the WTRU 102 ongoing user-data conditions including one or more of the following:
  a. above or below a certain Channel Quality Indicator (CQI), Buffer Status Report (BSR) level or Power Headroom Report (PHR) level;
  b. above or below a certain throughput rate on an averaged PDCP Service Data Unit (SDU) Transmission (e.g., SDUs over a specified duration of time) and/or the buffer fill change rate of a particular logical channel with respect to its configured PBR and Bucket Size Duration (BSD); and/or
  c. above or below certain perceived error conditions such as the RLC NACK rate, the PDCP SDU discard rate (e.g., due to discard timer expiration), the HARQ NACK rate, and/or the HARQ ACK/NACK misinterpretation rate, among others;

(4) Based on WTRU mobility situations such as WTRU speed and/or direction including, for example, the WTRU frequent HOs (ping-ponging) (e.g., above a threshold number of times in a predetermined period) and/or frequent RLF situations (e.g., above a threshold number of times in a predetermined period and/or persisting for a predetermined duration of time), among others; and/or (5) Based on the WTRU user experience such as WTRU load which is too heavy (e.g., having above a threshold number of application executing, for example, too many applications running), and/or too may dropped calls, among others.

When the MDT QoS verification procedure is activated by the WTRU 102, the WTRU 102 may indicate to the eNB 220 on the activation with the specific configured test/measurement whether it is in idle mode or in connected mode.

Activation mechanisms and triggering conditions specified for the WTRU 102 may apply to the eNB based activation and triggering conditions. When the eNB 220 activates the procedure (e.g., when the WTRU 102 is in connected mode), the eNB 220 may send the WTRU 102 via the RRCConnectionReconfigurationRequest message the configurations of the air interface, protocol layers and/or the test specific parameters, and/or a specific indication (e.g., with the TRACE-ID/measurement-ID) to the WTRU 102 about the eNB activation of the specific MDT QoS verification test.

Representative Actions on Receiving PDCP TDG Configuration Reception of Measurement Objects (MOs)

The MOs in the MDT QoS verification configuration generally refer to objects on which the WTRU 102 performs QoS measurements. The MOs that the WTRU 102 received may be: (1) only the user DRB(s)/Logical Channel(s); (2) only the test DRB(s)/Logical Channel(s); (3) both user and test DRB(s)/Logical Channel(s); (4) any DRB/Logical Channel; (5) the DRB that belong to a group/Logical Channel Group; and/or (6) the DRB that is within QoS range, among others.

When the WTRU 102 receives a new MDT configuration, the WTRU 102 may save the MO and may associate the MO with the Trace-ID. If the WTRU 102 already has an ongoing MDT configuration, the WTRU 102 may: (1) stop the ongoing MDT session; (2) release the test DRBs associated with the current MDT session; (3) release the TDG; (4) free the buffer; and/or (5) clear the MDT configuration.

Certain representative embodiments may save one or more MOs and associate them with the corresponding Trace-IDs, for which they are configured. If there already are existing MOs associated with Trace-IDs, the existing MOs may be replaced by the replacement MOs. For the MOs that are in the previous MDT configuration and not in the latest MDT configuration, if the MDT session is active, the WTRU 102 may stop monitoring for the previous MOs. When the MDT session is activated, the WTRU 102 may start to monitor the MOs on the configured measurements (e.g., KPIs). The WTRU 102 may skip the MOs which are either not active or have not been configured.

Representative Reception of Measurement Configuration (MeasConfig)

The descriptions herein regarding MDT QoS verification test configuration may apply to both the non-user data based tests and user-data based tests.

The measurement configuration may define what measurements the WTRU 102 may perform on the MOs. There may be one or more measurement configurations in the MDT configurations, each of the configurations may be applied to the MOs (e.g., all MOs, a subset of the MOs, or a single MO).

Figure 9:
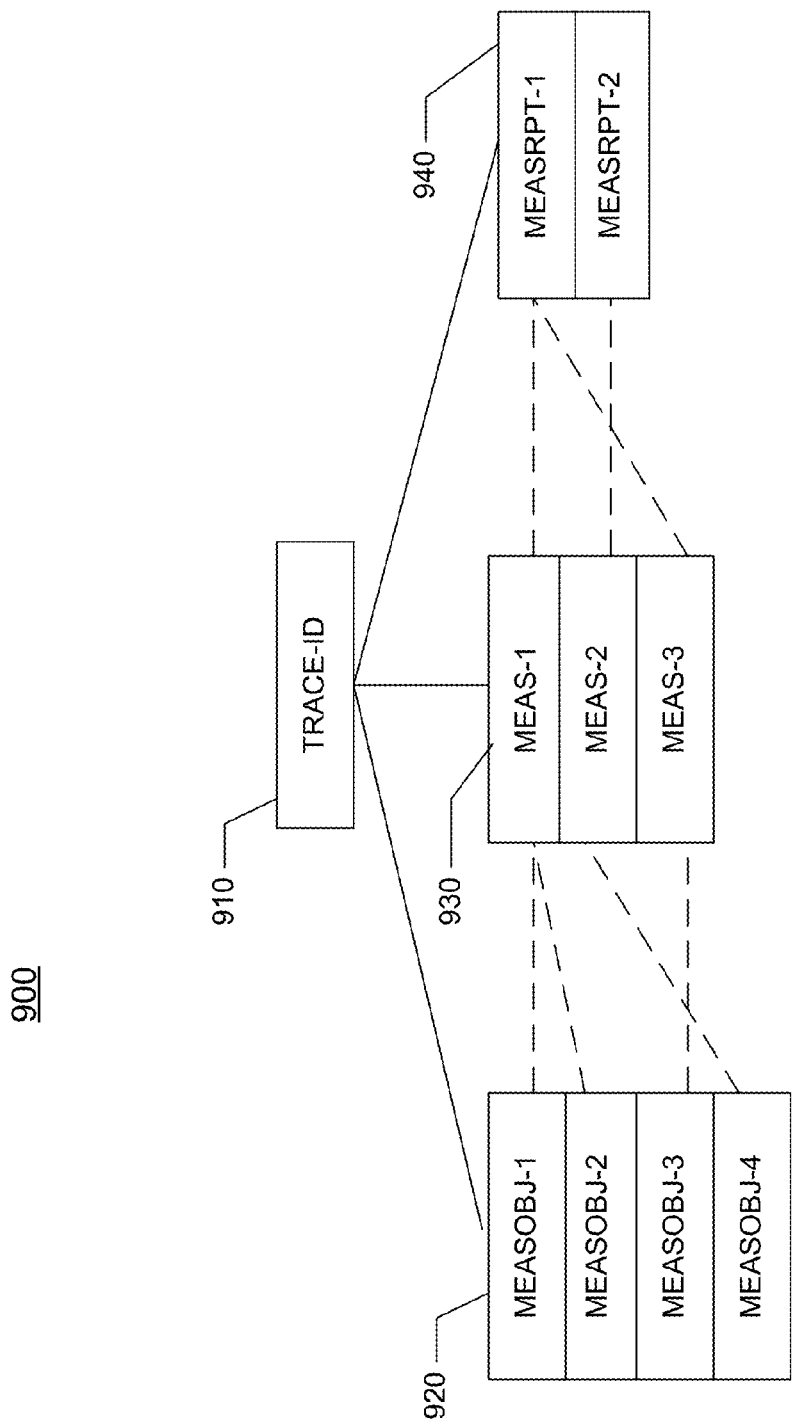
FIG. 9 is a diagram illustrating a representative MDT configuration (or session).

FIG. 9 is a diagram illustrating a representative MDT configuration (or session).

Referring to FIG. 9, the MDT configuration or session may include a trace ID 910 associated with the MDT configuration/MDT test case, one or more MOs 920, one or more measurements 930 associated with the MOs and/or one or more measurement reports 940 associated with the measurements.

A measurement configuration may also include: (1) a measurement interval; (2) an amount of the measurement to be reported or a measurement timer threshold; and/or (3) a KPI measurement including, for example, the DL PDCP data throughput; the UL PDCP packet delay; the UL data discarded; the UL data discarded rate; the UL data loss; and/or the UL data loss rate, among others.

The WTRU 102 may save the measurement configuration. When the MDT session is activated, the WTRU 102 may take the configuration measurements at each measurement interval. If the amount of measurement is configured, the WTRU 102 may stop the measurement when it reaches the configured amount of the measurement and/or the associated measurement timer threshold.

Representative WTRU for Handling the DL PDCP Data Throughput Measurement

The DL PDCP throughput may be generally defined as measurement on the amount of DL PDCP data the WTRU 102 received on the MO or MOs. When the MDT is activated, if DL PDCP data throughput measurement may be configured, the WTRU 102 may measure the UL throughput on the configured MOs.

An example of DL throughput may be defined as set forth in Equation 1:

$$DL\_Data\_Throughput\ [I] = DL\_PDCP\_SDU\_Volume[i]/T \quad (1)$$

where the UL_Data_Throughput [i] is the WTRU's UL throughput for MO[i] and the DL_PDCP_SDU_Volume [i] is the size of the PDCP SDU the WTRU 102 received on the DL on the MO[i] during time T, where T is the measurement interval.

The corresponding measurement on UL data throughput may be measured in the eNB using the same formula.

Representative WTRU for Handling the UL PDCP Packet Delay Measurement

The UL PDCP packet delay measurement may be generally define to measure the averaged time the PDCP packets stay in the WTRU. When the MDT is activated, if the UL PDCP packet delay measurement is configured, the WTRU may measurement the UL PDCP packet delay on the configured MOs. An example of UL PDCP packet delay may be defined as set forth in Equations 2 and 3 for acknowledged mode and another example of UL PDCP packet delay may be defined as set forth in Equations 2 and 4 for unacknowledged mode:

$$UL\_PDCP\_PACKET\_DELAY[i] = \Sigma UL\_PDCP\_PACKET\_DELAY[i,j]/N[I]; \quad (2)$$

$$where\ UL\_PDCP\_PACKET\_DELAY[i,K] = t\_ACK[i,K] - t\_Arrive[i,L]; \quad (3)$$

$$where\ UL\_PDCP\_PACKET\_DELAY[i,K] = t\_sent[i,K] - t\_Arrive[i,L]; \quad (4)$$

The UL_PDCP_PACKET_DELAY[i, T] is the average PDCP packet delay on MO[i] over time interval T, which is the measurement interval, N is the total number of UL PDCP packet received on the MO[i] over the time period T. The UL_PDCP_PACKET_DELAY is the time difference between the time the PDCP packet[L] arrives at PDCP upper service access point (SAP) on the MO[i] and the time of the PDCP protocol data unit (PDU)[K], (e.g., the last piece of the PDCP packet[L]) is acknowledged by the MAC/RLC.

If the MO is configured as unacknowledged mode, the UL_PDCP_PACKET_DELAY[i,K] is the time difference between the time the PDCP packet[L] arrives at PDCP upper SAP on the MO[i] and the time the PDCP PDU[K], (e.g., the last piece of the PDCP packet[L]) is sent out.

In certain representative embodiments, the t_sent[i,K] may be the PDCP PDU[K] and the last piece of the PDCP packet [L] may be acquired by MAC. The same measurement may be applied to the eNB for DL packet delay over a defined MO, and the object may be a DRB or a group of DRBs.

Representative WTRU for Handling UL Data Discarded

The UL User data discarded may measure how much user data may be discarded at the PDCP layer because of congestion condition over a period time of T on a given MO. The user data may be discarded in the PDCP because the user data has stayed in the PDCP over the defined time and has been discarded after the discard timer expires.

When the MDT is activated, if the WTRU 102 receives UL data discarded in the measurement configuration, the WTRU 102 may monitor the amount of the UL user data that has been discarded on the given MO over a period time of T (e.g., where T is the measurement interval).

In the following example, the UL data discarded may be generally defined as set forth in Equation 5:

$$UL\_DATA\_DISCARD[i] = \Sigma SIZE\_OF\_PACKET\_DISCARDED[i,j] \quad (5)$$

where the UL_DATA_DISCARD[i] is the total UL user data on MO[i] discarded over the period T (where T is the measurement interval), and the SIZE_OF_PACKET_DISCARDED[i,j] is the size of PDCP packet[j] on MO[i] which is discarded during the period T. A similar measurement on the DL user data discarded may be defined and performed at the eNB.

Representative WTRU for Handling UL Data Discarded Rate

When the MDT is activated, if the UL data discarded rate is in the measurement configuration, the WTRU 102 may measure the percentage of data that has been discarded on a given MO over the period T.

In the following example, the UL data discarded rate may be generally defined as set forth in Equation 6:

$$UL\_DATA\_DISCARD\_RATE[i] = ULDATA\_DISCARD[i]/TOTAL\_AMOUNT\_USER\_DATA[i] \quad (6)$$

where the UL_DATA_DISCARD_RATE[i] is the percentage of user data that has been discarded on MO[i] over period T, the UL_DATA_DISCARD[i] is the UL user data discard measurement defined above and the TOTAL_AMOUNT_USER_DATA[i] is the total amount of UL user data transmitted on MO[i] during the period T. A similar measurement on the DL user data discarded rate may be defined and performed at the eNB Representative WTRU Handles UL Data Loss The UL data loss may measure the amount of data that may be lost over the air interface on a given MO over the defined period T. When the MDT is active and the UL data loss is in the measurement configuration, the WTRU 102 may start to monitor the amount of the data lost on the air interface. In the following example, the UL data loss may be defined as set forth in Equation 7:

$$UL\_DATA\_LOSS[i] = \Sigma SIZE\_PDCP\_SDU\_LOSS[i,j] \quad (7)$$

where the UL_DATA_LOSS is the amount of UL PDCP data on MO[i] that has been lost on the air interface over the period T and the SIZE_PDCP_SDU_LOSS[i,j] is the PDCP SDU[j] on MO[i] for which at least one PDCP PDU has been transmitted over the air interface and has not been positively acknowledged. A similar measurement on the DL data loss may be defined and performed at the eNB.

Representative WTRU for Handling UL Data Loss Rate

When the MDT is activated, if the UL data loss rate is in the measurement configuration, the WTRU 102 may measure the percentage of data that has been lost on a given MO over a period T.

In the following example, the UL data loss rate may be generally defined as set forth in Equation 8:

UL_DATA_LOSS_RATE[i]=UL_DATA_LOSS[i]/
TOTAL_AMOUNT_USER_DATA[i]    (8)

where the UL_DATA_LOSS_RATE[i] is the percentage of user data that has been discarded on MO[i] over period T, the UL_DATA_LOSS[i] is the UL DATA LOSS measurement defined above and the TOTAL_AMOUNT_USER_DATA[i] is the total amount of UL user data for which at least one PDCP PDU has been transmitted on MO[i] during the period T. A similar measurement on the DL user data loss rate may be defined and performed at the eNB.

A similar measurement on DL user data discarded rate may be defined and performed at the eNB.

Reception of Representative Test DRB Configuration

The MDT WTRU 102 may receive a test DRB configuration and the test DRB may be indicated as a logical channel (or data radio bearer).

The configuration parameters may include the protocol related IE pdcp-Config and rlc-Config, QoS related parameters such as the logical channel priority, the prioritisedBitRate or the bucketSizeDuration, and/or other lower layer associated parameters, among others.

The configuration may include MDT QoS verification test specific parameters such as the total data size, the test duration, the PDCP SDU size, and/or the TDG data content pattern (e.g., random, pattern-1, or pattern-2, among others), among others. The MDT WTRU 102 may consider that the TDG may be above the PDCP layer and may configure: (1) the corresponding protocol layer with the protocol parameter IE pdcp-Config and rlc-Config, the LogicalChannelConfig and the lower layer parameters, (e.g., the RLC acknowledged mode (AM), unacknowledged mode (UM) and/or transparent mode (TM), among others); and/or the TDG with the test specific parameters, for example, total data size, test duration, PDCP SDU size and/or test data content pattern, among others.

When the test DRB is indicated as a logical channel, one or more other radio bearer traffic (e.g., up to 7), for example user-traffic or a test-traffic, may be accommodated. If at least one user-traffic channel is included in the MDT WTRU 102 simultaneously with test-traffic, a mixed-traffic MDT QoS verification operation may be implemented. The mixed-traffic MDT QoS verification may be useful for collecting user-experience related QoS measurements with the controlled test traffic.

Under the mixed-traffic model, the test traffic channel or channels may be assigned with a lower logical channel priority (e.g., with lower priority than the ongoing user-traffic logical channel).

Reception of Representative Reporting Configuration (ReportConfig)

The WTRU 102 may receive MDT QoS verification configuration indicating how the report may be conducted and perform the operations and/or mechanisms related to the MDT QoS verification tests and/or the delayed report mode operations.

Representative Control Elements in the Reporting

The representative elements in the report may include WTRU location information/GPS coordinates, a measurement time stamp, a stage index and the measurement/test configuration identity that may identify the category of the specific measurement/test or test scenarios and that may assist in correlating the WTRU reports to the corresponding eNB logs/results, and/or the TRACE-ID or the measurement-ID that may belong to it, among others.

In certain representative embodiments, each of the reports may include whether the report may be (1) sent periodically, (2) event-triggered and/or (3) the final report. The WTRU mobility information such as the WTRU traveling speed and forward direction, the serving and neighboring cell signal readings (e.g., the Reference Signal Received Power (RSRP) and/or the Reference Signal Received Power (RSRQ)), Channel Quality Indicators (CQIs) and cell or WTRU load conditions may to be included (e.g., periodically) in the reports. In certain representative embodiments, the information may be included in event-triggered MDT reports (e.g., any event-triggered MDT reports).

In certain representative embodiments, the MDT QoS verification operation may have the following reporting schemes: (1) periodic reporting such that the WTRU 102 may generate and may transmit a report per reporting period using the measured results obtained in the past reporting period; or (2) event reporting such that the WTRU 102 may generate and may transmit a report when a predefined event or condition occurs. The WTRU 102 may report (e.g., just report or only report) the event or condition (e.g., with an event-ID or condition-ID), or the WTRU 102 may report the event or condition in addition to the measured data accumulated in the past (e.g., either raw or processed data from the past).

Representative MDT Measurement Report Data and Related Processing Mechanisms

The WTRU 102 may record the measured data for later reporting the measured results. The direct result may be raw data (e.g., unprocessed). The WTRU 102 MDT report may include: (1) only the raw data, (2) only the processed data (e.g., averaged and/or averaged excluding outliers, among others); and/or (3) a combination of the two depending on the measurement/test subject.

Some of the measured data processing may include averaging functions for MEAN, MEDIAN and/or MODE, among others. The data value set included in the calculation may be a fixed result set obtained during the report interval or a sliding window set including current and past results.

The report format may be predefined with the particular MO, or it may be configured with the MDT QoS verification activation command.

Representative Delayed Report Mode

The delayed report mode may enable the WTRU 102 in connected state to perform one or more of the following: (1) to accumulate the measured results on a logged fashion; and/or (2) to process or to analyze the measured results to generate an intermediate or a final form of the desired MDT reports on the WTRU 102. The delayed report mode for MDT may reduce the signaling load caused by repeated measurement reports.

The delayed report operations may include: (1) delaying the report until the whole MDT QoS verification ends; (2) delaying the report until a defined stage of the MDT QoS verification ends.

The defined stage may refer to: (1) a defined test stage ending (e.g., a test may be defined as to transmit Block-A using random data and Block-B using predesigned patterned data such that the test may reach a stage when the Block-A transmission ends) and the WTRU 102 processing the results completes); (2) a delayed report timer associated with the MDT report (e.g., MDT QoS report) on the WTRU 102 expires (e.g., a periodic timer or a pre-established timer expires); (3) the size of the logged data deposited on the WTRU 102 reaches a threshold or its limit; and/or (4) the network solicits the MDT report.

The WTRU 102 may mark (e.g., provide an indication) in the log at the boundary of a test stage results and may use the mark to associate the MDT report if the MDT report is transmitted at different WTRU RRC sessions.

Delayed Reporting and Representative MDT Log Preservation

The WTRU 102 may remove the delayed report mode MDT measurement log as soon as the WTRU 102 has reported the logged data (e.g., all the logged data) to the network. In certain representative embodiments, the WTRU 102 may preserve the log in case the measured results for MDT are not transmitted or not fully transmitted to the network due to, for example, WTRU low battery status and/or a network outage situation, among others. The WTRU 102 may preserve the log for a predetermined amount of time or for a configured log preservation time. The preservation time may start elapsing when the WTRU 102 is configured to perform the specific MDT task. The preservation time may keep progressing (e.g., even if the WTRU 102 is powered off). The WTRU 102 may remove the log if the preservation time expires. The WTRU 102 may notify the network about the deletion of the MDT log(e.g., associated with a TRACE-ID) that was not fully reported (e.g., transmitted).

Representative Termination of MDT Session

The WTRU 102 may terminate the MDT session by explicit signal from network. The command may be a separate WTRU message or may be combined with an existing WTRU message. For example, a MDT termination request may be: (1) combined with an existing RRC Connection release message; and/or (2) combined with an existing RRC Connection reconfiguration message, among others. When the WTRU 102 receives an explicit command from network to stop the MDT session, the WTRU 102 may: (1) release its MDT configuration; (2) stop monitoring the configured MOs; (3) stop the event evaluation process if an event triggered measurement report mode may be configured; (4) stop logging the measurement to a MDT log if the delayed report mode may be configured; (5) release the test DRBs; (6) release the TDG; (7) if the MDT report is used in the MDT termination request: (i) if in the delayed report mode, the WTRU 102 may report its MDT results and delete its MDT log or (ii) if in the periodic report mode, the WTRU 102 may report its current measurements; and/or (8) if the WTRU 102 still has an unreported MDT log(e.g., for delayed report mode), it may be indicated to the network in the response message and the WTRU 102 may keep the MDT log for a finite amount of time, among others.

If the measurement timer or amount of measurement is defined in the measurement configuration, by the time either the measurement timer or timers expire or the WTRU 102 reaches the amount of measurement defined, the WTRU 102 may: (1) stop monitoring the configured MOs; (2) stop the event evaluation process, if an event triggered measurement report mode is configured; (3) stop logging the measurement to a MDT log, if the delayed report mode is configured; (4) release the TDG; (5) implicitly release its test DRBs; and/or (6) implicitly detach and reattach to the network, among others.

The WTRU 102 may terminate/stop the MDT session by an implicit rule: (1) when the WTRU 102 is moved out of the allowed MDT region; (2) when the triggering condition for MDT activation no long holds (e.g., no longer exists), such as when the condition is for the WTRU 102 to be in the MDT region for a consecutive or continuous amount of time or for a consecutive amount of packets; (3) when absence of data on the test DRB is detected, for example, when the amount of test DRB data is below a threshold over a period of time; (4) based on one or more failure conditions (e.g., RLFs or other failures); (5) based on one or more user actions or inputs to the WTRU 102; (6) based on one or more WTRU conditions such as low battery status and/or the WTRU load condition being over a capacity threshold; (7) based on one or more emergence conditions (8) based on user data; and/or (9) based on paging and/or paging conditions, among others.

If the WTRU 102 terminates an MDT session by an implicit rule, for the eNB side to stop the same MDT session, the WTRU 102 may indicate to the network that the MDT session is released. The WTRU 102 may: (1) send an indication to network before the WTRU 102 releases its MDT configuration (e.g., such that the indication may be combined with an existing NAS message or a new RRC message); (2) send an indication to the network requesting the network to take an action; and/or (3) detach from the network so that the eNB 220 knows that the WTRU 102 is no long available for MDT testing.

Representative Actions on Receiving Mac Data Generator Configuration Reception of MAC Configuration When the MDT WTRU 102 receives the QoS verification configuration and the test channel setting may be indicated for MAC level testing: (1) the configuration parameters may include the relevant MAC parameters and the associated physical layer parameters (e.g., and related parameters such as the uplink spatial multiplexing parameter "AntennaInfoUL" and/or the HARQ retransmission number of "max-HARQ-Tx" may be configured); (2) the configuration may include MDT QoS verification test specific parameters such as the total data size, the test duration, the full TB size or half TB size, the TDG data content pattern (e.g., random, pattern-1, or pattern-2, among others) and/or the MAC TB padding content pattern and the MDT WTRU 102 may: (i) consider that the TDG may be located at the MAC layer; (ii) configure the MAC and the physical layer with the parameters; and configure the TDG with such parameters as the total data size, the test duration, the full TB size or half TB size, the TDG data content pattern and/or the MAC TB padding content pattern.

In certain representative embodiments, the MAC TDG may fill the MAC TB with a content pattern up to its specified size, no upper layer data, or header may be considered, and no multiplexing may be performed, if not otherwise specified.

The MAC padding pattern (e.g., the MAC TB padding pattern) may be the same as the data block content pattern, or it may be different (e.g., filling with a specified pattern, all 0s or all 1s, among others). If the specified content block size (or the total size) is larger than the transport block (TB) size, the content may span multiple TBs and, for example, the last TB (e.g. only the last TB) may be padded. If the specified content block size is "full buffer", it may be equivalent to a granted TB size, block-by-block.

If the MDT WTRU 102 is uplink spatial multiplexing capable and the WTRU 102 is explicitly configured to have two HARQ processes on a given TTI, the MDT WTRU 102 may transmit two transport blocks simultaneously. In this case, the TDG may have two generation processes and each may be capable of generating the same TB content as the other one or different TB contents than the other one for filling its corresponding MAC TB. The test configuration may specify a common content pattern for the two TB data generators, or the test configuration may specify a different TB content for each generator process.

The MDT QoS verification test may specify that while connecting to a PCell (or to a PCell and a SCell), the WTRU 102 may conduct the MDT QoS verification with the PCell alone, with a SCell alone or with a PCell and a SCell simultaneously. In certain representative embodiments, the test may specify that while connecting to the PCell and the SCell), the WTRU 102 may conduct the MDT QoS verification individually with different start/terminate times that may be overlapped for some portion of the execution time. The SCell addition and removal from the WTRU 102 multi-carrier operation during the MDT QoS verification test may be supported.

The MDT QoS verification test may specify that the WTRU transmissions (e.g., all WTRU transmissions) may not have any HARQ retransmission (maxHARQ-Tx configured as 1), which may make the Bit Error Rate (BER) or Block Error Rate (BLER) measurements more directly associated with the channel condition. In this case, the MAC may configure the MAC, the HARQ process and lower layers to accommodate the "no HARQ retransmission" scenario.

The MDT QoS verification may configure the WTRU 102 to perform the HARQ ACK/NACK interpretation measurements. The MDT WTRU 102 may detect the uplink HARQ ACK/NACK misinterpretation (e.g., over DL data) by checking the next DL data content. The misinterpretation may happen (e.g., mostly happen) at the cell edge. The specific measurement configuration may include one or more error categories, such as the ACK misinterpreted to NACK or vice versa and a duration timer. A threshold value may make the measurements an event-trigger for other QoS tests. The WTRU MAC may configure the lower layers to enable processing and reporting.

Reception of Representative Measurement Configuration by WTRU

In certain representative embodiments, the MDT WTRU 102 may handle the QoS verification measurement configuration. The MDT WTRU 102 may receive specific MAC level measurement configuration including: (1) one or more measurement intervals; (2) an amount of measurements; (3) measurement KPIs such as the number of misinterpreted HARQ ACK/NACK signals the overall throughput and/or the delay (e.g., overall delay), among others.

Termination of Representative MDT Session

In certain representative embodiments, rules may be implemented to terminate the MDT QoS verification session (e.g., with the MAC level testing).

The MDT QoS verification test may be terminated at any time by a network command via a RRC message or a MAC CE command and/or the test may be terminated by implicit rules. The implicit rules may include one or more of the following: (1) by timer (e.g., predetermined or configured); (2) by absence of test traffic (explicit end or stopping of data or an inactive timer that is predetermined or configured); (3) by new user data, and/or network paging, among others; (4) by an emergence outgoing call condition; (5) by user action that may be explicit or implicit such as when the WTRU 102 is overloaded; and/or (6) by failure conditions (e.g., heavy RLF), among others.

When the test is terminated normally such as by an explicit network command, by a test duration timer or by the end of test definitions, the MDT WTRU 102 may send a measurement report to the eNB 220 to conclude the test normally. Subsequent test DRB release, buffer, and log clearing may be performed.

When the test is terminated abnormally, data buffer contents and result logs not transmitted may be cleared and the test DRB may be released. The WTRU 102 may choose to inform the abnormal termination condition to the eNB 220 with the test configuration identity (e.g., the TRACE-ID and/or the measurement-ID, among others.

Enhancement to the IP Throughput Measurement

Current IP throughput measurements may not be adapted to measure IP level throughput for a data burst (e.g., large or small data bursts) and may not enable QoS verification in the certain scenarios. For example, for streaming data (e.g., a very large streaming data scenario), the data buffer may not be empty for a long time, and during this time, the WTRU's location may have already changed. The final throughput measurement for the data burst may be a combined throughput for a starting location and one or more other locations (e.g., the starting and final locations). As one example, the transmission for the data burst may start at location A, where the throughput is very low and more data may be buffered at the PDCP layer. IP throughput measurement may be triggered when the data transmission starts. A user may move to location B (e.g., where the signal may be much better (e.g., stronger) and throughput for location B may increase (e.g., jump and the data buffer may be cleared). The IP throughput measured for this data burst may reflect an averaged throughput for locations A and B. Such a throughput measure may mask (e.g., hide) the potential low throughput at location A. As a second example, in a small data burst scenario, since the IP throughput measure may exclude data transmitted at the last TTI, the IP throughput measure may not apply to small data bursts such that the transmission does not span multiple TTIs.

To reflect the user observed QoS, the IP throughput measurement may be enhanced to reflect a user observed throughput, which may be independent of the data burst size and tightly correlated to location, for example. The measurement may be able to identify whether the observed IP throughput is the maximum throughput the WTRU 102 may reach at the given location at a particular time.

Representative Periodic IP Throughput Measurement

The example of a periodic UL IP throughput measurement at the eNB 220 may be set forth as shown in Equation 9. The UL IP throughput measurement may be defined as the total PDCP SDU received during a measurement period time (e.g., and the measurement period may be a configurable parameter).

$$UL\_IP\_Throughput=(Total\ PDCP\ SDU\ Rx)/(Measurement\_period) \qquad (9)$$

The example of a periodic DL IP throughput measurement at the eNB 220 may be set forth as shown in Equation 10. The DL IP throughput measurement may be defined as the total PDCP SDU successfully transmitted during a configurable measurement period time.

$$DL\_IP\_Throughput=(Total\ PDCP\ SDU\ Tx)/(Measurement\_period) \qquad (10)$$

Figure 10:
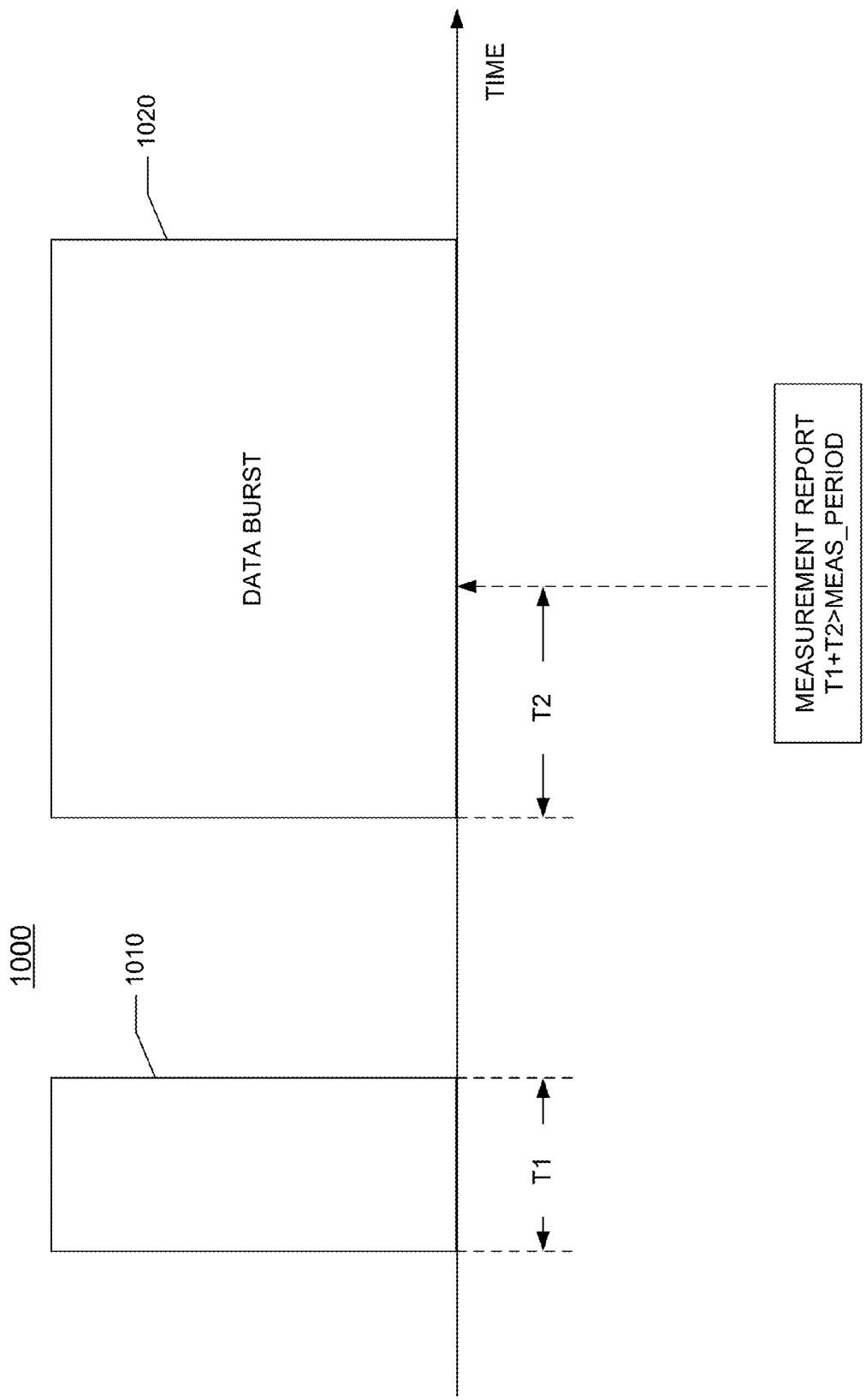
FIG. 10 is a diagram illustrating an example of a representative timing used for data transmission.

FIG. 10 is a diagram illustrating an example of a representative timing used for data transmission.

Referring to FIG. 10, first and second data bursts 1010 and 1020 may be sent in either the UL or the DL. The first transmission time T1 may span the period from the start of the first data burst 1010 to the end of the first data burst 1010. The second transmission time T2 may span from the start of the second data burst to the time set for the measurement reporting time such that the measurement_period is less than or equal to transmission times T1+T2. For example, the measurement-period may not exclude the last transmission time interval (TTI) (e.g., the summation of the actually transmission time may not exclude the last TTI).

Figure 11:
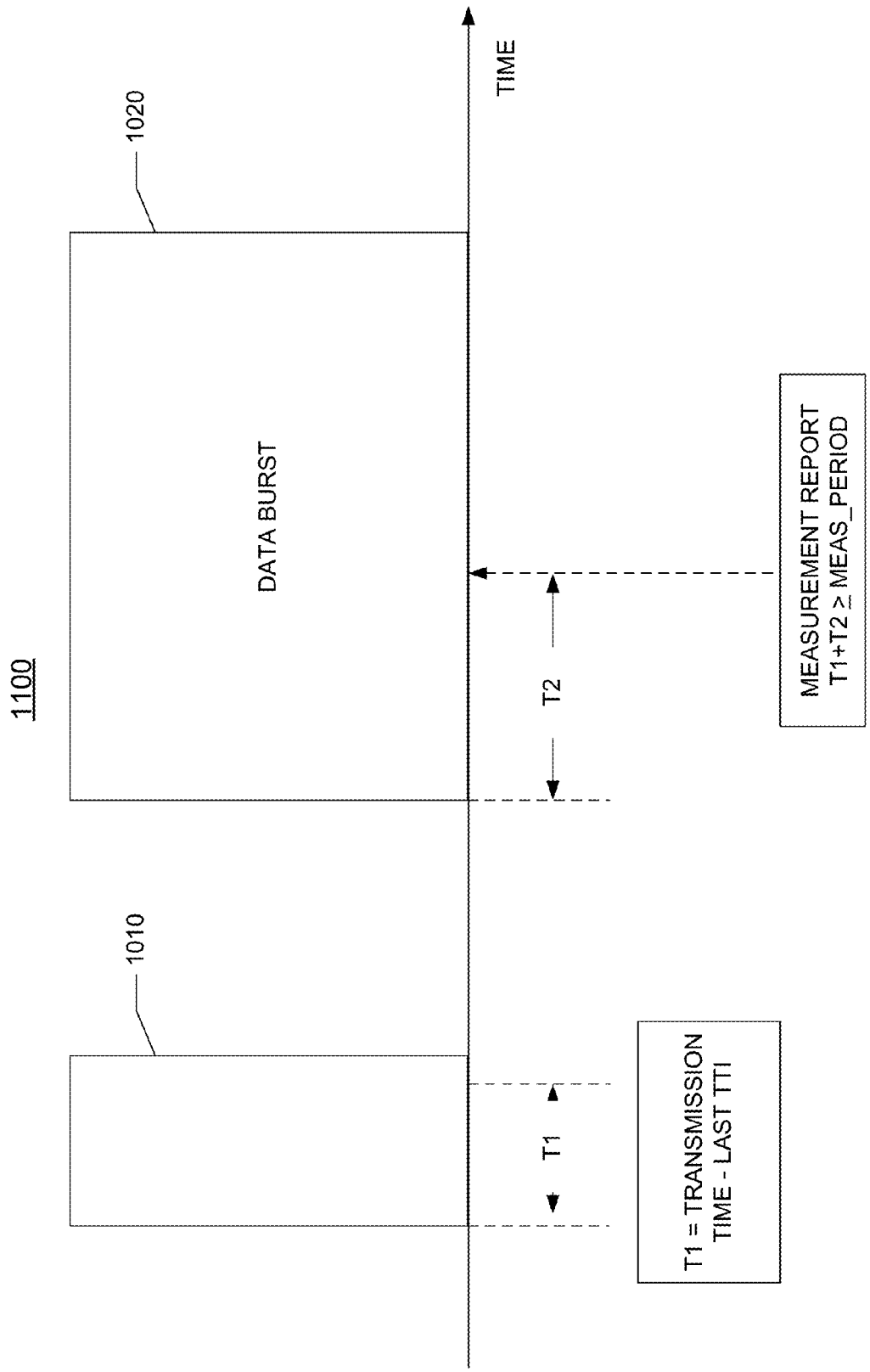
FIG. 11 is a diagram illustrating another example of a representative timing used for data transmission.

FIG. 11 is a diagram illustrating another example or a representative timing used for data transmission that excludes the last TTI.

Referring to FIG. 11, the first and second data bursts 1010 may be sent in either the UL or the DL. The first transmission time T1 may span the period from the start of the first data burst 1010 to the end of the first data burst 1010 minus the last TT1. The second transmission time T2 may span from the start of the second data burst to the time set for the measurement reporting time such that the measurement_period is less than or equal to transmission times T1+T2. For example, the measurement_period may exclude the last transmission time interval (TTI) (e.g., the summation of the actually transmission time may exclude the last TTI).

The measurement period may be configured by the MME for signal based MDT and by OAM for Management based MDT. In FIGS. 10 and 11, the first transition time T1 may define a non-continuous measurement period that may exclude the non-transmission period from the calculation of the throughput to enable a calculate of the throughput that may more accurately reflect the user experience.

The example of a periodic UL IP throughput measurement at the WTRU 102 may be set forth as shown in Equation 11. The periodic UL IP throughput measurement may be defined as the total PDCP SDU successfully transmitted during a configurable measurement period time.

$$UL\_IP\_Throughput=(Total\ PDCP\ SDU\ Tx)/(Measurement\_period) \quad (11)$$

The example of periodic DL IP throughput Measurement at the WTRU 102 may be set forth as shown in Equation 12. The periodic UL IP throughput may be defined as the total PDCP SDU received during a configurable measurement period time.

$$DL\_IP\_Throughput=(Total\ PDCP\ SDU\ Rx)/(Measurement\_period). \quad (12)$$

Representative Event Triggered IP Throughput Measurement

Possible events for triggering IP throughput measurements may include: (1) a change in location of the WTRU 102 since last measurement report (e.g., the change in location exceeding a threshold, for example, based on a distance measurement) or the throughput of the WTRU 102 having dropped below a threshold over a given period of time (a time-to-trigger). The measurement period may be either a configured parameter or a preconfigured value. The time-to-trigger (e.g., a time-to-trigger value) may be either a configured parameter or a preconfigured value. Normal hysteresis may be defined for any given event triggered measurement. The WTRU 102 may reach a maximum (MAX) sustained throughput.

When an event is triggered, if the measurement is configure at the eNB 220, the eNB 220 may report on the observed IP throughput at the time or reporting. If network based positioning is configured to be on (e.g., operational), the WTRU's current location may be reported (periodically, randomly or at some other time periods).

The information on per location MAX/PEAK sustained throughput may be used by an operator to facilitate a QoS benchmarking geographical map. The trigger for the WTRU 102 reaching the MAX throughput may be defined for the UL, as the WTRU's total power headroom below a threshold (e.g., a power headroom threshold), and/or the eNB scheduler may give the WTRU 102 the largest possible grant based on the channel quality and/or a percentage of NACKs being below a threshold (e.g., a NACK threshold).

The measurement may be configured with a previous highest throughput for the particular location. The measurement report may be triggered when the UL throughput exceed the previous MAX throughput value (e.g., for a delta amount over a given time period). For the DL, the eNB scheduler may give the WTRU 102 the largest possible grant based on the channel quality and/or the percentage of NACKs being below a threshold. The measurement may be configured with a previous highest throughput for the particular location and/or may be provided access to the previous highest throughput for the location. A measurement report may be triggered when the UL throughput exceed the previous MAX throughput value (e.g., for a delta amount over a given time period).

Representative MDT QoS Verification Architecture

A network entity (e.g., the MDT Test Agent or MDT TA) may be included in the MDT architecture. The MDT TA (may be an application agent to facilitate the network to use MDT to provide QoS verification or network debugging. The network may configure the WTRU 102 to access a certain application or applications at the MDT TA. The application may load certain test cases on the WTRU 102 for MDT QoS verification or network debugging. For example, if the network (e.g., network operator) would like to initiate MDT QoS verification on certain service (e.g., streaming video), the network (e.g., the network operator) may request the WTRU 102 to access a webpage on a MDT TA server. The MDT TA may download a test application (e.g., Java code) on the WTRU's browser and trigger streaming video download/upload from/to the MDT TA.

Figure 12:
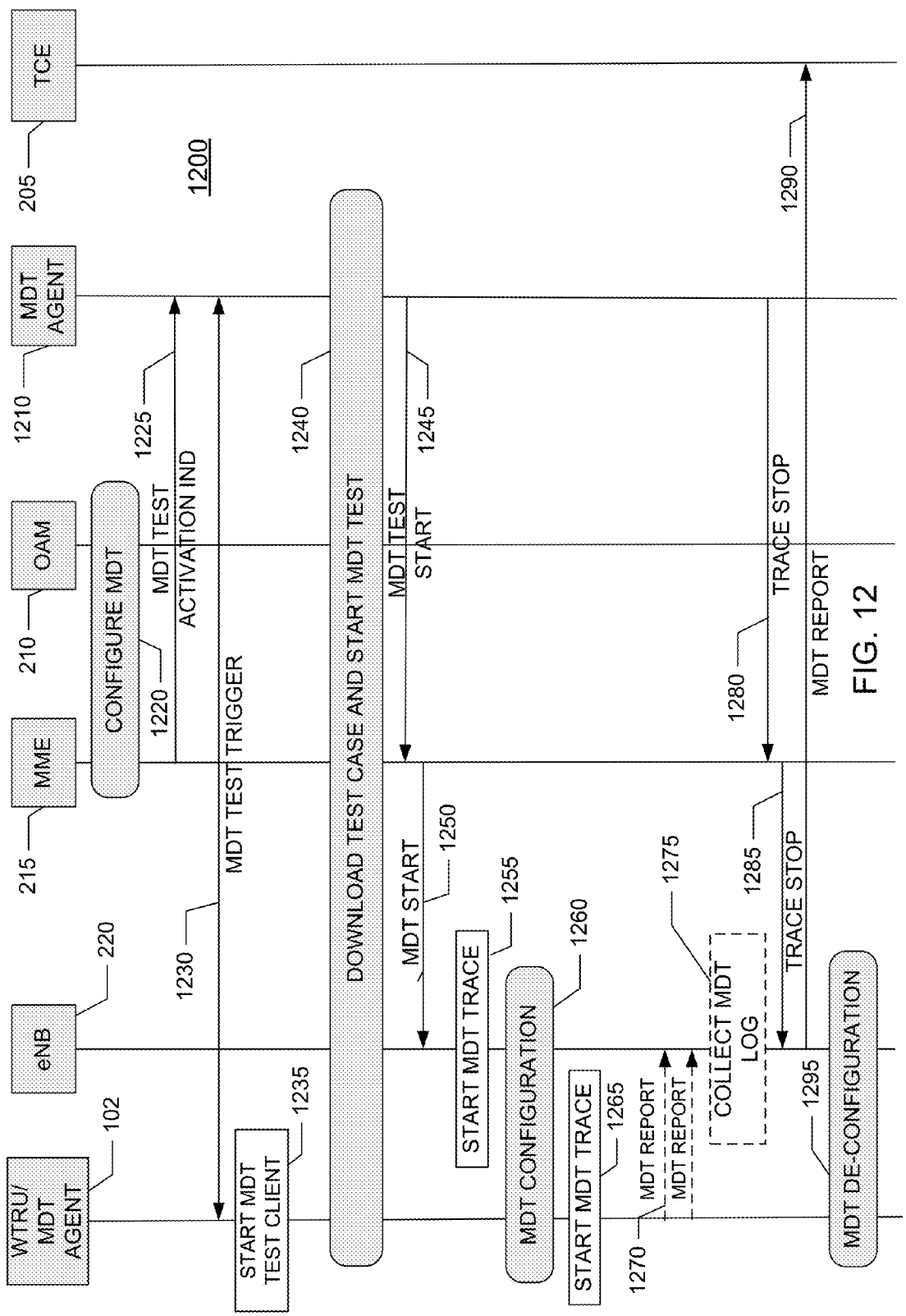
FIG. 12 is a diagram illustrating a representative signaling based MDT QoS architecture.

FIG. 12 is a diagram illustrating a representative signaling 1200 based MDT QoS architecture.

Referring to FIG. 12, the MDT QoS architecture may include a TCE 205, a MDT agent 1210, an OAM or EM 210, an MME 215, an eNB 220 and/or a WTRU MDT agent 102. At operation 1220, the OAM 210 may select the WTRU 102 or a group of WTRUs 102 for MDT tests and may send a trace session activation request to the MME 215 (e.g., to configure the MDT test via the selected WTRU 102). The request may includes parameters for configuring WTRU measurements including, for example: (1) a WTRU identity (ID) a list; (2) an MDT test list (which may be shared with a group or all of the WTRUs or may be WTRU specific, and may designate the test that the OAM/EM 210 wants the WTRU 102 to run or execute); (3) an area selection condition where the WTRU measurements may be collected; (4) a trace reference number; (5) an IP address of the TCE 205; (6) an address of the test agent or the address of WTRU test client; and/or (7) a list of measurements which may include a reporting trigger, a report interval, a report amount, an event threshold, a logging interval and/or a logging duration, among others.

At operation 1225, when the MME 215 receives the trace session activation request from the OAM 210, if the MME 215 accepts (e.g., can accept) the trace, the MME 215 may send a MDT test activation message to the MDT TA 1210. The message may include the trace reference number, the MDT test list, the WTRU ID or the WTRU alias, and/or the WTRU test client address (e.g., the IP+port).

The MDT TA 1210 may prepare the test for the MDT session. The MDT TA 1210 may provide a specific test session identifier for the test which may be used by the WTRU 102 for access to the test. An example of a test session identifier may be a logical address the test agent (e.g., generated just for the MDT purpose, for example, www.xxx.com/test/WTRU1MDTtest), and/or the address may be an IP address+port that the MDT TA 1210 may open for this MDT purpose. The MDT TA 1210 may choose to use the trace reference number as the test session identifier.

At operation 1230, the MDT TA 1210 may use a short message service (SMS) or application message to trigger the MDT test on the WTRU 102. The message may include: (1) a user consent request to request (or determine) whether the user desires (e.g., wants) to participate in the test; (2) user incentive information (e.g., $5 off a monthly bill); (3) a WTRU alias; (4) a description of the test, which may include the maximum time for the test; (5) a test request which may request a user to stay at the same location; (6) a test session identifier; and/or (7) a TA address, among others.

At operation 1235, when the WTRU 102 receives the MDT request, if the network does not have user consent (e.g., based on, for example, a user or system selected setting, option or flag enabling the MDT measurement testing), the WTRU 102 may display a message requesting user consent. Upon user consent, the WTRU 102 may trigger the MDT test client, which may be an already installed application to access the TA, (e.g., the user may use a web browser to access the given address of the TA. The MDT test client may trigger the establishment of a packet data protocol (PDP) context to access the MDT TA 1210.

At operation 1240, the MDT test client may use the test session identifier to download test cases from the MDT TA 1210. For example, the web browser may download JAVA code from the server.

At operation 1245, when the MDT test starts, or at the time that the MDT test starts, e.g., the user's web browser start to download/show stream video, or download a file, or the like, the MDT TA 1210 may send a MDT test start message to the MME 215. The message may include a trace reference and a WTRU alias.

At operation 1250, based on the trace reference and the WTRU alias, the MME 215 may send (or relay) the MDT test start message to the appropriate eNB 220. The MDT test start message may include one or more of the following parameters: (1) the trace reference; (2) the IP address of the TCE 205; and/or (3) a list of measurements which may include (i) a reporting trigger, (ii) a report interval, (iii) a report amount, (iv) an event threshold, (v) a logging interval, (e.g., if logged MDT is configured), and/or (vi) a logging duration, (e.g., if logging MDT is configured), among others.

At operation 1255, the eNB 220 may start the request measurements for the concerned WTRU 102. At operation 1260, if certain measurement may be done by the WTRU 102, the eNB 220 may configure WTRU 102 for the measurements (e.g., MDT test measurements). At operation 1265, the WTRU 102 may start the MDT trace. At operation 1270, when a measurement report condition is triggered, the WTRU 102 may report measurements to the network. If the WTRU 102 is handed over to a new eNB (e.g., eNB 225), based on the test area condition at operation 1210, the network may continue or stop the MDT trace session. At operation 1275, after the MDT trace is finished, the eNB 220 may combine the MDT log collected at the eNB 220 and the WTRU 102.

In certain representative embodiments, at operation 1280, the MDT TA 1210 may send a trace stop message to the MME 215 (e.g., to explicitly terminate the trace by the network). In other representative embodiments, the MDT trace may be implicitly terminated by predefined condition (e.g., based on logging duration, test duration, and/or other conditions that may be set by user input or the WTRU operating system). At operation 1285, the MME may send (or relay) the trace stop message to the eNB 220.

At operation 1290, the eNB 220 may report (or send) the combined MDT log to the TCE 205. At operation 1295, if the MDT session is configured at the WTRU 102, the eNB 220 may de-configure the WTRU MDT sessions.

Figure 13:
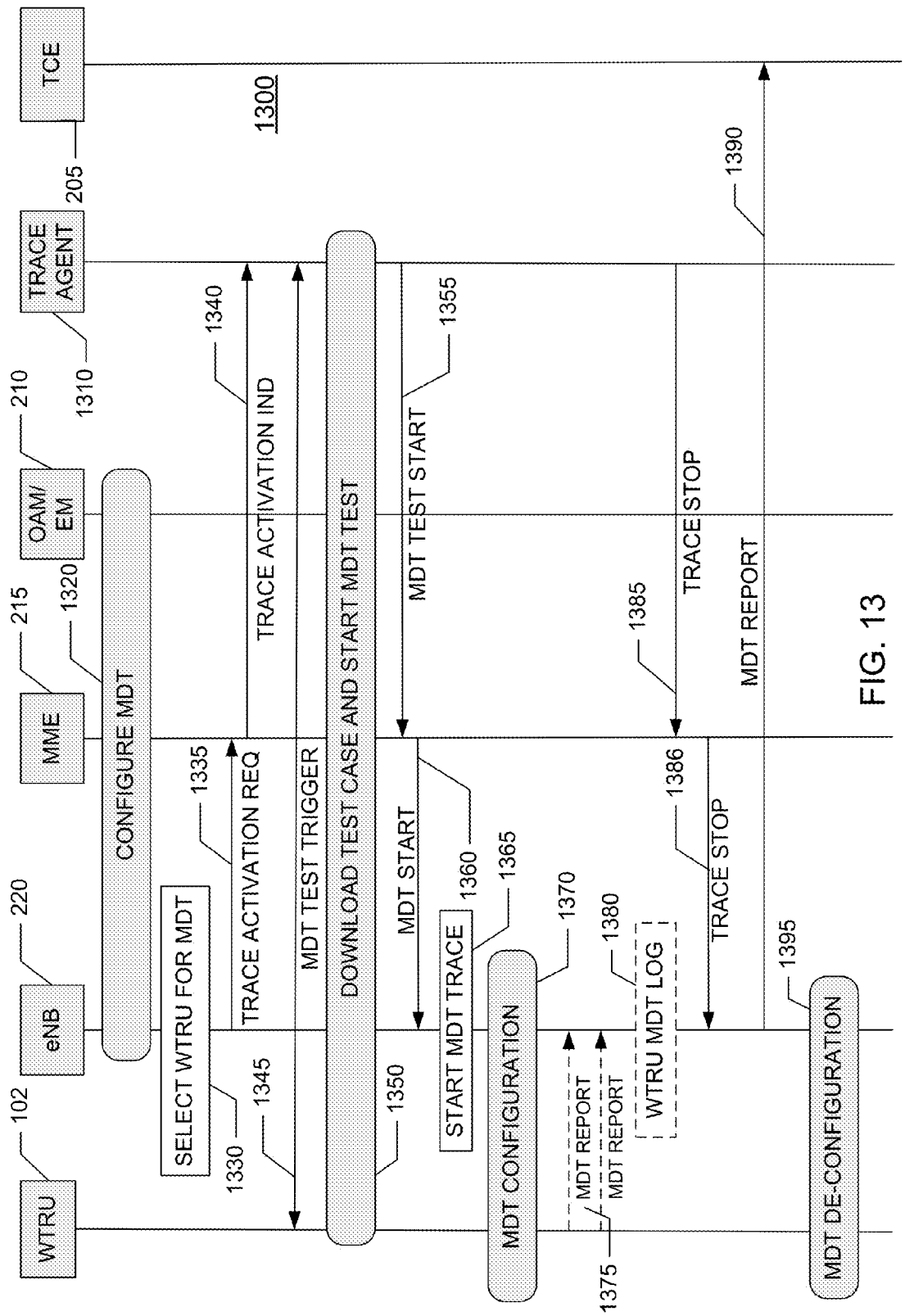
FIG. 13 is a diagram illustrating a management based MDT QoS architecture including a trace agent for implementing a representative MDT procedure.

FIG. 13 is a diagram illustrating a management based MDT QoS architecture including a trace agent (TA) 1310 for implementing a representative MDT procedure 1300.

Referring to FIG. 13, at operation 1320, the OAM/EM 210 or MME 215 may configure the eNB 220 for a trace session. The request may include parameters for configuring the WTRU measurements such as a trace reference, an MDT test list (e.g., the test list may be shared with some or all of the WTRUs 102 or may be WTRU specific, and it may designate the test that the OAM/EM 210 or MME 215 desires (e.g., wants) the WTRU 102 to execute (or run)), the WTRU selection criteria (or area selection condition where the WTRU measurements may be collected), the device capability requirements (e.g., which may be used for the WTRU selection at the eNB), the IP address of TCE 205, the address of the TA 1310 and/or the address of the WTRU test client. The list of measurements may include a reporting trigger, a report interval, a report amount, an event threshold, a logging interval and/or a logging duration, among others.

At operation 1330, when the eNB 220 receives the MDT trace configuration, the eNB 220 may select WTRUs 102 based on the criteria provided by the OAM/ME 210.

At operation 1335, for each selected WTRU 102, the eNB 220 may send a MDT test activation (e.g., a trace activation request message) to the MME 215. The trace activation request message may include a trace reference, a MDT test list, a WTRU ID/US alias and/or a WTRU test client address (e.g., IP+port), among others.

At operation 1340, when the MME 215 receives the trace activation request message, the MME 215 may allocate a test specific identity (alias) to the WTRU 102 to protect user privacy. The MME 215 may send an indication (e.g., a trace activation indication) to the MDT TA 1310. The message may include the trace reference number, the WTRU alias, the test IDs and/or the WTRU's test client address, among others. The MDT TA 1310 may prepare the test for the MDT session. The MDT TA 1310 may give a specific test session identifier for the test which may be used by the WTRU 102 for access to the tests. An example of the test session identifier may be a logical address the MDT TA 1310 generated (e.g., just for the MDT purpose), e.g., www.xxx.com/test/wtru1MDTtest, or the address may be an IP address+port that the MDT TA 1310 opens for the MDT purpose. The MDT TA 1310 may choose to use the trace reference number as the test session identifier.

At operation 1345, the MDT TA 1310 may use a SMS or application message to trigger the MDT test on the WTRU 102. The message may include: (1) the user consent request (to request whether the user wants to participate in the MDT test); (2) the user incentive information (e.g., $5 off monthly bill); (3) the WTRU alias; (4) the description of the MDT test (which may include, for example, the maximum time allowed), test request (e.g., which may request a user to stay at the same location), the test session identifier and/or a test/trace agent address. When the WTRU 102 receives the MDT request, and if the network does not have user consent, the WTRU 102 may display a message asking user consent. Upon user consent, the WTRU 102 may trigger the MDT test client, which may be an already installed application to access the MDT TA 1310 (e.g., the user may use a web browser to access the given address of the MDT TA 1310). The MDT assist entity may trigger the establishment of a PDP context to access the MDT TA.

At operation 1350, the MDT test client may use the test session identifier to download test cases from the MDT TA 1310. For example, the web browser may download JAVA code from a server. At 1355, when the MDT test starts, or at the time that the MDT test starts (e.g., the user's browser starts to download/show stream video, or to download a file or the like), the MDT TA 1310 may send a MDT test start message to the MME 215. The message may include a trace reference and the WTRU alias.

At operation 1360, based on the trace reference and the WTRU alias, the MME 215 may send the MDT start message to the appropriate eNB. The message may include the following parameters: (1) trace reference; (2) IP address of the TCE 205; and/or (3) a list of measurements, which may include: (i)

a reporting trigger, (ii) a report interval, (iii) a report amount, (iv) a event threshold, (v) a logging interval and/or (vi) a logging duration.

At operation 1365, the eNB 220 may start the request measurements for the concerned WTRU 102. At operation 1370, if certain measurement may be done by the WTRU 102, the eNB 220 may configure the WTRU 102 for the measurements. At operation 1375, when a measurement report condition is triggered, the WTRU 102 may report measurements to the network (e.g., via the eNB 220). At operation 1380, the eNB 220 may generate a WTRU MDT log associated with the reported measurements. If the WTRU 102 is handed over to a new eNB (e.g., eNB 225), based on, for example, the test area condition (at operation 1320), the network may continue or stop the MDT trace session. The MDT trace may be implicitly terminated by predefined condition (e.g., based on the logging duration or the test duration).

In certain representative embodiments, at operation 1385, the MDT trace may be explicitly terminated by the network (e.g., MDT TA 1310) via a trace stop message from the MDT TA 1310 to the MME 1385. At operation 1386, the trace stop message may be sent (or relayed) from the MME 215 to the eNB 220. At operation 1390, after the MDT trace is finished, the eNB 220 may combine the MDT log collected at the eNB 220 and the WTRU 102 and may report the combined log to the TCE 205. At operation 1395, if the MDT session is configured at the WTRU 102, the eNB 220 may de-configure the WTRU MDT sessions.

To avoid a WTRU 102 from being configured to perform multiple positioning services and the WTRU 102 sending multiple location information over the Uu interface, a network may request detailed WTRU location information for the MDT. It may be determined by the WTRU 102 which positioning service to use. If there is ongoing positioning activity, the WTRU 102 may choose to use the positioning information for the MDT. If the WTRU 102 does not have an on-going positioning service, based on some of the WTRU's criteria (e.g., indoor location or outdoor location, WTRU's battery status, and the like) the WTRU 102 may choose a positioning method.

If WTRU 102 chooses a LCS method (e.g., LPP, it may trigger to establish the positioning session with the evolved serving mobile location center (E-SMLC). The WTRU 102 may indicate to the E-SMLC that the positioning session is for MDT use (e.g., MDT use only) and the WTRU 102 does not expect to receive request location information from the server.

The WTRU 102 may report the location information with (e.g., along with) the measurement report to the eNB 220. The location information may be in the form of a global navigation satellite system (GNSS) location, a timing measurement for observed time difference of arrival (OTDOA) and/or an enhanced cell ID (ECID) measurements result.

Figure 14:
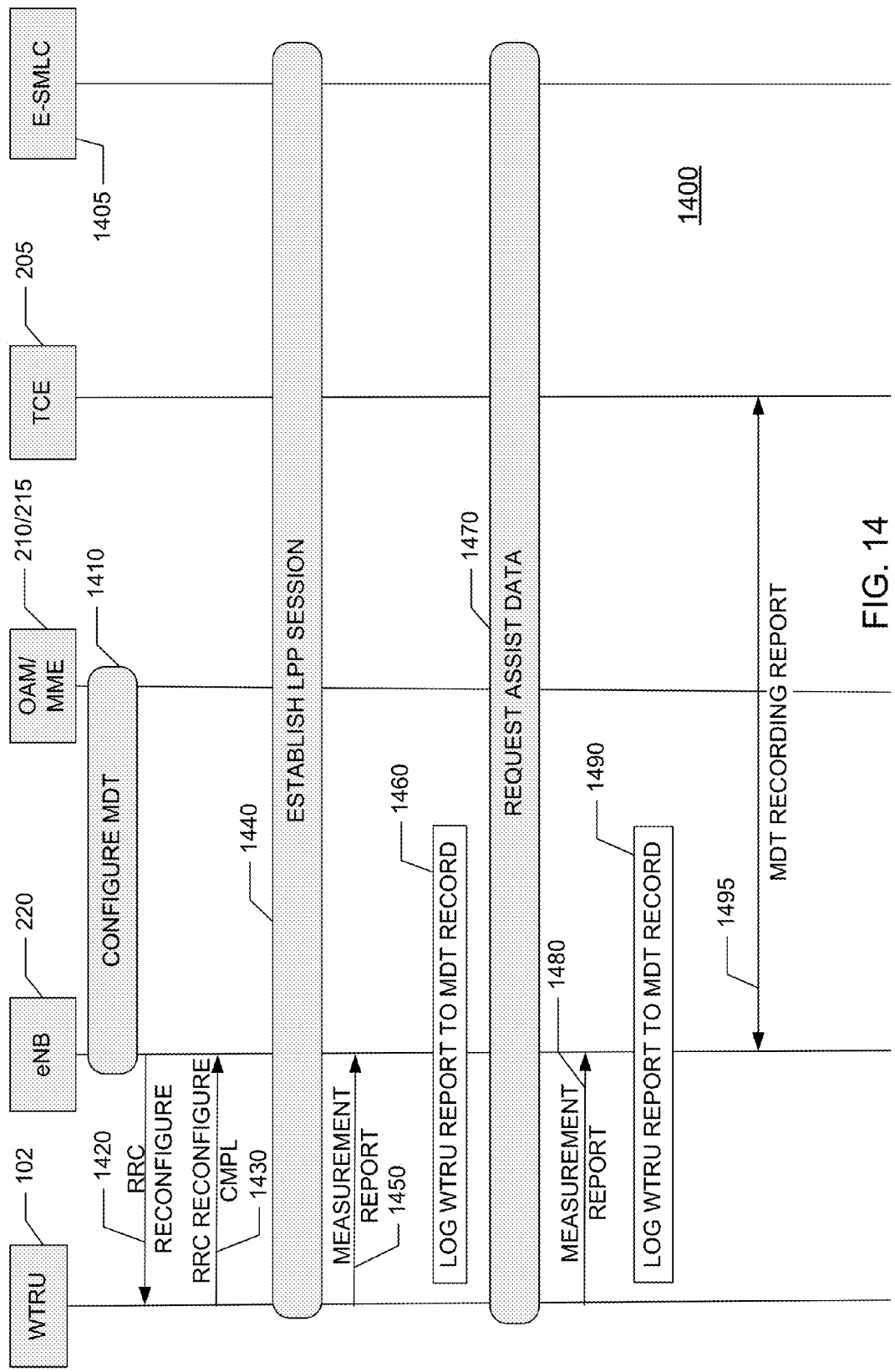
FIG. 14 is a diagram illustrating an example of how to correlate the WTRU's location information with a representative MDT procedure.

FIG. 14 is a diagram illustrating an example of how to correlate the WTRU's location information with a representative MDT procedure using an E-SMLC 1405.

Referring to FIG. 14, at operation 1410, the OAM/MME 210/215 may configure the eNB 220 for an MDT session. At operation 1420, in the connected mode, the eNB 220 may configure the MDT measurement in the WTRU 102 via a RRC Connection Reconfiguration message or a new RRC message. In this configuration, the eNB 220 may indicate that the detailed WTRU location information is to be used. The MDT measurement may be either periodic or event triggered. At operation 1430, the WTRU 102 may send an RRC Reconfiguration complete message to the eNB 220 to indicate completion of the MDT measurement configuration or reconfiguration. If the WTRU 102 has an ongoing positioning session, the WTRU 102 may reuse the location information from the on-going positioning session (e.g., without triggering another positioning session).

If the WTRU 102 does not have an ongoing positioning session, based on the WTRU's location, battery usage, the WTRU's capability and/or the system load, among others, the WTRU 102 may choose one of the positioning sessions. For example, if the WTRU 102 is heavily loaded and does not desire to affect its throughput by requesting gaps for Observed Time Difference of Arrival (OTDOA) measurements, the WTRU 102 may choose to use the Global Navigation Satellite System (GNSS). If the WTRU's battery is low, the WTRU 102 may choose OTDOA measurements instead of the GNSS method, and the like.

In certain representative embodiments, at operation 1440, a location services (LCS) method may be chosen by the WTRU 102 such that the WTRU 102 may trigger an LTE positioning protocol (LPP) session with the E-SMLC 1405. The WTRU 102 may indicate to the E-SMLC 1405 that the positioning is for MDT (e.g., MDT use only) and may request that the E-SMLC 1405 does not try to collect WTRU's positioning information from the WTRU 102. The WTRU 102 and the E-SMLC 1405 may exchange the WTRU's positioning capability. The E-SMLC 1405 may send the WTRU 102 provide assistance data to assist the WTRU 102 to enable the positioning. At operation 1450, the WTRU 102 may send the MDT measurement report to the eNB 220. In the measurement report, the WTRU 102 may include the location information, (GNSS location information, if the GNSS standalone positioning method is used, the timing measurement for the OTDOA measurement results and/or the Enhanced Cell ID (ECID) measurement results).

At operation 1460, the eNB 220 may save the measurement report into its MDT log. If the WTRU 102 is using an on-going positioning service for MDT and if the location service is terminated during the MDT session, the WTRU 102 may choose to restart or extend the current positioning session, and/or the WTRU 102 may choose to start another positioning session.

At operation 1470, during the MDT session, if conditions change, the WTRU 102 may request assistance data. For example, if the WTRU 102 moves to another eNB 225, if the WTRU's operational condition is changed, if the WTRU 102 moves to a new location and/or if the WTRU terminates the current positioning session and starts another one based on the situation, the WTRU may request new assistance data. At operation 1490, the eNB 220 serving the WTRU 102 may log the WTRU report to a MDT record. At operation 1495, the eNB 225 may forward the MDT log to the TCE 205. Based on the WTRU's location information, the TCE 205 may consult the E-SMLC 1405 to obtain (e.g., get) the WTRU's true location.

Figure 15:
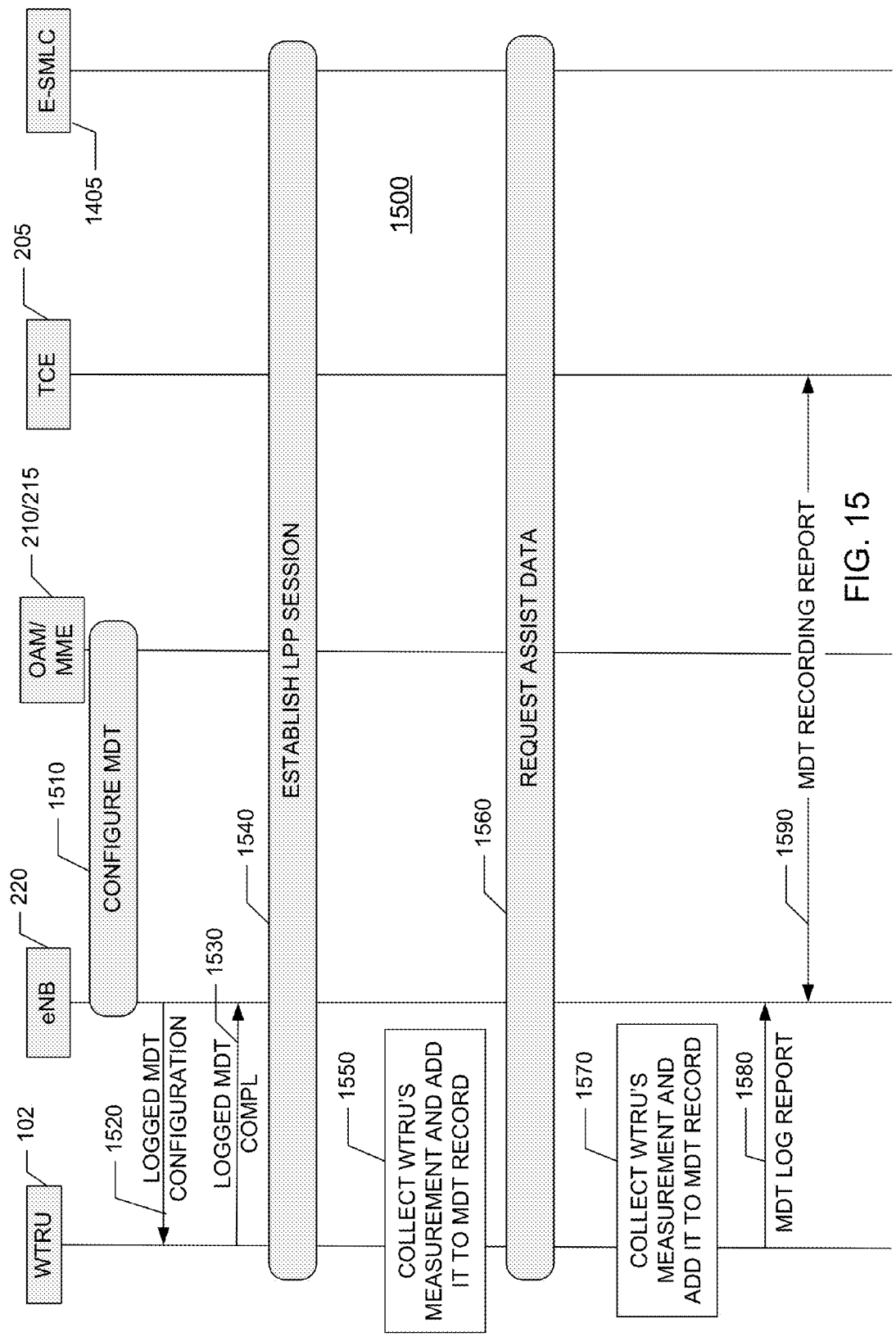
FIG. 15 is a diagram illustrating an example of a procedure to correlate a WTRU's location information.

FIG. 15 is a diagram illustrating an example of a procedure 1500 to correlate a WTRU's location information with logged MDT.

To reduce Uu interface load, the WTRU 102 may log MDT results during the connected mode MDT session and send multiple records in one message.

Referring to FIG. 15, at operation 1510, the OAM/MME 210/215 may configure the eNB 220 for a MDT session. At operation 1520, in connected mode, the eNB 220 may configure the MDT measurement in the WTRU 102 via a new RRC message (e.g., a Logged MDT configuration message) from the eNB 220 to the WTRU 102. In this configuration, the eNB 220 may indicate that the detailed WTRU location information is to be used. The MDT measurement may be either periodic or event triggered. The configuration may include the logged measurement report configurations including a size of the logged measurement record and the logged record reporting criteria (e.g., (1) timer based such that the WTRU 102 may send an MDT log to the network periodically; (2) size based such that the WTRU 102 may send an MDT log to the network when a size of log is larger than the threshold; (3) event based such that the WTRU 102 may send an MDT log to the network when a certain event is triggered; and/or (4) other such that the WTRU 102 may send an MDT log to the network when the MDT session is over or when the RRC connection is released or when the positioning session is terminated.

At operation 1530, the WTRU 102 may send a logged MDT complete message to the eNB 220 to indicate completion of the MDT measurement configuration or reconfiguration.

If the WTRU 102 has an ongoing positioning session, the WTRU 102 may reuse location information from the on-going positioning session without triggering another positioning session.

In certain representative embodiments, if the WTRU 102 does not have an ongoing positioning session, based on the WTRU's location, the battery usage, the WTRU's capability and/or the system load, the WTRU 102 may choose one of the positioning sessions.

At operation 1540, if an LCS method is chosen by the WTRU 102, the WTRU 102 may trigger an LTE Positioning Protocol (LPP) session with the E-SMLC 1405. The WTRU 102 may indicate to the E-SMLC 1405 that this positioning is for MDT (e.g., MDT use only) and may request that the E-SMLC 1405 does not try to collect WTRU's positioning information from the WTRU 102. The WTRU 102 and the E-SMLC 1405 may exchange the WTRU's positioning capability. The E-SMLC 1405 may send WTRU provide assistance data to assist the WTRU 102 with positioning.

At operation 1550, the WTRU 102 may save the MDT record with the location information, (e.g., GNSS location information if GNSS standalone positioning method is used, timing measurement for OTDOA and/or ECID measurements result). For example, the WTRU may collect in accordance with an MDT test case WTRU measurements and may add the WTRU measurements to the MDT record.

If the WTRU 102 is using an on-going positioning service for MDT, and if the location service is terminated during the MDT session, the WTRU 102 may choose to restart or extend the current positioning session or the WTRU 102 may choose to start another positioning session. At operation 1560, during the MDT session, if the WTRU 102 moves to another eNB 225, if the WTRU's condition is changed, if the WTRU 102 moves to a new location, and/or terminates the current positioning session and start another one based on the situation, the WTRU 102 may request new assistance data.

At operation 1570, the WTRU 102 may save the MDT record with the location information. The WTRU may collect in accordance with an MDT test case WTRU measurements and may add the WTRU measurements to the MDT record.

At operation 1580, when the WTRU's reporting condition is met, the WTRU 102 may send the MDT log to the eNB 220 or 225 serving the WTRU 102 and at operation 1590, the eNB 220 or 225 may forward the MDT log to the TCE 205. Based on the WTRU's location information, the TCE 205 may consult the E-SMLC 1405 to get the WTRU's true location.

FIG. 16 is a flowchart illustrating a representative method of managing one or more test measurements associated with a communication system using a WTRU.

Referring to FIG. 16, the representative method 1600 may include, at block 1610, the WTRU 102 receiving a measurement configuration (e.g., test case). The measurement configuration may include at least a trigger indicating a condition or event for initiation or activation of the one or more test measurements. At block 1620, the WTRU 102 may determine whether the trigger has been satisfied, as a determination result. At block 1630, the WTRU 102 may initiate or activate measurement of the one or more test measurements in accordance with the determination result.

In certain representative embodiments, the WTRU 102 may wirelessly report to a network resource (e.g., the eNB 220 or 225) the one or more test measurements.

In certain representative embodiments, the receiving of the measurement configuration may include the WTRU 102 obtaining the trigger indicating any of: (1) a geographic region in which the test measurements are to be taken; (2) a location at which the test measurements are to be taken; (3) a time at which the test measurements are to be taken; (4) a tracking area in which the test measurements are to be taken; and/or (5) a cell identifier associated with a serving cell of which the test measurements are to be taken.

In certain representative embodiments, the WTRU may determine whether a channel condition exceeds a threshold and the channel condition may include at least one of: (1) a channel quality indicator; (2) power headroom; (3) throughput of a communication link to the communication system; (4) a NACK rate; and/or (5) a buffer availability of the WTRU, among others.

FIG. 17 is a flowchart illustrating a representative method of managing a plurality of test measurements associated with a communication system using a WTRU having a protocol stack with a plurality of layers.

Referring to FIG. 17, the representative method 1700 may include, at block 1710, the WTRU 102 receiving a measurement configuration which may indicate parameters used for taking the test measurements. At block 1720, the WTRU may take the test measurements. For example, the test measurements may include at least one of the test measurements associated with a first layer of the protocol stack and at least a second one of the test measurements associated with a second (e.g., different layer) of the protocol stack. In certain representative embodiments, the first and second test measurements may be taken (e.g., measured) in accordance with the indicated parameters of the measurement configuration (e.g., or test case).

At block 1730, the WTRU 102 may control the taking of the test measurements at one or more of the plurality of layers of the protocol stack such that the application layer of the protocol stack is not involved (e.g., exclusive of an application layer of the protocol stack).

FIG. 18 is a flowchart illustrating another representative method of managing a plurality of test measurements associated with a communication system using a WTRU.

Referring to FIG. 18, the representative method 1800 may include, at block 1810, the WTRU 102 receiving a measurement configuration which may indicate parameters used for taking the test measurements. At block 1820, the WTRU 102 may take the test measurements. For example, the test measurements may include at least one of the test measurements associated with user data and at least a second one of the test measurements associated with non-user-data.

In certain representative embodiments, the WTRU 102 may transmit a message including an availability indicator indicating whether the WTRU 102 is available to take the test measurements.

In certain representative embodiments, the receiving of the measurement configuration may be in response to or after the transmitting of the message including the availability indicator. The availability indicator may be sent in accordance with a measurement indicator, setting or flag being set by the user or operating system of the WTRU 102.

In certain representative embodiments, the WTRU 102 may log the test measurements responsive to it being in idle mode, and the WTRU 102 may report to a network resource (e.g., the eNB 220 or other network device) the logged test measurements.

In certain representative embodiments, the WTRU 102 may transition to connected mode prior to reporting the logged test measurements.

In certain representative embodiments, the WTRU 102 may report to a network resource the test measurements responsive to the WTRU 102 being in a connected mode.

In certain representative embodiments, when or responsive to a handover of the WTRU 102 from a first cell to a second cell, the WTRU 102 may delay the taking of the test measurements until the handover is completed.

In certain representative embodiments, the taking of the test measurements may include determining a QoS for the WTRU based on any one or more of: (1) uplink data loss over a specified period; (2) uplink data loss rate over the specified period; (3) uplink data discarded over the specified period at a Packet Data Convergence Protocol (PDCP) layer; (4) uplink data discarded rate over the specified period at the PDCP layer; (5) uplink data loss over the specified period; (6) uplink data loss rate over the specified period; (7) uplink data discarded over the specified period at a Packet Data Convergence Protocol (PDCP) layer; and/or (8) uplink data discarded rate over the specified period at the PDCP layer.

In certain representative embodiments, the taking of the test measurements may include periodically or at predefined times taking the test measurements (e.g., based on user input and/or a test case, for example, a downloaded test case).

FIG. 19 is a flowchart illustrating a further representative method of managing a plurality of test measurements associated with a communication system using a WTRU.

Referring to FIG. 19, the representative method 1900 may include, at block 1910, the WTRU 102 receiving a measurement configuration which may indicate parameters used for taking the test measurements. At block 1920, the WTRU 102 may take the test measurements. For example, the test measurements may include at least one of the test measurements associated with user data (e.g., only user data exclusive of non-user data). For example, the user data refers to data used in data communications by the user of the WTRU 102 and non-user data refers to data used in, for example, the setup of radio bearers and other control plane functions.

FIG. 20 is a flowchart illustrating an additional representative method of managing a plurality of test measurements associated with a communication system using a WTRU.

Referring to FIG. 20, the representative method 2000 may include, at block 2010, the WTRU 102 receiving a measurement configuration which may indicate parameters used for taking the test measurements. At block 2020, the WTRU 102 may take the test measurements. For example, the test measurements may include at least one of the test measurements associated with non-user data (e.g., only non-user data exclusive of user data).

FIG. 21 is a flowchart illustrating a representative method of managing QoS test measurements associated with a communication system using a WTRU.

Referring to FIG. 21, the representative method 2100 may include, at block 2110, the WTRU 102 wirelessly receiving a measurement configuration (or test case). At block 2120, the WTRU 102 may initiate measurement of the one or more test measurements in accordance with the measurement configuration. At block 2130, the WTRU may wirelessly report the one or more test measurements measured in accordance with the measurement configuration.

In certain representative embodiments, the initiating of the measurement of the one or more test measurements may be based on or in accordance with user input and/or setting, indicators or flags previously set by the user via user input or via operating system settings.

In certain representative embodiments, an availability flag indicating whether to enable or disable test measurements may be set at the WTRU 102 via or by user input.

In certain representative embodiments, the initiating of the measurements may be responsive to the availability flag indicating enablement of the test measurements.

Figure 22:
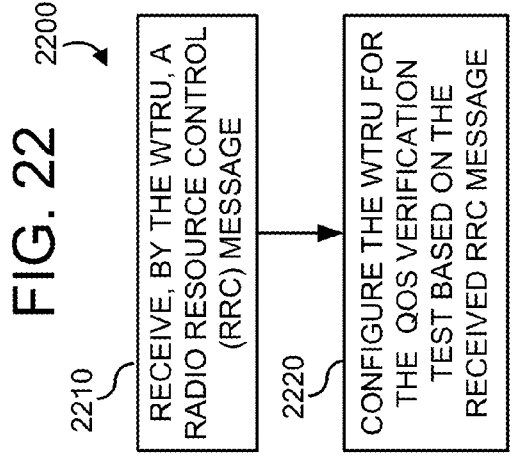
FIG. 22 is a flowchart illustrating a representative method of configuring a WTRU for QoS verification.

FIG. 22 is a flowchart illustrating a representative method of configuring a WTRU for QoS verification.

Referring to FIG. 22, the representative method 2200 may include, at block 2210, the WTRU 102 receiving a radio resource control (RRC) message. At block 2220, the WTRU 102 may configure the WTRU 102 for the QoS verification test based on the received RRC message.

In certain representative embodiments, the WTRU 102 may transmit a non-access stratum (NAS) extended service request message for QoS verification activation, which indicates a trace-identity for a test configuration.

In certain representative embodiments, the WTRU 102 may transmit a test bearer resource allocation request message for QoS verification activation.

In certain representative embodiments, the WTRU 102 may setup a test bearer resource that is separate from other data bearer resources based on the test bearer resource allocation request message.

In certain representative embodiments, the WTRU 102 may measure downlink (DL) traffic QoS; and may report the DL traffic QoS measurements via a measurement report message.

In certain representative embodiments, the WTRU 102 may: transmit a QoS verification activation notification message; configure or reconfigure the WTRU 102 for a data radio bearer (DRB) test; measure DL traffic QoS; and/or transmit an RRC measurement report message.

In certain representative embodiments, the WTRU 102 may: receive a message indicating a handover from a first cell to a second cell, a cutoff time for the DRB test and an activation time for a continued DRB test; terminate the DRB test with the first cell at the cutoff time; and continue the DRB test with the second cell at the activation time.

In certain representative embodiments, the WTRU 102 may be configured to measure any one or more of: (1) DL packet data convergence protocol (PDCP) data throughput for the QoS verification test; (2) uplink (UL) packet data convergence protocol (PDCP) packet delay for the QoS verification test; (3) uplink (UL) data discarded for the QoS verification test; (4) uplink (UL) data discarded rate for the QoS verification test; (5) uplink (UL) data loss for the QoS verification test; and/or (6) uplink (UL) data loss rate for the QoS verification test, among others.

In certain representative embodiments, the WTRU 102 may report to an evolved Node-B (eNB), location information in the form of any of: (1) a global navigation satellite system (GNSS) location; (2) a timing measurement for observed time difference of arrival (OTDOA); and/or (3) a timing measurement for enhanced cell identity (ECID).

Figure 23:
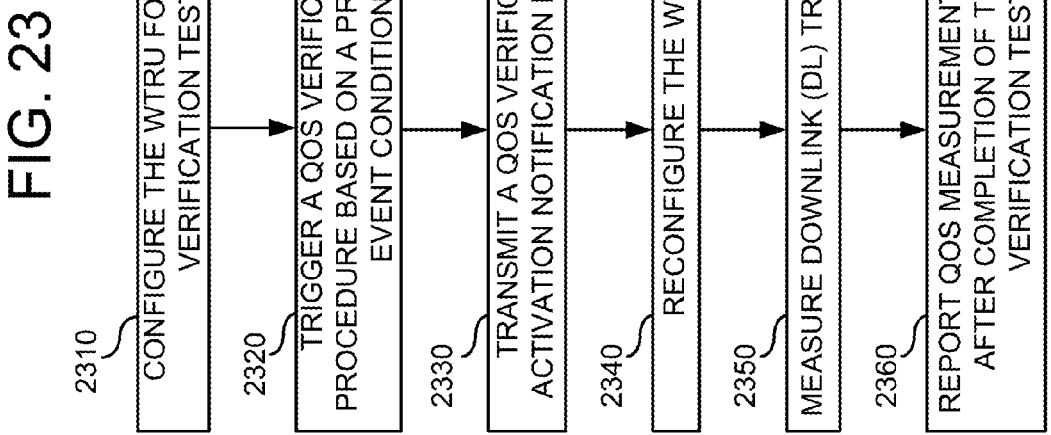
FIG. 23 is a flowchart illustrating a representative method of performing QoS verification using a WTRU.

FIG. 23 is a flowchart illustrating a representative method of performing QoS verification using a WTRU.

Referring to FIG. 23, the representative method 2300 may include, at block 2310, the WTRU 102 configuring the WTRU 102 for the QoS verification test. At block 2320, the WTRU 102 may trigger a QoS verification procedure based on a predefined event condition. At block 2330, the WTRU 102 may transmit a QoS verification activation notification message. At block 2340, the WTRU may reconfigure the WTRU 102. At block 2350, the WTRU 102 may measure DL traffic QoS. At block 2360, the WTRU 102 may report QoS measurement results (e.g., after completion of the QoS verification test).

Figure 24:
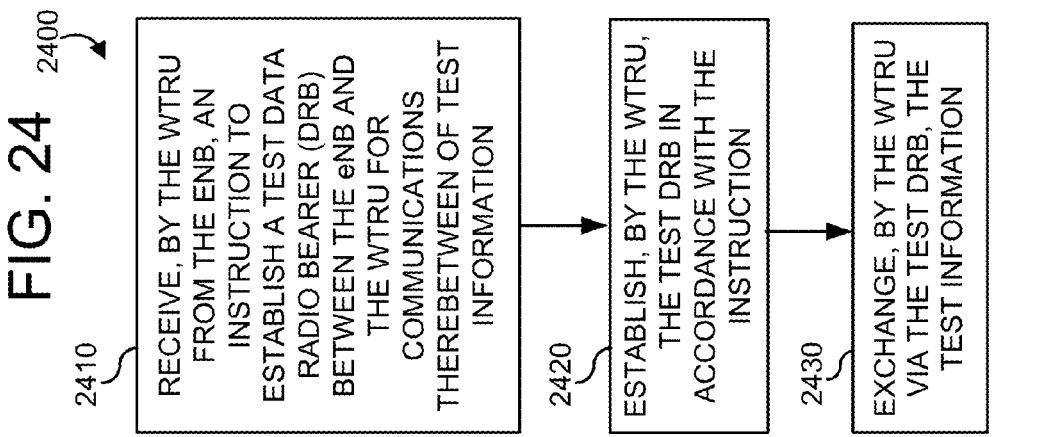
FIG. 24 is a flowchart illustrating a representative method of communicating test information.

FIG. 24 is a flowchart illustrating a representative method of communicating test information between an eNB and a WTRU.

Referring to FIG. 24, the representative method 2400 may include, at block 2410, the WTRU 102 receiving from the eNB 220 an instruction to establish a test data radio bearer (DRB) between the eNB 220 and the WTRU 102 for communications therebetween of the test information. At block 2420, the WTRU 102 may establish the test DRB in accordance with the instruction. At block 2430, the WTRU 102 may exchange, via the test DRB, the test information.

In certain representative embodiments, the WTRU may send to the eNB 220, a test bearer resource allocation request message to request the instruction. The WTRU 102 may setup a test bearer resource (e.g., the resources associate with the test DRB) separate from other data bearer resources (e.g., the resources associated with other data bearers) based on the instruction. For example, the test DRB may be a new or different data bearer with endpoints between the eNB 220 and the WTRU 102 for exchanging test information (e.g., only test information).

In certain respresentative embodiments, the WTRU 102 may conduct QoS measurements using test data sent via the test DRB (for example from or to the eNB 220).

Although the MDT test validation procedures have been described in relation to LTE radio access technologies (RATs) and radio access networks (RANs), it is contemplated that such procedures may be applicable to other RATs and RANs such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

Throughout the disclosure, one of skill understands that certain representative embodiments may be used in the alternative or in combination with other representative embodiments.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer readable medium for execution by a computer or processor. Examples of non-transitory computer-readable storage media include, but are not limited to, a read only memory (ROM), random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, WTRU, terminal, base station, RNC, or any host computer.

Moreover, in the embodiments described above, processing platforms, computing systems, controllers, and other devices containing processors are noted. These devices may contain at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits.

The data bits may also be maintained on a computer readable medium including magnetic disks, optical disks, and any other volatile (e.g., Random Access Memory ("RAM")) or non-volatile ("e.g., Read-Only Memory ("ROM")) mass storage system readable by the CPU. The computer readable medium may include cooperating or interconnected computer readable medium, which exist exclusively on the processing system or are distributed among multiple interconnected processing systems that may be local or remote to the processing system. It is understood that the representative embodiments are not limited to the above-mentioned memories and that other platforms and memories may support the described methods.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Further, as used herein, the term "set" is intended to include any number of items, including zero. Further, as used herein, the term "number" is intended to include any number, including zero.

Moreover, the claims should not be read as limited to the described order or elements unless stated to that effect. In addition, use of the term "means" in any claim is intended to invoke 35 U.S.C. §112, ¶6, and any claim without the word "means" is not so intended.

Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Application Specific Standard Products (ASSPs); Field Programmable Gate Arrays (FPGAs) circuits, any other type of integrated circuit (IC), and/or a state machine.

A processor in association with software may be used to implement a radio frequency transceiver for use in a wireless transmit receive unit (WTRU), user equipment (UE), terminal, base station, Mobility Management Entity (MME) or Evolved Packet Core (EPC), or any host computer. The WTRU may be used in conjunction with modules, implemented in hardware and/or software including a Software Defined Radio (SDR), and other components such as a camera, a video camera module, a videophone, a speakerphone, a vibration device, a speaker, a microphone, a television transceiver, a hands free headset, a keyboard, a Bluetooth® module, a frequency modulated (FM) radio unit, a Near Field Communication (NFC) Module, a liquid crystal display (LCD) display unit, an organic light-emitting diode (OLED) display unit, a digital music player, a media player, a video game player module, an Internet browser, and/or any Wireless Local Area Network (WLAN) or Ultra Wide Band (UWB) module.

Although the invention has been described in terms of communication systems, it is contemplated that the systems may be implemented in software on microprocessors/general purpose computers (not shown). In certain embodiments, one or more of the functions of the various components may be implemented in software that controls a general-purpose computer.

In addition, although the invention is illustrated and described herein with reference to specific embodiments, the invention is not intended to be limited to the details shown. Rather, various modifications may be made in the details within the scope and range of equivalents of the claims and without departing from the invention.

It is contemplated that various features associated with certain representative embodiments may be combined with other features associated with other representative embodiments by one skilled in the art without departing from the invention.

Representative Embodiments

In at least one embodiment, a method of managing one or more test measurements associated with a communication system using a wireless transmit/receive unit (WTRU) is disclosed. The method may comprise receiving, by the WTRU, a measurement configuration including at least a trigger indicating a condition or event for initiation of the one or more test measurements. The method may also comprise determining, by the WTRU, whether the trigger has been satisfied, as a determination result. The method may further comprise initiating, by the WTRU, measurement the one or more test measurements in accordance with the determination result.

In at least one embodiment, the method may further comprise wirelessly reporting, by the WTRU to a network resource, the one or more test measurements.

In at least one embodiment, the receiving of the measurement configuration may include obtaining the trigger indicating any of: (1) a geographic region in which the test measurements are to be taken; (2) a location at which the test measurements are to be taken; (3) a time at which the test measurements are to be taken; (4) a tracking area in which the test measurements are to be taken; or (5) a cell identifier associated with a serving cell of which the test measurements are to be taken.

In at least one embodiment, the method may further comprise determining whether a channel condition exceeds a threshold and the channel condition may include at least one of: (1) a channel quality indicator; (2) power headroom; (3) throughput of a communication link to the communication system; (4) a NACK rate; or (5) a buffer availability of the WTRU.

In at least one embodiment, a method of managing a plurality of test measurements associated with a communication system using a wireless transmit/receive unit (WTRU) having a protocol stack with a plurality of layers may be disclosed. The method may comprise receiving, by the WTRU, a measurement configuration indicating parameters for taking the test measurements. The method may further comprise taking, by the WTRU, the test measurements including at least one of the test measurements associated with a first layer of the protocol stack and at least a second one of the test measurements associated with a second, different layer of the protocol stack in accordance with the indicated parameters of the measurement configuration.

In at least one embodiment, the method may further comprise controlling the taking of the test measurements at one or more of the plurality of layers of the protocol stack exclusive of an application layer of the protocol stack.

In at least one embodiment, a method of managing a plurality of test measurements associated with a communication system using a wireless transmit/receive unit (WTRU) may be disclosed. The method may comprise receiving, by the WTRU, a measurement configuration indicating parameters for taking the test measurements. The method may also comprise taking, by the WTRU, the test measurements including at least one of the test measurements associated with user data and at least a second one of the test measurements associated with non-user-data.

In at least one embodiment, the method may further comprise transmitting, by the WTRU, a message including an Testing Condition Satisfied (TCS) indicator indicating whether the WTRU is available/ready to take the test measurements.

In at least one embodiment, the receiving of the measurement configuration may be in response to the transmitting of the message including the TCS indicator.

In at least one embodiment, the method may further comprise responsive to the WTRU being in an idle mode, logging the test measurements.

In at least one embodiment, the method may further comprise reporting, by the WTRU to a network resource, the logged test measurements.

In at least one embodiment, the method may further comprise transitioning, by the WTRU, to connected mode prior to reporting the logged test measurements.

In at least one embodiment, the method may further comprise responsive to the WTRU being in a connected mode, reporting, by the WTRU to a network resource, the test measurements.

In at least one embodiment, the method may further comprise responsive to a handover of the WTRU from a first cell to a second cell, delaying, by the WTRU, the taking of the test measurements until the handover is completed.

In at least one embodiment, the taking of the test measurements may include determining a quality of service for the WTRU based on any of: (1) uplink data loss over a specified period; (2) uplink data loss rate over the specified period; (3) uplink data discarded over the specified period at a Packet Data Convergence Protocol (PDCP) layer; (4) uplink data discarded rate over the specified period at the PDCP layer; (5) uplink data loss over the specified period; (6) uplink data loss rate over the specified period; (7) uplink data discarded over the specified period at a Packet Data Convergence Protocol (PDCP) layer; or (8) uplink data discarded rate over the specified period at the PDCP layer.

In at least one embodiment, the taking of the test measurements may include periodically taking the test measurements.

In at least one embodiment, a method of managing a plurality of test measurements associated with a communication system using a wireless transmit/receive unit (WTRU) is disclosed. The method may comprise receiving, by the WTRU, a measurement configuration indicating parameters for taking the test measurements. The method may also comprise taking, by the WTRU, the test measurements including at least one of the test measurements associated with user data.

In at least one embodiment, a method of managing a plurality of quality of service (QoS) test measurements associated with a communication system using a wireless transmit/receive unit (WTRU) is disclosed. The method may comprise receiving, by the WTRU, a measurement configuration indicating parameters for taking the test measurements. The method may also comprise taking, by the WTRU, the test measurements including at least one of the test measurements associated with non-user data.

In at least one embodiment, a method of managing one or more Quality of Service (QoS) test measurements associated with a communication system using a wireless transmit/receive unit (WTRU) is disclosed. The method may comprise wirelessly receiving, by the WTRU, a measurement configuration. The method may also comprise initiating, by the WTRU, measurement of the one or more test measurements in accordance with the measurement configuration. The method may further comprise wirelessly reporting, by the WTRU, the one or more test measurements measured in accordance with the measurement configuration.

In at least one embodiment, the initiating of the measurement of the one or more test measurements may be based on user input.

In at least one embodiment, the method may further comprise setting, by user input, an availability flag whether to enable or disable test measurements and the initiating of the measurement may be responsive to the availability flag indicating to enable the test measurements.

In at least one embodiment, a method of configuring a wireless transmit/receive unit (WTRU) for quality of service (QoS) verification is disclosed. The method may comprise receiving, by the WTRU, a radio resource control (RRC) message. The method may also comprise configuring the WTRU for the QoS verification test based on the received RRC message.

In at least one embodiment, the method may further comprise transmitting, by the WTRU, a non-access stratum (NAS) extended service request message for QoS verification activation, which indicates a trace-identity for a test configuration.

In at least one embodiment, the method may further comprise transmitting, by the WTRU, a test bearer resource allocation request message for QoS verification activation.

In at least one embodiment, the method may further comprise setting up, by the WTRU a test bearer resource separate from other data bearer resources based on the test bearer resource allocation request message.

In at least one embodiment, the method may further comprise measuring, by the WTRU, downlink (DL) traffic QoS.

In at least one embodiment, the method may further comprise reporting the DL traffic QoS measurements via a measurement report message.

In at least one embodiment, the method may further comprise transmitting, by the WTRU, a QoS verification activation notification message.

In at least one embodiment, the method may further comprise configuring or reconfiguring the WTRU for a data radio bearer (DRB) test.

In at least one embodiment, the method may further comprise measuring downlink (DL) traffic QoS.

In at least one embodiment, the method may further comprise transmitting an RRC measurement report message.

In at least one embodiment, the method may further comprise receiving, by the WTRU, a message indicating a handover from a first cell to a second cell, a cutoff time for the DRB test and an activation time for a continued DRB test In at least one embodiment, the method may further comprise terminating, by the WTRU, the DRB test with the first cell at the cutoff time.

In at least one embodiment, the method may further comprise continuing, by the WTRU, the DRB test with the second cell at the activation time.

In at least one embodiment, the method may further comprise configuring the WTRU to measure a downlink (DL) packet data convergence protocol (PDCP) data throughput for the QoS verification test.

In at least one embodiment, the method may further comprise configuring the WTRU to measure an uplink (UL) packet data convergence protocol (PDCP) packet delay for the QoS verification test.

In at least one embodiment, the method may further comprise configuring the WTRU to measure uplink (UL) data discarded for the QoS verification test.

In at least one embodiment, the method may further comprise configuring the WTRU to measure uplink (UL) data discarded rate for the QoS verification test.

In at least one embodiment, the method may further comprise configuring the WTRU to measure uplink (UL) data loss for the QoS verification test.

In at least one embodiment, the method may further comprise configuring the WTRU to measure uplink (UL) data loss rate for the QoS verification test.

In at least one embodiment, the method may further comprise reporting, by the WTRU to an evolved Node-B (eNB), location information in the form of any of: (1) a global navigation satellite system (GNSS) location; (2) a timing measurement for observed time difference of arrival (OTDOA); or a timing measurement for enhanced cell identity (ECID).

In at least one embodiment, a method using a wireless transmit/receive unit (WTRU) to perform quality of service (QoS) verification is disclosed. The method may comprise configuring the WTRU for a QoS verification test. The method may also comprise triggering a QoS verification procedure based on a predefined event condition; The method may further comprise transmitting a QoS verification activation notification message. The method may additionally comprise reconfiguring the WTRU. The method may also comprise measuring downlink (DL) traffic QoS. The method may further comprise reporting QoS measurement results after completion of the QoS verification test.

In at least one embodiment, a wireless transmit/receive unit (WTRU) for measuring one or more test measurements associated with a communication system is disclosed. The WTRU may comprise a transmit/receive unit configured to receive a measurement configuration including at least a trigger indicating a condition or event for initiation of the one or more test measurements and a processor configured to determine whether the trigger has been satisfied, as a determination result and to control initiation of the one or more test measurements in accordance with the determination result.

In at least one embodiment, the transmit/receive unit may be configured to wirelessly report the one or more test measurements to a network resource.

In at least one embodiment, the transmit/receive unit may be configured to receive the measurement configuration including the trigger indicating any of: (1) a geographic region in which the test measurements are to be taken; (2) a location at which the test measurements are to be taken; (3) a time at which the test measurements are to be taken; (4) a tracking area in which the test measurements are to be taken; or (5) a cell identifier associated with a serving cell of which the test measurements are to be taken.

In at least one embodiment, the processor may be configured to obtain the test measurements in accordance with the trigger.

In at least one embodiment, the processor may be configured to determine whether a channel condition exceeds a threshold.

In at least one embodiment, the channel condition may include any of: (1) a channel quality indicator; (2) power headroom; (3) throughput of a communication link to the communication system; (4) a NACK rate; or (5) a buffer availability of the WTRU.

In at least one embodiment, a wireless transmit/receive unit (WTRU) for measuring one or more test measurements associated with a communication system is disclosed. The WTRU may comprise a protocol stack with a plurality of layers; a transmit/receive unit configured to receive a measurement configuration indicating parameters for taking the test measurements; and a processor configured to control taking of the test measurements including at least one of the test measurements associated with a first layer of the protocol stack and at least a second one of the test measurements associated with a second, different layer of the protocol stack in accordance with the indicated parameters of the measurement configuration.

In at least one embodiment, the processor may be configured to controlling the taking of the test measurements at one or more of the plurality of layers of the protocol stack exclusive of an application layer of the protocol stack.

In at least one embodiment, a wireless transmit/receive unit (WTRU) for measuring one or more test measurements associated with a communication system is disclosed. The WTRU may comprise a transmit/receive unit configured to receive a measurement configuration indicating parameters for taking the test measurements; and a processor configured to control taking of the test measurements including at least one of the test measurements associated with user data and at least a second one of the test measurements associated with non-user-data.

In at least one embodiment, the transmit/receive unit may be configured to transmit a message including an availability/readiness indicator indicating whether the condition is met the for the test measurements.

In at least one embodiment, the transmit/receive unit may be configured to receive the measurement configuration response to transmission of the message including the availability indicator.

In at least one embodiment, the a memory may be configured to store test measurements.

In at least one embodiment, the processor may be configured to control storage to the memory and timing of reporting of the test measurements to a network resource based on a mode of operation of the WTRU.

In at least one embodiment, the processor may be configured to transition to connected mode prior to reporting stored test measurements.

In at least one embodiment, responsive to a handover of the WTRU from a first cell to a second cell, the processor may be configured to delay the taking of the test measurements until the handover is completed.

In at least one embodiment, the processor may be configured to determine a quality of service for the WTRU based on any of: (1) uplink data loss over a specified period; (2) uplink data loss rate over the specified period; (3) uplink data discarded over the specified period at a Packet Data Convergence Protocol (PDCP) layer; (4) uplink data discarded rate over the specified period at the PDCP layer; (5) uplink data loss over the specified period; (6) uplink data loss rate over the specified period; (7) uplink data discarded over the specified period at a Packet Data Convergence Protocol (PDCP) layer; or (8) uplink data discarded rate over the specified period at the PDCP layer.

In at least one embodiment, a wireless transmit/receive unit (WTRU) for measuring one or more Quality of Service (QoS) test measurements associated with a communication system is disclosed. The WTRU may comprise a transmit/receive unit configured to receive a measurement configuration indicating parameters for taking the test measurements; and a processor configured to control taking of the test measurements including at least one of the test measurements associated with user data.

In at least one embodiment, a wireless transmit/receive unit (WTRU) for measuring one or more Quality of Service (QoS) test measurements associated with a communication system is disclosed. The WTRU may comprise a transmit/receive unit configured to receive a measurement configuration indicating parameters for taking the test measurements; and a processor configured to control taking of the test measurements including at least one of the test measurements associated with non-user data.

In at least one embodiment, a wireless transmit/receive unit (WTRU) for measuring one or more test measurements associated with a communication system is disclosed. The WTRU may comprise a transmit/receive unit configured to wirelessly receive a measurement configuration; and a processor configured to control initiation of measurement of the one or more test measurements in accordance with the measurement configuration and the transmit/receive unit may be configured to wirelessly report one or more test measurements measured in accordance with the measurement configuration.

In at least one embodiment, the processor may be configured to control the initiation of the measurement of the one or more test measurements based on user input.

In at least one embodiment, the processor may be configured to set, via user input, a measurement flag indicating whether to enable or disable test measurements and to initiate the measurement of the test measurements responsive to the measurement flag indicating to enable the test measurements.

In at least one embodiment, a wireless transmit/receive unit (WTRU) for measuring quality of service (QoS) is disclosed. The WTRU may comprise a transmit/receive unit configured to receive a radio resource control (RRC) message; and a processor configuring to measure QoS based on the received RRC message. In at least one embodiment, a wireless transmit/receive unit (WTRU) for performing quality of service (QoS) verification is disclosed. The WTRU may comprise a processor configured to: configure the WTRU for a QoS verification test and trigger a QoS verification procedure based on a predefined event condition; and a transmit/receive unit configured to transmit a QoS verification activation notification message such that the processor is configured to reconfigure the WTRU and measure downlink (DL) traffic QoS, and the transmit/receive unit is configured to report QoS measurement results after completion of the QoS verification test.

In at least one embodiment, a method of communicating test information between an evolved Node B (eNB) and a wireless transmit/receive unit (WTRU) is disclosed. The method may comprise receiving, by the WTRU from the eNB, an instruction to establish a test data radio bearer (DRB) between the eNB and the WTRU for communications therebetween of test information. The method may also comprise establishing, by the WTRU, the test DRB in accordance with the instruction. The method may further comprise exchanging, by the WTRU via the test DRB, the test information.

In at least one embodiment, the method may further comprise sending, by the WTRU to the eNB, a test bearer resource allocation request message to request the instruction.

In at least one embodiment, the establishing of the test DRB may include setting up, by the WTRU a test bearer resource separate from other data bearer resources based on the instruction.

In at least one embodiment, the method may further comprise conducting, by the WTRU, QoS measurements using test data sent via the test DRB.

In at least one embodiment, the method may further comprise sending, by the WTRU to the eNB, the QoS measurements via the test DRB.

In at least one embodiment, a wireless transmit/receive unit (WTRU) for communicating test information between an evolved Node B (eNB) and the WTRU is disclosed. The WTRU may comprise: a transmit/receive unit configured to receive from the eNB an instruction to establish a test data radio bearer (DRB) between the eNB and the WTRU for communications therebetween of test information; and a processor configured to control establishment of the test DRB for the WTRU in accordance with the instruction, wherein the transmit/receive unit is configured to exchange, via the test DRB, the test information.

What is claimed is:

1. A method of managing tests associated with a communication system using a wireless transmit/receive unit (WTRU), the method comprising:
    receiving, by the WTRU, a test case including test data for executing a test on the WTRU that is associated with the communication system;
    executing, by the WTRU, the test using the test data at the same time as executing data communications using user data, the test data being independent from the user data used for the data communications via the communication system and from control signaling,
    wherein the executing of the test includes receiving the test data via a test radio bearer (TRB); and the executing of the data communication includes any of: sending or receiving the user data via a data radio bearer (DRB), which is different from the TRB; and
    logging, by the WTRU, measurements of the executed test.

2. The method of claim 1, further comprising wirelessly reporting, by the WTRU to a network entity, the logged measurements after execution of the test using the TRB.

3. The method of claim 1, wherein:
    the receiving of the test case includes:
        obtaining testing conditions to trigger execution of the test; and
    the executing of the test includes:
        triggering the test on condition that the testing conditions indicate any of: (1) a geographic region in which the measurements are to be taken; (2) a location at which the measurements are to be taken; (3) a time at which the measurements are to be taken; (4) a tracking area in which the measurements are to be taken; or (5) a cell identifier associated with a serving cell of which the measurements are to be taken.

4. The method of claim 1, wherein the test case include a test scenario and the test data for conducting the test without using the user data traffic.

5. The method of claim 1, further comprising:
    transmitting, by the WTRU, a message including a Testing Condition Satisfied (TCS) indicator indicating whether the WTRU is available/ready to execute the test.

6. The method of claim 5, wherein the receiving of the test case is in response to the transmitting of the message including the TCS indicator.

7. The method of claim 1, wherein the logging of the measurements of the executed test includes logging the measurements responsive to the WTRU being in an idle mode, the method further comprising:
    reporting, by the WTRU to a network entity, the logged measurements.

8. The method of claim 7, further comprising transitioning, by the WTRU, to connected mode prior to reporting the logged measurements.

9. The method of claim 1, further comprising responsive to the WTRU being in a connected mode, reporting, by the WTRU to a network entity, the measurements.

10. The method of claim 1, further comprising responsive to a handover of the WTRU from a first cell to a second cell, delaying, by the WTRU, taking of the measurements until the handover is completed.

11. The method of claim 1, further comprising determining a quality of service for the WTRU based on any of: (1) uplink data loss over a specified period; (2) uplink data loss rate over the specified period; (3) uplink data discarded over the specified period at a Packet Data Convergence Protocol (PDCP) layer; (4) uplink data discarded rate over the specified period at the PDCP layer; (5) downlink data loss over the specified period; (6) downlink data loss rate over the specified period; (7) downlink data discarded over the specified period at the PDCP layer; or (8) downlink data discarded rate over the specified period at the PDCP layer.

12. The method of claim 1, further comprising taking the measurements periodically.

13. The method of claim 1, wherein the executing of the test is based on user input.

14. The method of claim 13, further comprising setting, by the user input, an availability flag indicating whether to enable or disable the test, wherein the executing of the test is responsive to the availability flag indicating to enable the test.

15. A method of managing a plurality of quality of service (QoS) test measurements associated with a communication system using a wireless transmit/receive unit (WTRU), the method comprising:
    receiving, by the WTRU, a test case indicating parameters for taking the QoS test measurements;
    receiving test data to be used for a test, at the same time as communicating user data and control signaling, the test data and the user data being provided over different types of radio bearers;
    taking, by the WTRU, the QoS test measurements using the test data; and
    reporting, by the WTRU to a network entity, the QoS test measurements using the radio bearer of the type associated with the test data.

16. A method of communicating test information between an evolved Node B (eNB) and a wireless transmit/receive unit (WTRU), the method comprising:

establishing, by the WTRU, a first data radio bear (DRB) between the WTRU and the eNB for communicating user data traffic;
receiving, by the WTRU from the eNB, an instruction to establish a test DRB, separate from the first DRB, between the eNB and the WTRU for communications of test data traffic therebetween;
establishing, by the WTRU, the test DRB in accordance with the instruction; and
communicating at the same time, by the WTRU, the test data traffic via the test DRB and the user data traffic via the first DRB, the test data traffic being different from the user data traffic and control signaling sent between the WTRU and the eNB.

17. The method of claim 16, further comprising
sending, by the WTRU to the eNB, a test bearer resource allocation request message to request the instruction.

18. The method of claim 16, wherein the establishing of the test DRB includes setting up, by the WTRU, a test bearer resource separate from other data bearer resources based on the instruction.

19. The method of claim 16, further comprising:
conducting, by the WTRU, QoS measurements using the test data traffic sent via the test DRB; and
sending, by the WTRU to the eNB, the QoS measurements via the test DRB.

20. A wireless transmit/receive unit (WTRU) for managing one or more tests associated with a communication system, comprising:
a transmit/receive unit configured to receive a test case including test data for executing a test on the WTRU that is associated with the communication system; and
a processor configured to:
execute, at the same time, the test using the test data and data communications using user data, the test data being independent from the user data used for the data communications via the communications system and from control signaling, and
log measurements of the executed test,
wherein the processor is further configured to:
receive the test data via a test radio bearer (TRB); and
any of: send or receive the user data via a data radio bearer (DRB), which is different from the TRB.

21. The WTRU of claim 20, wherein the transmit/receive unit is configured to wirelessly report the measurements to a network entity after execution of the test using the TRB.

22. The WTRU of claim 20, wherein:
the transmit/receive unit is configured to obtain testing conditions to trigger execution of the test; and
the testing conditions include any of: (1) a geographic region in which the measurements are to be taken; (2) a location at which the measurements are to be taken; (3) a time at which the measurements are to be taken; (4) a tracking area in which the measurements are to be taken; or (5) a cell identifier associated with a serving cell of which the measurements are to be taken.

23. The WTRU of claim 20, wherein the test case includes a test scenario and the test data for conducting the test without using the user data traffic.

24. The WTRU of claim 20, further comprising a memory configured to store the measurements, wherein:
the processor is configured to control storage to the memory and timing of reporting of the measurements to a network entity based on a mode of operation of the WTRU.

25. The WTRU of claim 20, wherein, responsive to a handover of the WTRU from a first cell to a second cell, the processor is configured to delay taking of the measurements until the handover is completed.

26. The WTRU of claim 20, wherein the processor is configured to determine a quality of service for the WTRU based on any of: (1) uplink data loss over a specified period; (2) uplink data loss rate over the specified period; (3) uplink data discarded over the specified period at a Packet Data Convergence Protocol (PDCP) layer; (4) uplink data discarded rate over the specified period at the PDCP layer; (5) downlink data loss over the specified period; (6) downlink data loss rate over the specified period; (7) downlink data discarded over the specified period at the PDCP layer; or (8) downlink data discarded rate over the specified period at the PDCP layer.

27. The WTRU of claim 20, wherein the processor is configured to control initiation of taking of the measurements based on user input.

28. The WTRU of claim 20, wherein the processor is configured to set, via user input, a measurement flag indicating whether to enable or disable tests and to disable initiation of the test responsive to the measurement flag indicating to disable the test.

29. A wireless transmit/receive unit (WTRU) for measuring one or more Quality of Service (QoS) test measurements associated with a communication system, comprising:
a transmit/receive unit configured to:
receive a test case indicating parameters for taking the QoS test measurements, and
receive test data to be used for a test, and, at the same time, communicate user data and control signaling, the test data and the user data being provided over different types of radio bearers; and
a processor configured to control taking of the QoS test measurements using the test data,
wherein the transmit/receive unit is configured to report to a network entity, the QoS test measurements using the radio bearer of the type associated with the test data.

30. A wireless transmit/receive unit (WTRU) for communicating test information between an evolved Node B (eNB) and the WTRU, comprising:
a transmit/receive unit configured to receive from the eNB instructions to establish a first data radio bear (DRB) for communication of user data traffic and a test DRB for communication of test data traffic between the eNB and the WTRU; and
a processor configured to control establishment of the test DRB for the WTRU in accordance with one of the instructions,
wherein the transmit/receive unit is configured to communicate, at the same time, the test data traffic via the test DRB and the user data traffic via the first DRB, the test data traffic being different from the user data traffic and control signaling sent between the WTRU and the eNB.

* * * * *